(12) United States Patent
Coleman et al.

US008229163B2

(10) Patent No.: US 8,229,163 B2
(45) Date of Patent: Jul. 24, 2012

(54) 4D GIS BASED VIRTUAL REALITY FOR MOVING TARGET PREDICTION

(75) Inventors: Norman P. Coleman, Picatinny Arsenal, NJ (US); Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 967 days.

(21) Appl. No.: 12/229,450

(22) Filed: Aug. 22, 2008

(65) Prior Publication Data
US 2009/0087029 A1  Apr. 2, 2009

Related U.S. Application Data

(60) Provisional application No. 60/965,855, filed on Aug. 22, 2007.

(51) Int. Cl.
*G06K 9/00* (2006.01)
(52) U.S. Cl. ...................................................... 382/103
(58) Field of Classification Search .................. 382/103, 382/106, 165, 181; 348/169; 342/76, 95
See application file for complete search history.

(56) References Cited

U.S. PATENT DOCUMENTS

| | | | | |
|---|---|---|---|---|
| 6,122,572 | A * | 9/2000 | Yavnai | 701/23 |
| 7,312,766 | B1 * | 12/2007 | Edwards | 345/8 |
| 2003/0065409 | A1 * | 4/2003 | Raeth et al. | 700/31 |
| 2003/0225519 | A1 * | 12/2003 | Miyahara | 701/301 |
| 2004/0006424 | A1 * | 1/2004 | Joyce et al. | 701/207 |
| 2006/0224318 | A1 * | 10/2006 | Wilson et al. | 701/213 |
| 2007/0005235 | A1 * | 1/2007 | Suzuki et al. | 701/200 |
| 2007/0073477 | A1 * | 3/2007 | Krumm et al. | 701/209 |
| 2007/0150127 | A1 * | 6/2007 | Wilson et al. | 701/10 |
| 2008/0009970 | A1 * | 1/2008 | Bruemmer | 700/245 |

OTHER PUBLICATIONS

Kim et al. "A Unified Visualization Framework for Spatial and Temporal Analysis in 4D GIS", Geoscience and Remote Sensing Symposium, 2003. IGARSS '03. Proceedings. 2003 IEEE International.*
Sebe et al., "3D Video Surveillance with Augmented Virtual Environments" Proceeding of IWVS '03 First ACM SIGMM international workshop on Video surveillance, 2003.*
Persiani et al., "A Semi-Immersive Synthetic Environment for Cooperative Air Traffic Control", $22^{nd}$ International congress of Aeronautical sciences, Sep. 2000.*

* cited by examiner

*Primary Examiner* — Jason M Repko
*Assistant Examiner* — Shervin Nakhjavan
(74) *Attorney, Agent, or Firm* — Raymond Y. Chan; David and Raymond Patent Firm

(57) ABSTRACT

The technology of the 4D-GIS system deploys a GIS-based algorithm used to determine the location of a moving target through registering the terrain image obtained from a Moving Target Indication (MTI) sensor or small Unmanned Aerial Vehicle (UAV) camera with the digital map from GIS. For motion prediction the target state is estimated using an Extended Kalman Filter (EKF). In order to enhance the prediction of the moving target's trajectory a fuzzy logic reasoning algorithm is used to estimate the destination of a moving target through synthesizing data from GIS, target statistics, tactics and other past experience derived information, such as, likely moving direction of targets in correlation with the nature of the terrain and surmised mission.

13 Claims, 60 Drawing Sheets

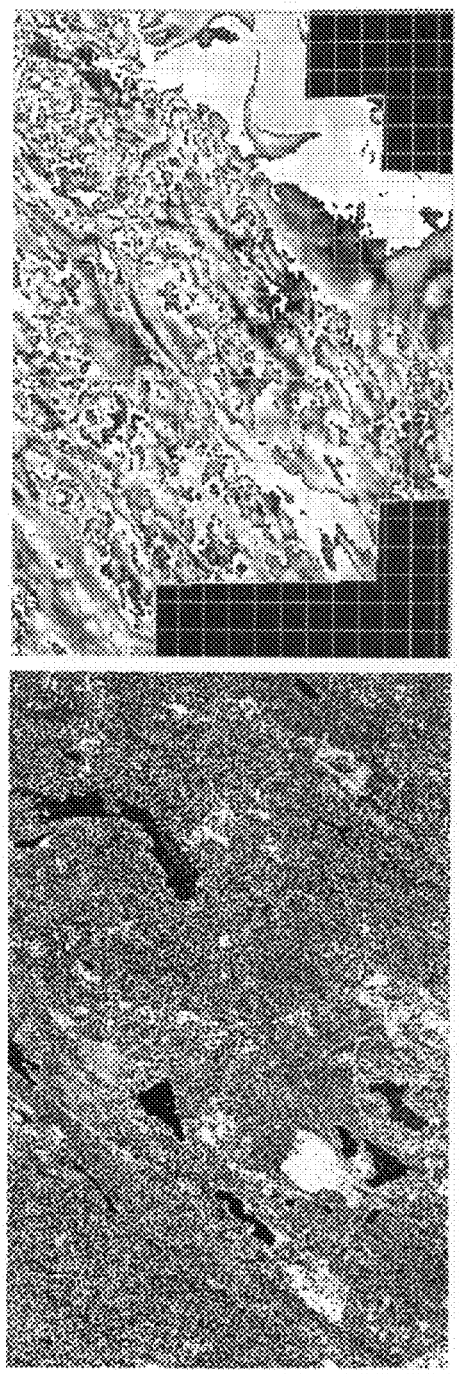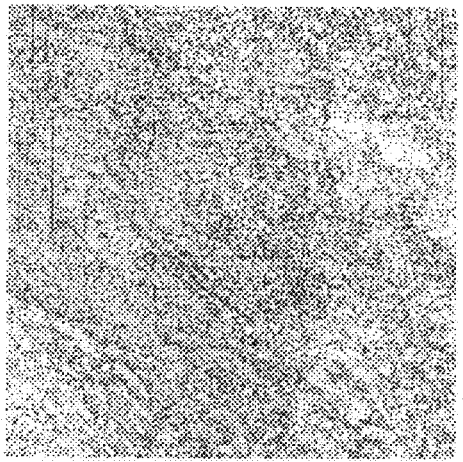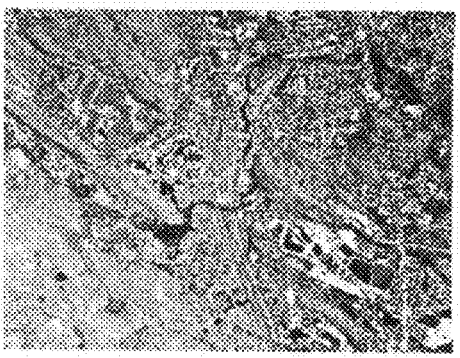
FIG. 15

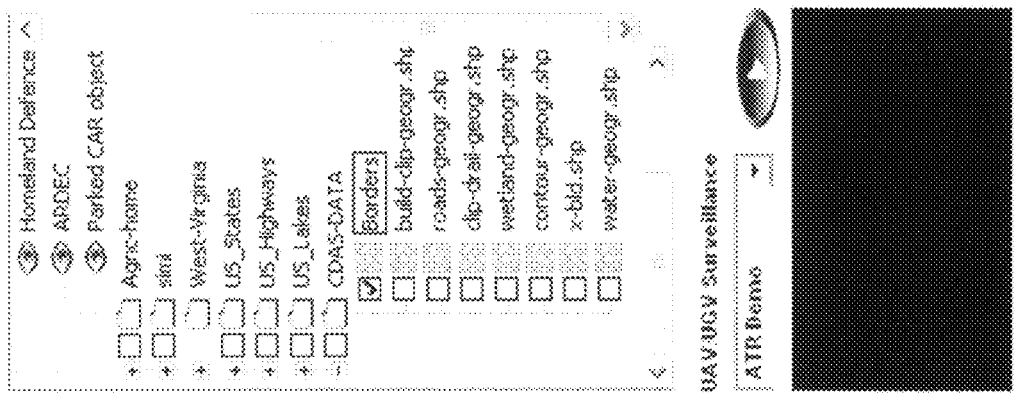
FIG. 40

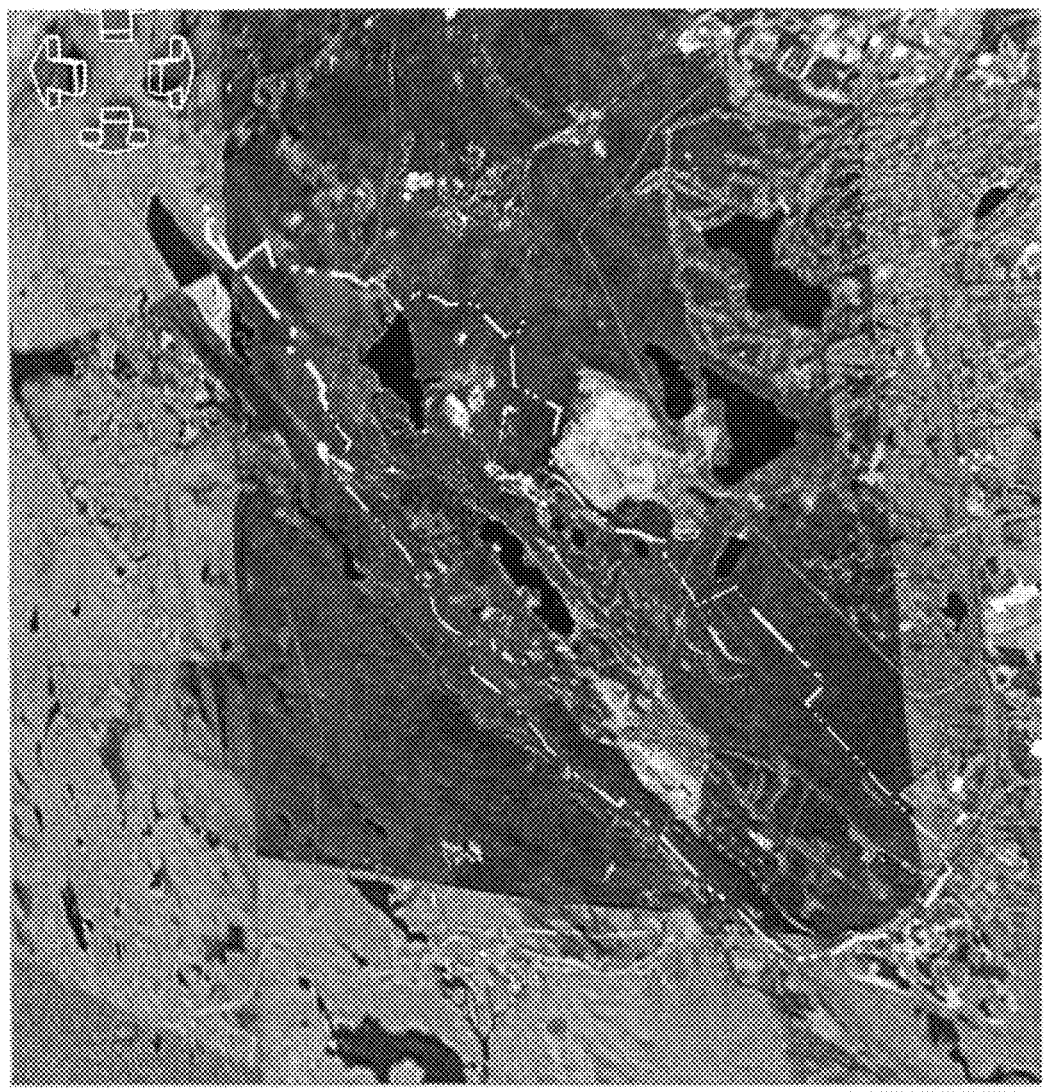
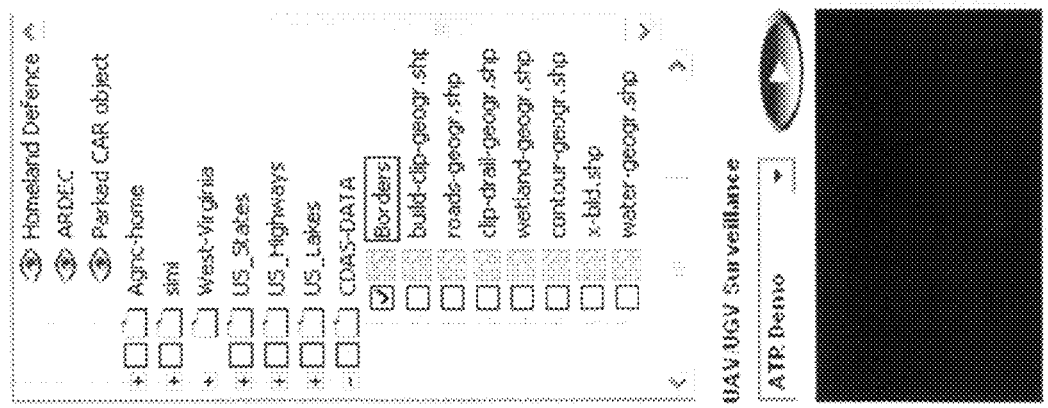
FIG. 43

| Connection | Message | Tgt_Rpt | CDAS | | | |
|---|---|---|---|---|---|---|
| # | Type | Num | Lat | Lon | | |
| | | | | | | |
| | | | | | | |
| | | | | | | |
| | | | | | | |
| | | | | | | |

| Connection | Message | Tgt_Rpt | CDAS |

Local ID: 1
CDAS ID: 5
Asset ID: 6

4D GIS BASED VIRTUAL REALITY FOR MOVING TARGET PREDICTION

CROSS REFERENCE OF RELATED APPLICATION

This is a regular application of a provisional application No. 60/965,855 filed on Aug. 22, 2007.

GOVERNMENT INTERESTS

This invention was made with Government support under contracts W15QKN-06-C-0014 and W15QKN-06-C-0202 awarded by the US ARMY. The Government has certain rights in the invention.

BACKGROUND OF THE PRESENT INVENTION

1. Field of Invention

The present invention relates to developing computer vision systems that are installed on unmanned aerial vehicles (UAV) and unmanned ground vehicles (UGV) for autonomous flight, surveillance, object recognition, tracking, as well as other missions.

2. Description of Related Arts

Current targeting systems such as Advanced Field Artillery Tactical Data System (AFATDS) do not have the ability to predict future locations of moving targets being tracked within the COP. Although these systems can perform some limited terrain and mobility analysis calculations that are static in nature, they do not address the key issue of how to apply terrain and mobility factors to attack a moving target. AGNC's GIS-based 4D visualization and simulation system for moving targets tracking and prediction provides a virtual environment for predicting and tracking moving targets, and visualizes the probable future movement of multiple ground targets based on the comprehensive analysis of geographical location, terrain, weather, vehicle movement characteristics and vehicle tactics. The predicted geographical area where the vehicle may be located is used for searching and locating moving vehicles for targeting in a 5-D domain. The predicted future movement of the vehicles is also used to assist the effects node operator in planning a loiter path for target surveillance assets and ingress paths and terminal impact points for weapons designated to attack the moving targets.

SUMMARY OF THE PRESENT INVENTION

The main object of the present invention is to develop a method and a system of 4D GIS based reality for moving target prediction to track and predict moving targets, wherein the presented invention uses a GIS-based positioning algorithm to determine the location of moving targets through registering the terrain image from a Moving Target Indication (MTI) sensor with the digital map from GIS. For motion prediction, the target state is estimated using an Extended Kalman Filter (EKF). In order to enhance the prediction of the moving target's trajectory, a fuzzy logic reasoning algorithm is used to estimate the destination of a moving target through synthesizing data from GIS, target statistics, tactics, and other past experience derived information, such as likely moving direction of targets in correlation with the nature of the terrain and surmised mission. The trajectory prediction of moving targets can be divided into two different types: road-dependent trajectory and road-independent trajectory. Geographical data and vehicle mobility are used in the proposed algorithms for moving target tracking and prediction. The terrain and road knowledge from GIS allow for more reliable motion tracking and prediction. For road-dependent targets, like cars and trucks, a road network is used as a constraint for motion prediction. For other road-independent targets, like tanks, a time-varying adaptive algorithm based on target state, local terrain conditions, and expert knowledge is used for motion speed and direction estimation. Motion trajectories of military vehicles in the battlefield environment follow the dictates of the intended mission task conditioned by the feasibility of their realization dependent on the terrain and potential threats. Empirical models of vehicle motions are of direct relevance to the prediction of vehicle motion. For example, military vehicles often execute their movements in a manner that exploits terrain elevation to prohibit, as much as possible, exposure to potential hostile fire. Operational constraints lead to a blending between the pure dynamic motion extrapolation considerations with those of obstacles avoidance and terrain profiling for maximum possible vehicle concealment. Accounting for the terrain profile is, in turn, also complemented by concerns about vehicle motion limitations induced by factors, such as the maximum safe vehicle tilt angles. It is thus realized that vehicle motion prediction takes into account the baseline vehicle motion patterns, as derived form knowledge and experience, and adjusts any anticipated new motion variations on the basis of the current conditions.

Another object of the present invention is to develop a method and a system of 4D GIS based reality for moving target prediction for UAV computer vision based moving target surveillance and tracking, wherein a UAV computer vision based moving target surveillance and tracking system has been developed for the target detection, tracking and prediction in battlefield surveillance. The UAV computer vision system simulates the human eye-brain using image sensor and artificial intelligence (AI) technology to understand the real world of the battlefield, detect, track and predict moving targets through vision, and then make decisions in attacking the target in practical missions. A sequence of video images contains large amounts of information that can be used for many military applications and civilian applications described above. In addition, computer vision is critical in guidance and navigation of UAVs for the success of autonomous missions.

Another object of the present invention is to develop a method and a system of 4D GIS based reality for moving target prediction with visualization and 4D simulation, wherein new methodology and advanced algorithms are developed and established for 3D virtual terrain generation and predicted motion simulation. The main advanced component algorithms include 3D terrain generation and 3D animation synthesis to generate virtual reality of target moving simulation. The 3D virtual terrain is generated from the elevation data of GIS using the ESRI software product ArcView and 3D Analyst. Elevation data, also called the "terrain skin", is a numeric representation that accurately portrays the character of the landscape. This data is an essential element of any database used to develop an accurate virtual environment. ESRI ArcView 3D Analyst supports Triangulated Irregular Networks (TINs). TINs are vector based topologically structured models that have desirable characteristics for representing terrain and other surfaces.

Another object of the present invention is to develop and integrate within the US ARMY ARMAMENT RESEARCH DEVELOPMENT AND ENGINEERING CENTER (ARDEC) MPC architecture a fully functional target detection prediction and visualization capability, as shown in FIG. 1.

Another object of the present invention is to develop a system to operate real time collaboration and dynamic replanning for target engagement autonomously between unmanned systems (UMS) based on pre-mission planning profiles generated prior to mission initiation, with final decision on target engagement being left to the human operator.

Another object of the present invention is to develop a system which is able to operate autonomously for extended periods, and is able to collaboratively engage hostile targets within specified rules of engagement, wherein all assets are able to share a COP (common operating picture) of the battle space and communicate sensor and target data in real time thus allowing for human or UMS target acquisition and location, transmission of the target to a weapon-target pairing system, and automated assignment of the target to a human or UMS asset as best suited.

Another object of the present invention is to develop a system of a distributed hardware/software processing component or components capable of insertion into multiple software architectures, and capable of use in multiple operating systems, to include real time embedded operating systems interfaced with on-board sensor, controller subsystems.

Accordingly, in order to accomplish the above objects, the present invention provides a method of 4D GIS based reality for moving target prediction, comprising steps of:
(a) recognizing terrain and targets;
(b) positioning and tracking target;
(c) estimation and reasoning destination; and
(d) predicting movement route and trajectory.

The important significant breakthrough results and innovations are as follows:

Fractal dimension analysis automated technology of the terrain for locating the moving targets through the registration of the moving target indication (MTI) image with a digital map from the GIS system.

UAV-based sensor's suite that includes gimbaled cameras, GPS, INS and AGNC proprietary coremicro devices. This sensors suite was successfully applied for targets surveillance experiments and will be optimized in terms of accuracy and performance Fuzzy logic reasoning algorithm developed to enhance the prediction of the moving target's trajectory is used to estimate the destination of a moving target through synthesizing data from GIS, target statistics, tactics and other past experience derived information, such as, likely moving direction of targets in correlation with the nature of the terrain and surmised mission.

Visualization algorithms for predicting moving targets that combine Virtual Reality (VR) and GIS to provide a virtual environment using 4D simulation and visualization technologies for the representation of the real natural and cultural world.

Statistical model based image classifiers, 3D GIS and virtual reality to provide a virtual scenario of moving targets motion prediction and possible aimpoint within the COP.

Geospatial reasoning based on spatiotemporal data mining, which will increase the degree of confidence of the target motion prediction processes.

The innovative targeting, prediction and 4D simulation system uses GIS-based algorithms to predict and track moving targets that will optimize and visualize 4D information (3D position plus ID time prediction). The advanced algorithms developed at AGNC utilize new advanced technology, including UAV computer vision based moving target surveillance and tracking, fractal dimension, statistical model based image classifiers, 3D GIS and virtual reality, to provide a virtual scenario of moving targets motion prediction and possible aimpoint within the COP. The innovative system for tracking, prediction and visualization of ground moving targets will find wide applications in the military and civilian sectors. Commercial applications include traffic control and management, aerial vehicle navigation, civilian emergency, law enforcement, firefighting, and environment monitoring.

GIS-based virtual reality for moving targets prediction and tracking plays important roles in ARDEC's CDAS, FCS, FFW, and the Common Operating Picture for targeting system such as AFATDS. This innovative targeting, prediction and 4D simulation system uses GIS-based algorithms to predict and track moving targets that will optimize and visualize 4D information (3D position plus ID time prediction). A computer DEMO System for the 4D simulation of moving target prediction is being demonstrated which can provide a virtual scenario of moving targets motion prediction and possible aimpoint within the COP.

These and other objectives, features, and advantages of the present invention will become apparent from the following detailed description, the accompanying drawings, and the appended claims.

Accordingly, in order to accomplish the above objects, the present invention provides a system

BRIEF DESCRIPTION OF THE DRAWINGS

FIG. 15 illustrates 4D GIS database components: aerial imagery, digital elevation data, DOQQs and 1:24000 topographic maps.

FIG. 40 illustrates a borders layer integrated into the Coremicro 4D GIS database.

FIG. 43 illustrates a borders layer integrated into the Coremicro 4D GIS database.

Figure 54:
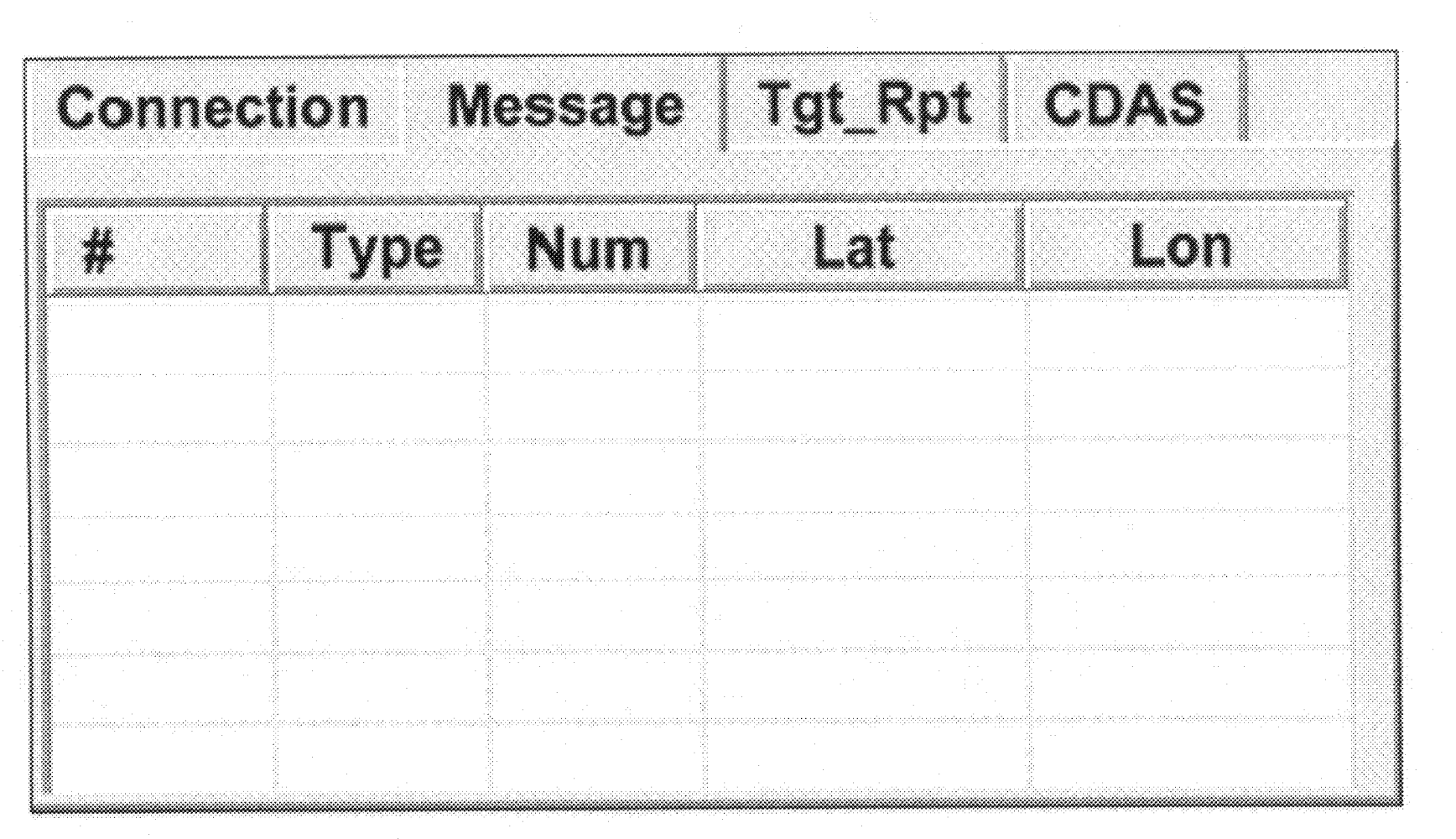

FIG. 54 illustrates a CDAS messaging log module.

FIG. 56 illustrates a CDAS system configuration module.

DETAILED DESCRIPTION OF THE PREFERRED EMBODIMENT

Figure 1:
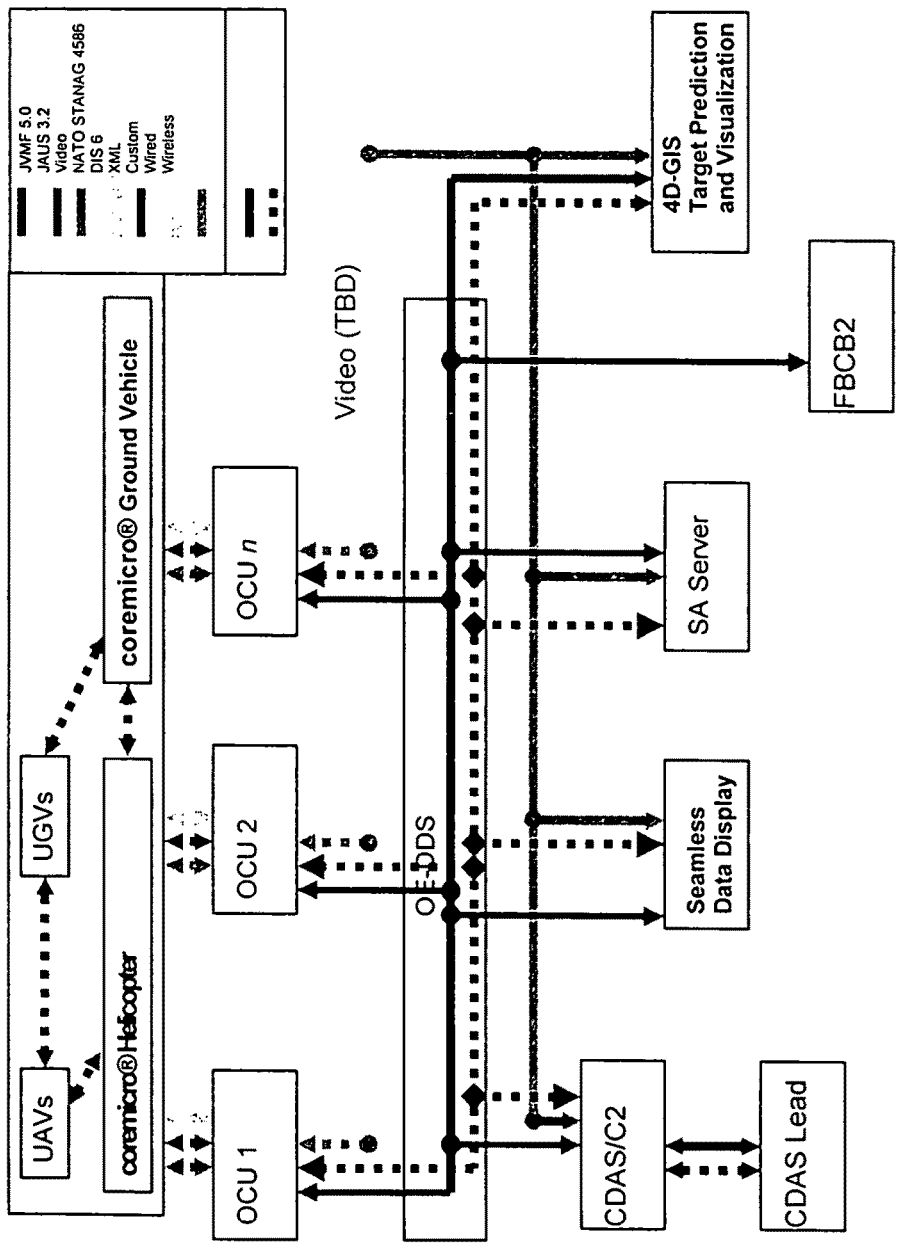
FIG. 1 is a block diagram of the 4D geographic information system (GIS)-based virtual reality for moving target prediction and visualization.
Figure 2:
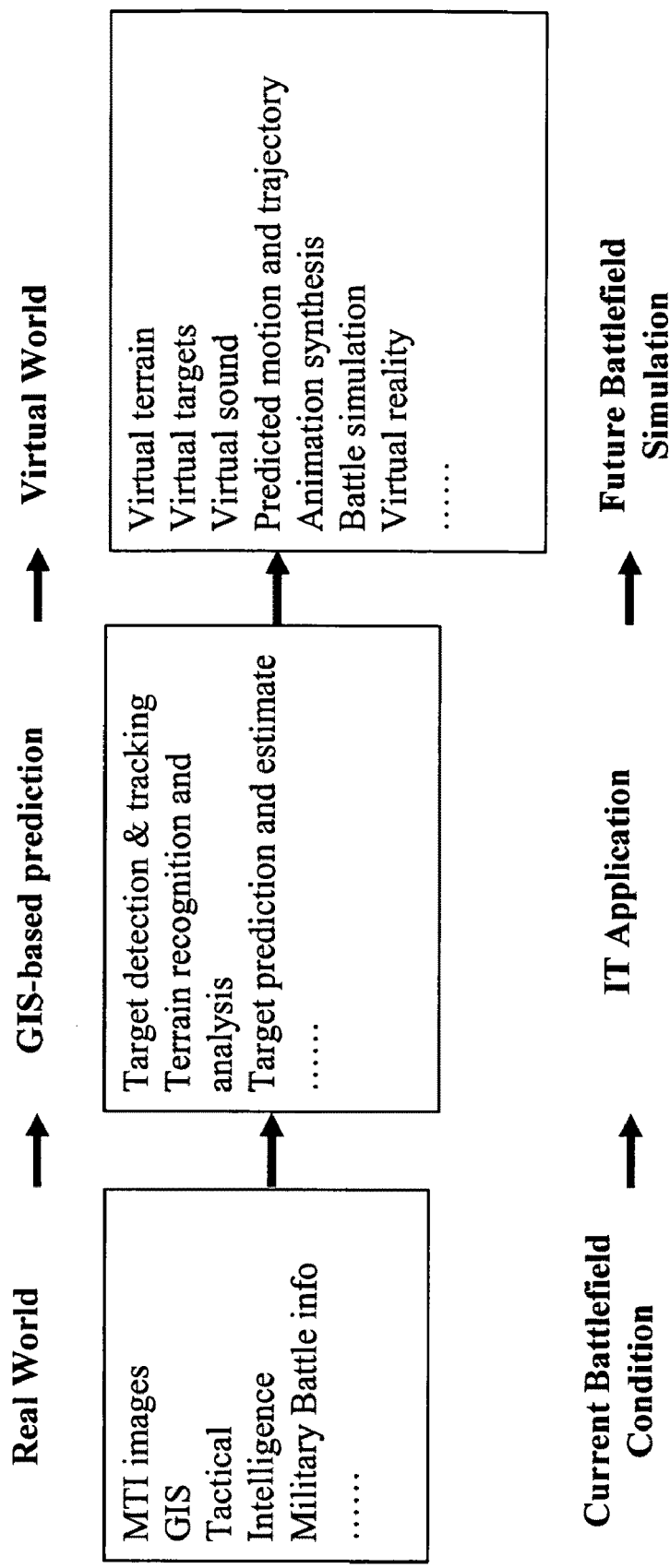
FIG. 2 illustrates the system concept of moving target prediction and simulation.

The present invention is outlined below:

The created system concept of moving target prediction and simulation is to use information technology to analyze the current battlefield situation (real world), then predict and simulate the future battlefield possible condition (virtual world). The input to the system is the real world description of the current battlefield, and the output is the virtual world through the simulation of the future battlefield, as shown in FIG. 2.

The developed method for the real world description of the current battlefield's status includes images from the moving target indication (MTI) sensors, geographic environment and condition of the battlefield from GIS, military intelligence, and related battlefield data from some military decision-making system, such as CDAS and AFATDS.

Figure 3:
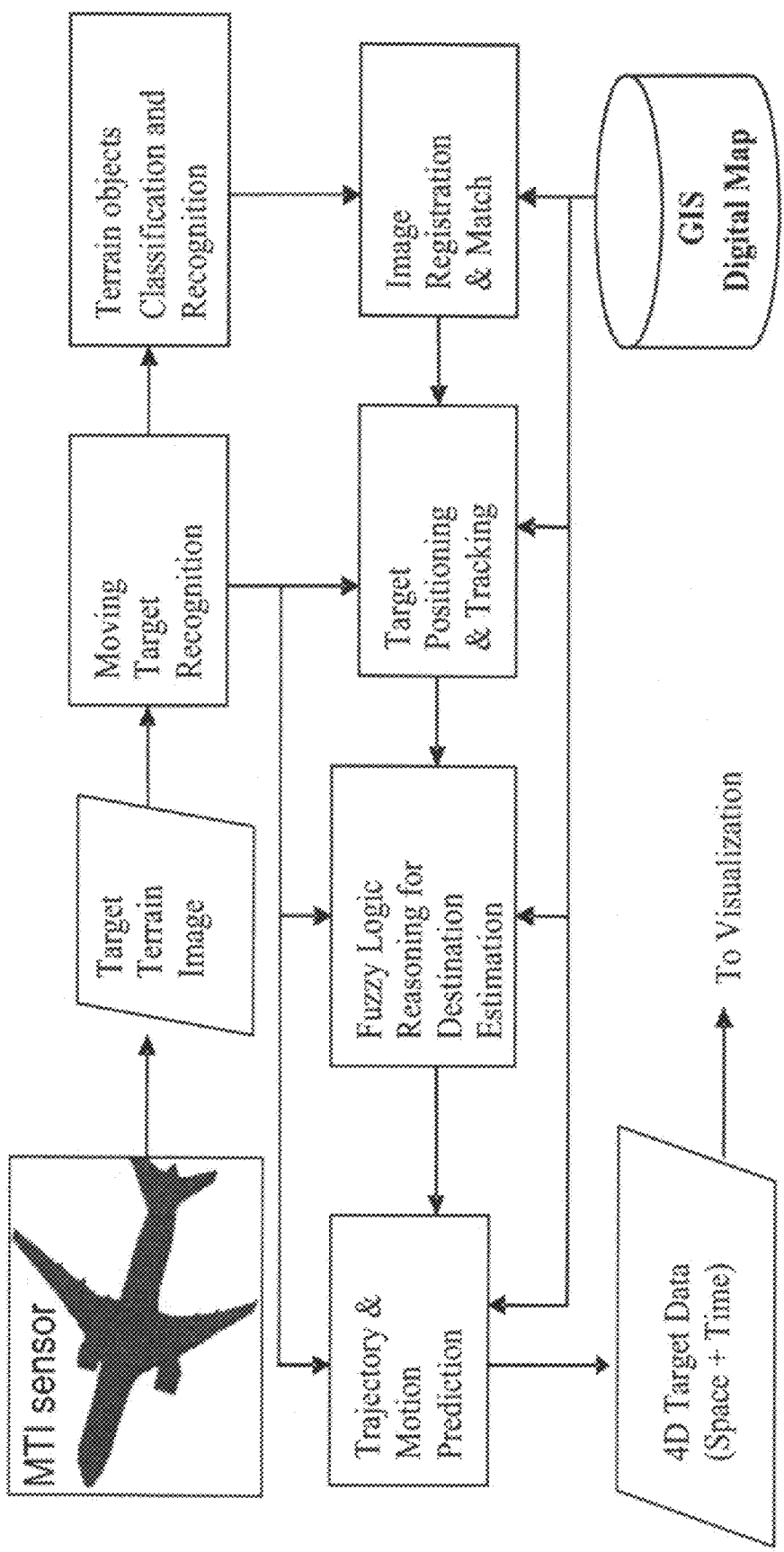
FIG. 3 illustrates the system architecture of moving target prediction.

The designed system architecture consisting of: (1) moving target tracking and prediction, and (2) target motion 4D simulation, as shown in FIG. 3. The tracking and prediction algorithms are used to track and predict the possible moving path and trajectory based on the images from MTI sensors, GIS digital map, as well as other related intelligence and military information, such as AFATDS and CDAS.

Figure 4:
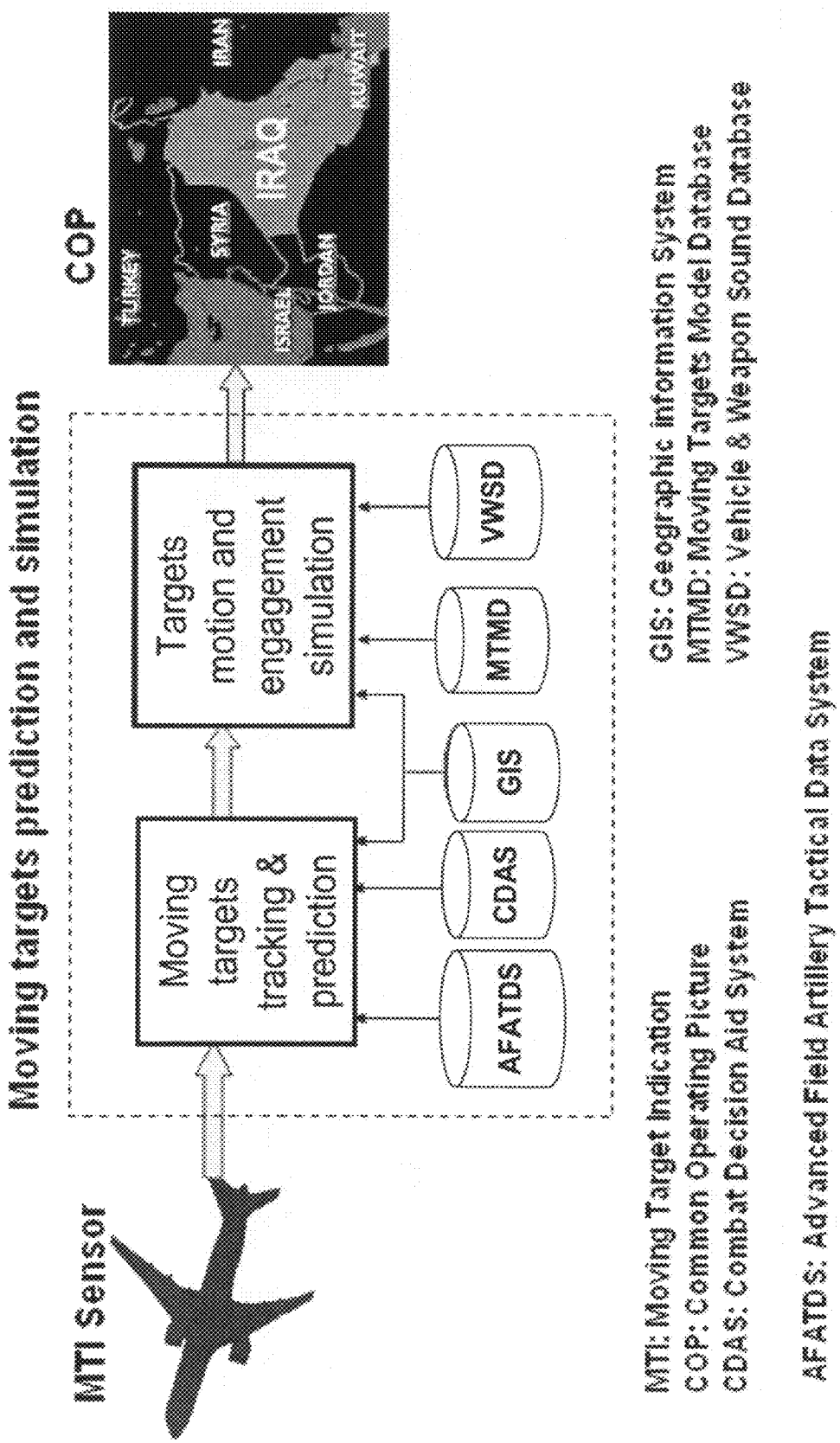
FIG. 4 illustrates the algorithmic workflow of moving targets prediction and simulation.

The developed unique 4D motion simulation algorithms of moving targets for generating a 4D virtual reality and targets moving simulation including possibility of aimpoints modeling, for the future battlefield. The 4D virtual reality is synthesized from three simulation layers: (1) the virtual terrain generated from 3D GIS, (2) virtual moving targets from pre-built Moving Target Model Database (MTMD), possibly including Vehicle & Weapon Sound Database (VWSD), and (3) the routes or trajectories from the output of the tracking and prediction algorithms. Algorithmic workflow is depicted in FIG. 4.

Considered network distributed architecture for the whole system, including prediction algorithms and 4D simulation algorithms to be integrated with the Common Operating Picture (COP) for real-time and dynamic prediction and 4D simulations through the web-service.

The following sections describe in detail how the present invention meets the objectives.

GIS-based Moving Target Tracing and Prediction

The technology of the 4D-GIS system deploys a GIS-based algorithm used to determine the location of a moving target through registering the terrain image obtained from a Moving Target Indication (MTI) sensor or small Unmanned Aerial Vehicle (UAV) camera with the digital map from GIS. For motion prediction the target state is estimated using an Extended Kalman Filter (EKF). In order to enhance the prediction of the moving target's trajectory a fuzzy logic reasoning algorithm is used to estimate the destination of a moving target through synthesizing data from GIS, target statistics, tactics and other past experience derived information, such as, likely moving direction of targets in correlation with the nature of the terrain and surmised mission. The trajectory prediction of moving targets can be divided into two different types: road-dependent trajectory and road-independent trajectory. Geographical data and vehicle mobility are used in the proposed algorithms for moving target tracking and prediction. The terrain and road knowledge from GIS allow for more reliable motion tracking and prediction. For road-dependent targets, like cars and trucks, a road network is used as constraint for motion prediction. For other road-independent targets, like tanks, a time-varying adaptive algorithm based on target state, local terrain conditions and expert knowledge is used for motion speed and direction estimation.

Significant innovation in these geospatial related factors for prediction brings to the proposed for 4D GIS technology spatiotemporal data mining. In practice it will be realized by deploying in the target prediction process spatial association rules.

Figure 5:
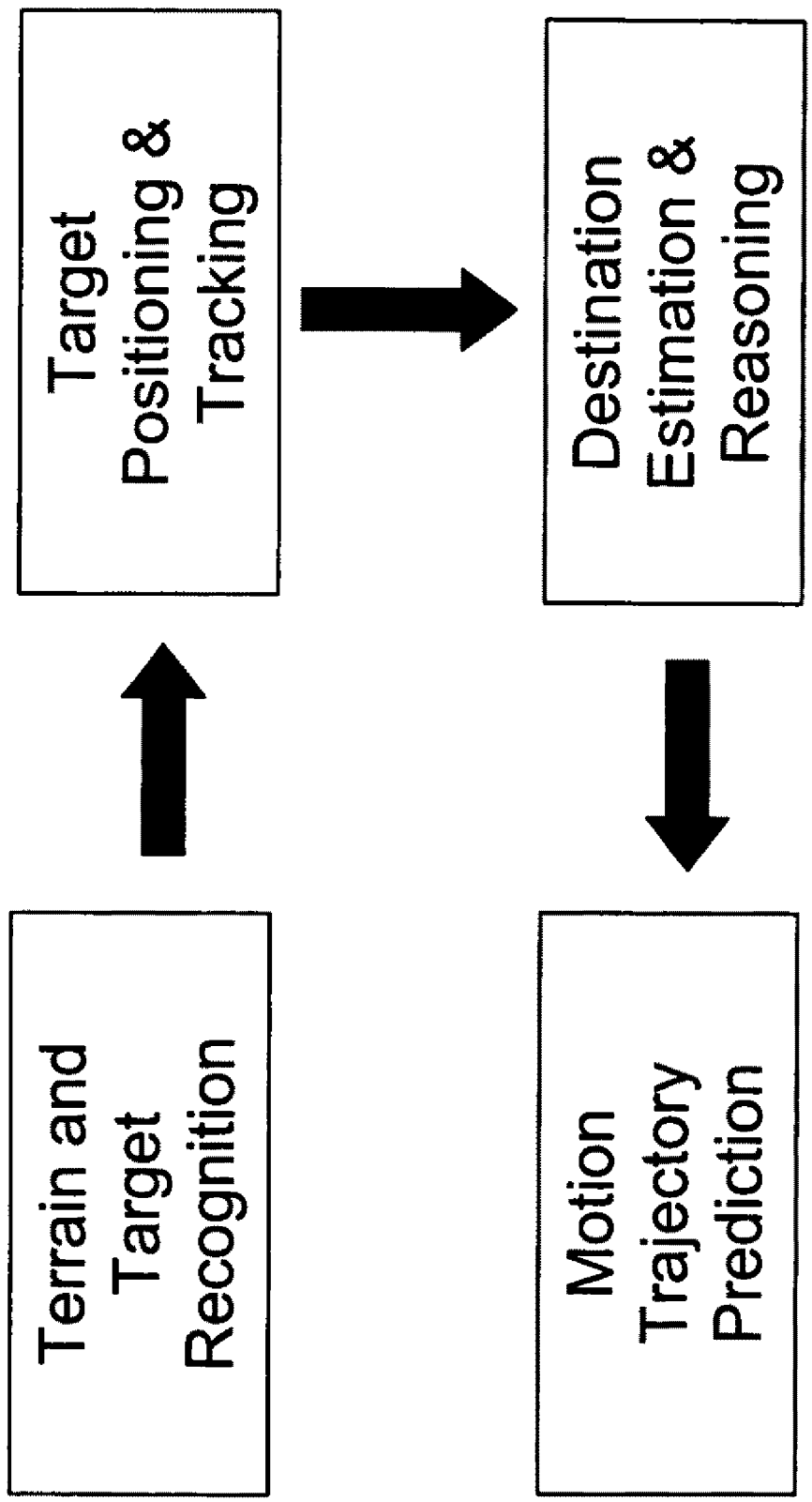
FIG. 5 illustrates the main components and image/data processing flow of target tracking and prediction.

A GIS-based algorithm has four main components for the implementation of: (1) terrain and targets recognition; (2) target positioning and tracking; (3) destination estimation and reasoning, and (4) movement route and trajectory prediction. The components and image/data processing flow are shown in FIG. 5.

The detailed system architecture of the moving target prediction is shown in FIG. 3. The terrain background, after extracting moving targets, is first classified through a statistical model based image classifier, and different natural and cultural objects are recognized, such as, trees, grass, mountains, roads, buildings and rivers. In our proposed algorithm, the fractal dimension analysis of terrain is used for the classification and recognition of natural and man-made objects. Then the classified terrain is registered with the digital map from GIS through matching the recognized cultural (man-made) objects and natural objects. After image registration, the position of the moving target can be determined. In addition, the geographical information where the target is located can be retrieved from GIS, including terrain, road networks, cities, streets, highways, rivers, bridges, important sites, civic and military facilities, mountain height. Moving targets are extracted from the image by subtraction from a sequence of measurements from the MTI sensor and are then recognized using pattern recognition. A fuzzy logic reasoning algorithm synthesizes multi-modalities from GIS, target statistics, tactics and other military information to estimate the destination of moving targets. Then a trajectory and motion prediction algorithm is used to calculate the locations of moving targets at the next timestamp. By tracking the target movements on the digital map, the status variables of a moving target, such as position, direction, velocity and acceleration, are obtained. Two different algorithms are used to estimate the trajectory for road-dependent targets and road-independent targets, respectively. For road-dependent targets, a road network is used as constraint for motion prediction and tracking. For road-independent targets, we use a time-varying adaptive algorithm for motion prediction based on the target mobility and terrain environment.

For the classification and recognition of natural terrain objects, such as mountains, woods, ocean, grasslands, and cultural (man-made) objects, such as, buildings, highways and vehicles, we use statistical model-based algorithms to classify and identify natural objects and man-made objects. These algorithms classify objects through a feature vector in a high-dimensional feature space. We designed two different classification methods for object recognition based on statistical modeling: supervised classification and unsupervised classification. In supervised classification, a set of features of known classification is provided as a training set which is then used to establish the classification method's parametric criteria that allow the various object classes of interest to be separated in feature space. Unsupervised classification uses clustering algorithms to effect an automated class delineation process in feature space.

A key element of the GIS-based algorithms for moving target motion prediction is classification and recognition of terrain objects or features, including natural objects trees, grass, mountains, and man-made objects, such as roads, buildings, and vehicles, so that the system can position precisely the moving target by registering the classified objects with those from the GIS. The proposed terrain classification algorithm utilizes the measurement of fractal dimension. AGNC has developed fractal dimension algorithms and used them in recognition and classification of natural and man-made objects. The fractal dimension provides a quantitative index of the roughness of a natural surface, such as, trees, grass, mountains, roads, coastlines, and many other natural surfaces. Fractal dimension has been applied to many different areas in science and engineering, such as, graphical simulation of clouds or trees, texture analysis of material surfaces, and medical imaging.

Vision Based Object Detection Georefencing and Recognition

Imaging flow for moving target detection Image processing is an important component of the Automatic Prediction and 4D simulation system for moving target detection and tracking. The electro-optic sensor image processing is composed of the image acquisition module, the preprocessing module, the segmentation module, the detection module, the recognition module, the 3D-positioning module, the tracking module, EO sensors, and other sensors, such as, the AGNC coremicro AHRS/INS/GPS Integration Unit that integrates GPS receiver, a MEMS or FOG IMU, laser ranger, radio altimeter, baro altimeter, terrain database, radar and MMW.

Sensors Calibration and Georeferencing

In order to superimpose geometrically any of the workflows depicted in FIG. 4 all the datasests should employ the same reference coordinate system. From the name of our proposed system, 4D GIS, it is evident that the geographical coordinate system is chosen as such a reference. Calibration and georeferencing UAV sensors on-the-fly is a problem which is not solved yet in the research areas or practice.

Statistical Model Based Terrain and Obstacle Recognition

The imaging sensor can provide measurements of the target range, position, and attitude, which are fused with other object detection sensors, such as, radar, for obstacle tracking. Besides the vision based target tracking, the imaging sensors can provide more information which is very useful for prediction and visualization of moving targets. For example, for motion simulation of moving targets, natural and cultural (man-made) objects are extracted from the aerial image and then those natural and man-made objects (including targets themselves) can be simulated through virtual reality technology. Recognition of different moving targets is helpful in tracking and prediction of moving targets based on the motion characteristics. Statistical model based algorithms for natural/cultural objects recognition have been designed to identify natural objects, such as, mountains, trees and grass, and cultural objects, such as, highways, roads and buildings. Both supervised classifiers, such as ANN and SVM (Support Vector Machine), and unsupervised classifiers, such as K-Means and Fuzzy C-Means, are designed in our model-based object recognition software. In supervised classification, a set of features of known classification is provided as a training set which is then used to establish the classification method's parametric criteria that allow the various object classes of interest to be separated in feature space. Unsupervised classification uses clustering algorithms to affect an automated class delineation process in feature space.

We have successfully demonstrated extraction of sky, mountains and trees objects from the real aerial images. It was achieved as results of experiments with various object classifiers created during 4D GIS research efforts.

Once the mountain is identified, its 3D data as well as other information, such as, height and geographic position, are collected from GIS databases. Then, we demonstrated mountain identification based on its contour model.

Figure 6:
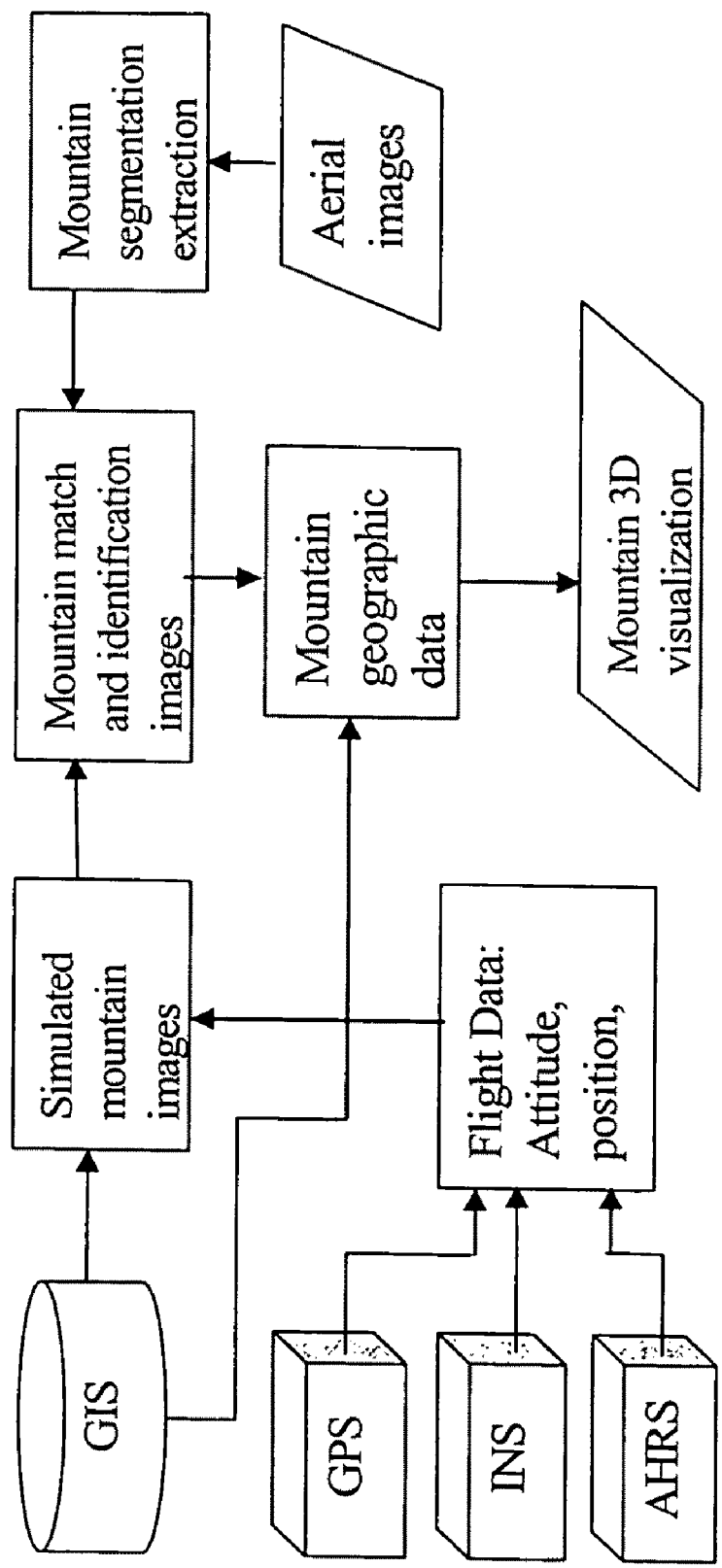
FIG. 6 illustrates the architecture of the GIS/GPS/AHRS/INS/combined natural objects recognition.

FIG. 6 represents the algorithm architecture of the GIS/GPS/AHRS/INS combined recognition of natural objects to provide useful information for prediction and 4D visualization.

Imagery Fusion with Multi-Modality Sensors for Target Tracking and Prediction

To compensate for the limitations of individual object detection sensors, and to improve the overall object detection and tracking performance, an Adaptive Multimode Tracking (AMT) System is employed. This system consists of heterogeneous sensors, such as, radar, MMW, ladar, infrared and video. Multiple sensors can be fused in different modes, i.e., sensor level fusion, track level fusion, and partially processed data fusion, where the center of reflection sensors include radar, ladar, etc, which provide measurements of position, azimuth, elevation, and Doppler rates. The imaging sensors are monocular camera, stereo camera, and/or infrared imager, etc.

The imaging sensor is very important for object detection and tracking. It provides not only range and/or 3D coordinates information, but also target attitude measurements. Traditionally position measurements are used for maneuvering target tracking. However, it is difficult to detect and estimate a maneuvering target from these position measurements because position measurements indicate poorly the changes of acceleration and thus lead to unsatisfactory tracking performance when the target is maneuvering. Target attitude variables, deduced from the target image, provide new, fast, and reliable measurements for maneuvering detection and estimation which is based on the correlation between aircraft orientation and the direction of acceleration. The delay in maneuvering detection using position and angle measurements is significantly reduced by using imaging sensors.

The Adaptation and Fusion Algorithm component plays an important role in the AMT system. It adaptively chooses the suitable sensors and fuses them in an optimal way. Application of adaptation/fusion to raw sensor data results in the sensor level fusion which demonstrates better performance under certain circumstances. Its application to the estimates obtained by an individual sensor as it operates alone provides a track level fusion. Between these two extremes is the partially processed data level fusion.

UAV Surveillance on Ground Moving Targets

Figure 7A:
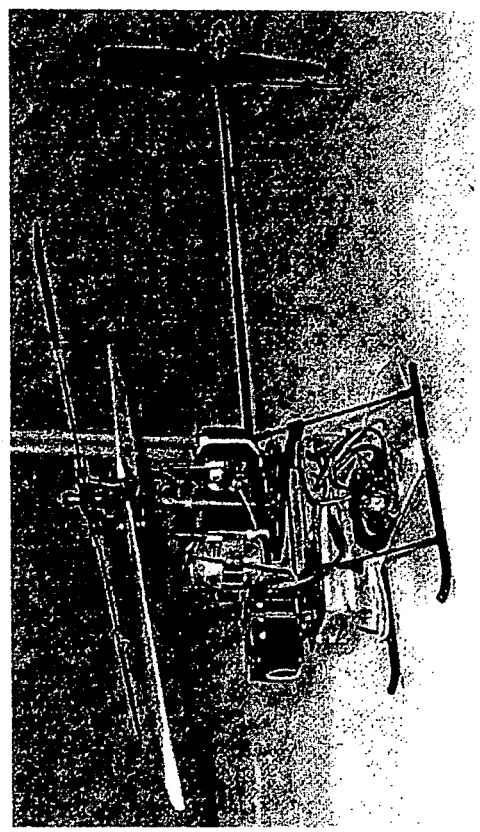
FIG. 7(a) is a perspective view of the small Coremicro® helicopter configured with a computer vision system at AGNC.
Figure 7B:
FIG. 7(b) is a perspective view of the re-modeled mini-camera of AGNC's helicopter-based computer vision system.

In order to acquire the real time image of the moving targets in the battlefield, AGNC has demonstrated a small unmanned aerial vehicle UAV computer vision based moving target surveillance and tracking system to execute surveillance and tracking of moving targets. The configuration of the computer vision system on the AGNC small unmanned Coremicro® helicopter is shown FIG. 7. FIG. 7(*b*) is the mini-camera of the AGNC computer vision system.

AGNC built up several fixed-wing UAVs and small/middle/large helicopter UAVs and integrated a new high-performance wireless camera and configured it into a computer vision system for the fixed-wing and helicopter UAVs. In order to test the image quality, the camera's performance and the advanced algorithms of moving target detection and tracking, a simulated computer vision system hardware has been set up and tested at AGNC for the fixed-wing and helicopter UAVs.

Figure 8:
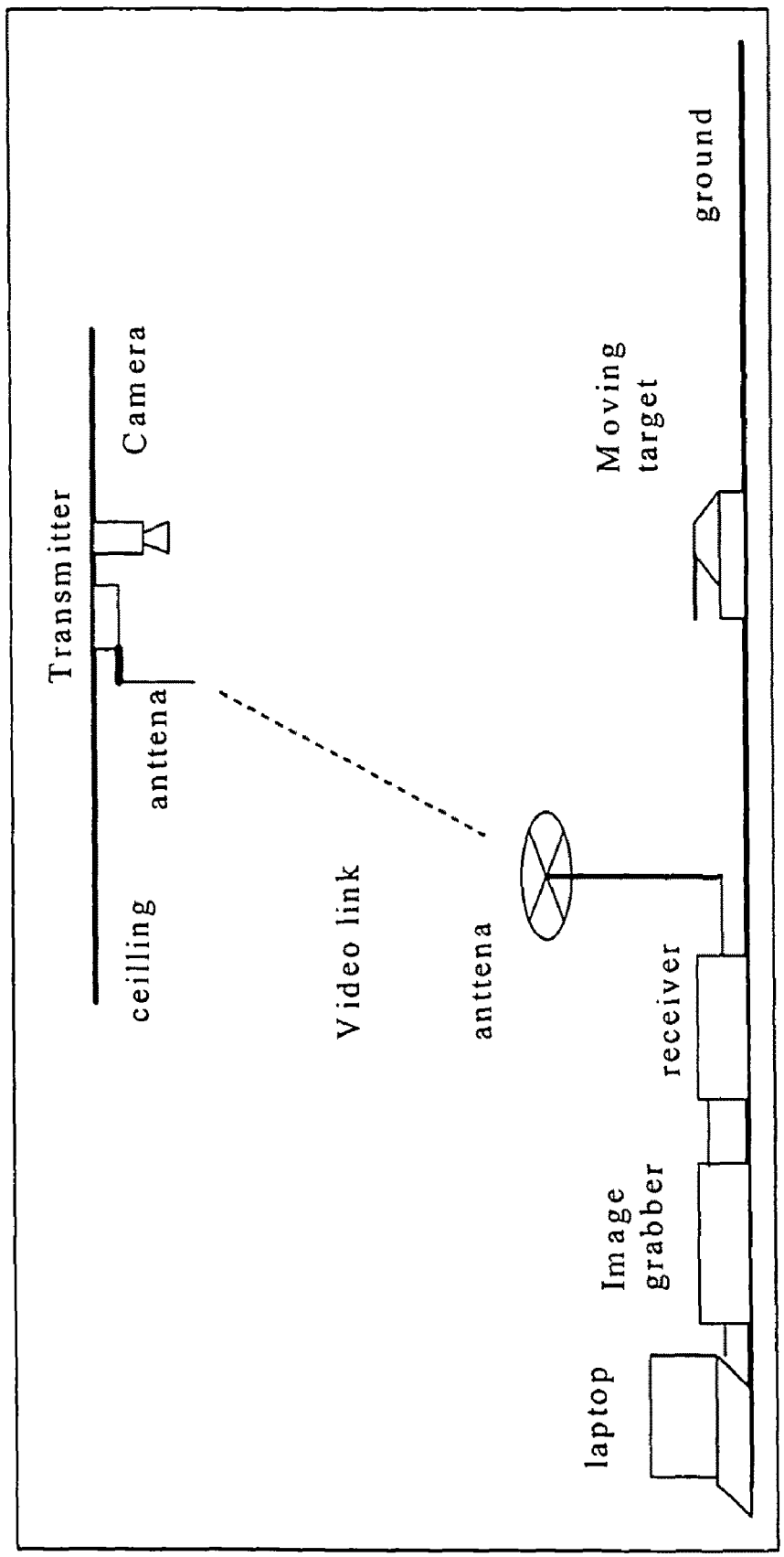
FIG. 8 is a schematic view of the composition and configuration of the computer vision system.

The simulated system composition and configuration are shown in FIG. 8. The wireless downward camera was fixed on the ceiling. When a small target moves on the ground, video image sequences are captured in a laptop on the ground through an image grabber device connected to the laptop. The captured image sequences are processed and analyzed using advanced target detection and pattern recognition for moving object tracking and prediction.

Figure 9:
FIG. 9 illustrates the UAV surveillance videostream integration in AGNC 4D GIS visualization.

AGNC not only developed successful system architecture and algorithmic workflow of UAV surveillance component integration into 4D-GIS, the UAV integration with 3D Visualization was achieved is it is depicted, for example, in FIG. 9.

This achievement makes significant technological advance for the 4D GIS effort.

4D GIS-Based Motion Simulation and Visualization of Target Prediction

Figure 10:
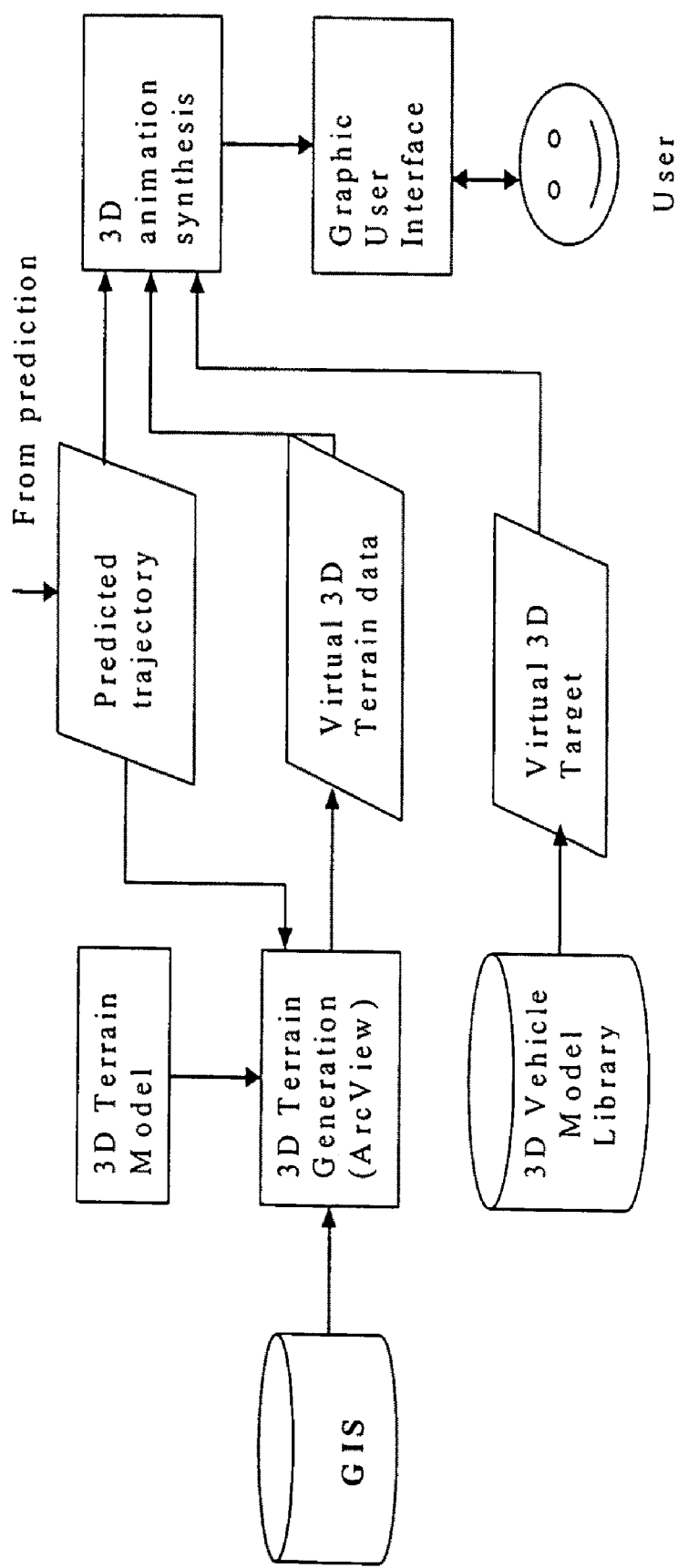
FIG. 10 illustrates the system architecture of moving target visualization.

The second part of the presented system is an advanced computer graphical system for 4D simulation and visualization of a moving target. The algorithms developed at AGNC, as shown in FIG. 10, are used to produce a real-time 4D GIS-based virtual reality for simulating the moving target and the possible aimpoint within the Common Operating Picture (COP). According to the predicted position from the motion prediction algorithm, the geographic data of the area where a target may be located is retrieved from GIS, for example, a digital map and elevation data. The GIS data are used to generate a virtual 3D terrain, which is based on a terrain model: regular Digital Elevation Model (DEM) or Triangulated Irregular Network (TIN). The 3D Vehicle Model Library is the storage of 3D data for various vehicles models, such as trucks, tanks, airplanes. The 3D animation synthesis uses virtual terrain, virtual vehicles and moving trajectories to produce a moving picture for the real time simulation of terrain-based targeting and target engagement.

Figure 11:
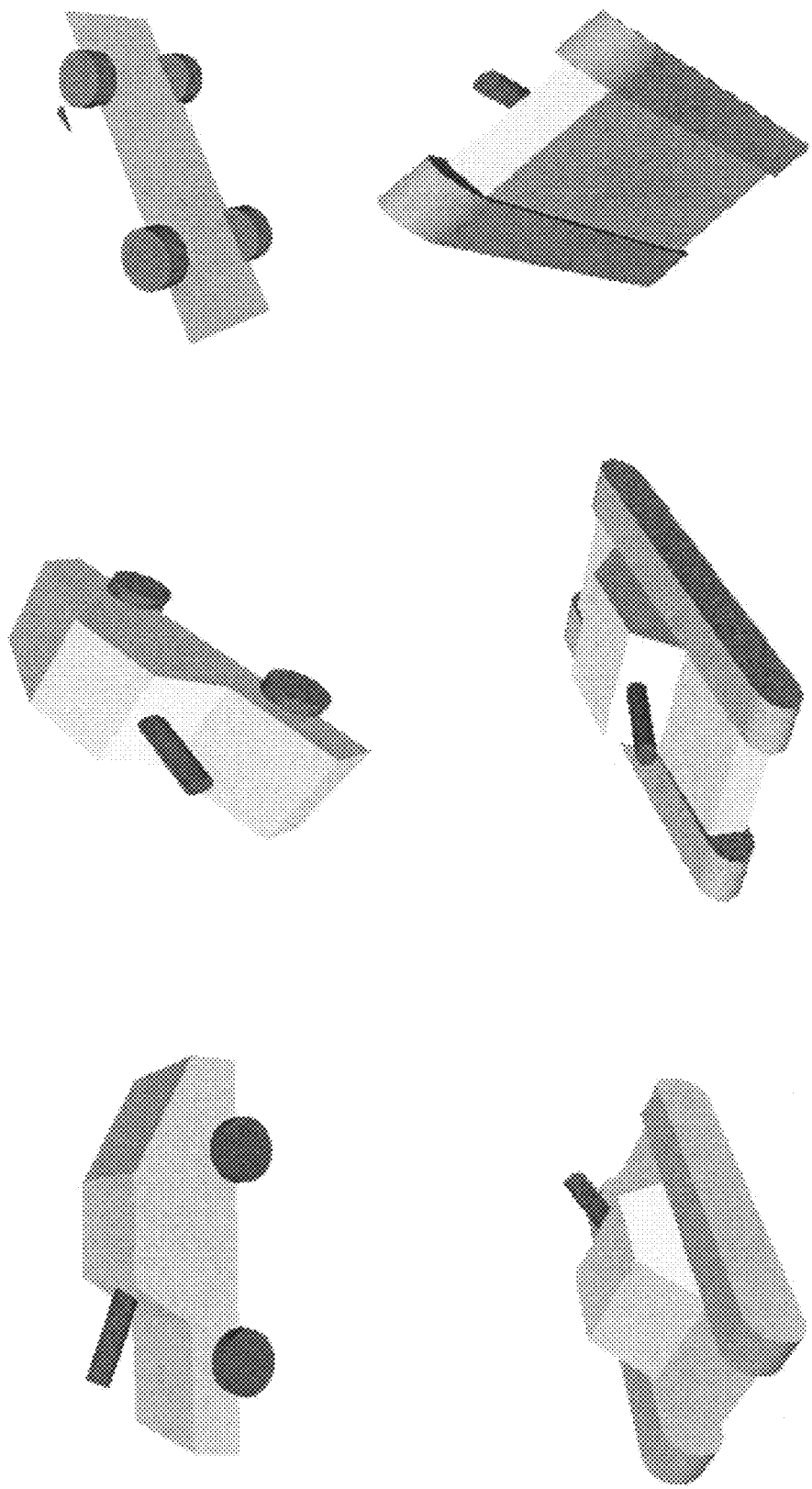
FIG. 11 illustrates the virtual 3D model of a moving targets tank and car visualized form different angels of view.

GIS technology has played an instrumental part in the real-time simulation arena. As a tool for creating virtual realistic environments composed of both man-made and natural objects, GIS and image processing technology have been used to generate real-time virtual terrain for regions all over the world. The combination of Virtual Reality (VR) and GIS is to explore the possibility of using 3D visualization technologies to interactively represent the virtual natural and cultural world. One of the major tools is the Virtual Reality Modeling Language (VRML), a high level object-oriented language for the description of scenes and behavior of 3D objects. FIG. 11 demonstrates an example of a virtual tank we generated using VRML for the tracking, prediction and 4D visualization.

Figure 12:
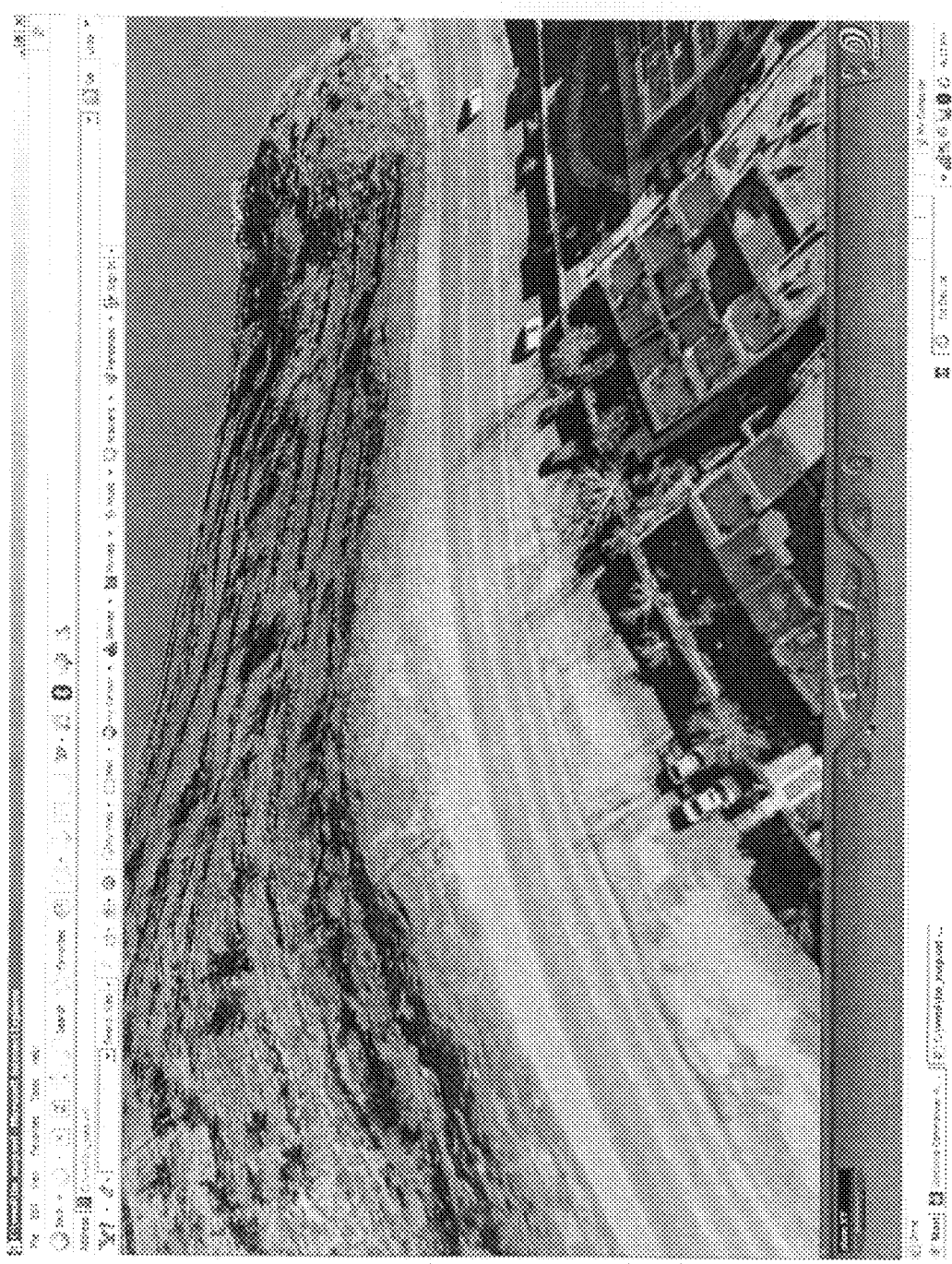
FIG. 12 illustrates the geospatial dataset in VRML browser.

Terrain models can be classified into two types: Digital Elevation Model (DEM) and Triangulated Irregular Network (TIN). VRML has built-in visualization mechanisms for both types: ElevationGrid node for DEM, and IndexedFaceSet node for TIN. Generally speaking, a DEM is easier to be constructed than TIN, but for a multi-resolution model, a DEM structure may have the problem of terrain tearing between tiles with different resolutions. Although a TIN works well in the multi-resolution case, its complex algorithms of the transformation between different resolution models impede its use in real-time applications. GIS and image processing technology have been used to generate real-time virtual terrain for regions all over the world by use of VRML technology. FIG. 12 depicts an example of the 3D VRML data visualization within Microsoft Internet Explorer employing orthophoto image and DEM data.

The 3D animation synthesis combines virtual terrain, virtual targets and predicted trajectory to produce a virtual reality of predicted target movements. Users can interact with the virtual reality through a Graphic User Interface (GUI) to control the display, such as, the timestamp a motion trajectory and 3D view-angle and zoom. The algorithm of virtual reality is implemented using VRML. VRML is a platform independent file format and supports web-based applications for 3D visualization. Therefore, VRML-based 3D simulation can be easily integrated with the client-server or multi-tier distributed information system, such as AFATDS. The VRML algorithms for 3D motion simulation can be encapsulated in a web-server or middleware (multi-tier distributed system). The users can use a web browser to display the simulated movement of multi targets in a full-secure intranet, for example, ASIPRNET (Army Secure Internet Protocol Routed Network).

Figure 13:
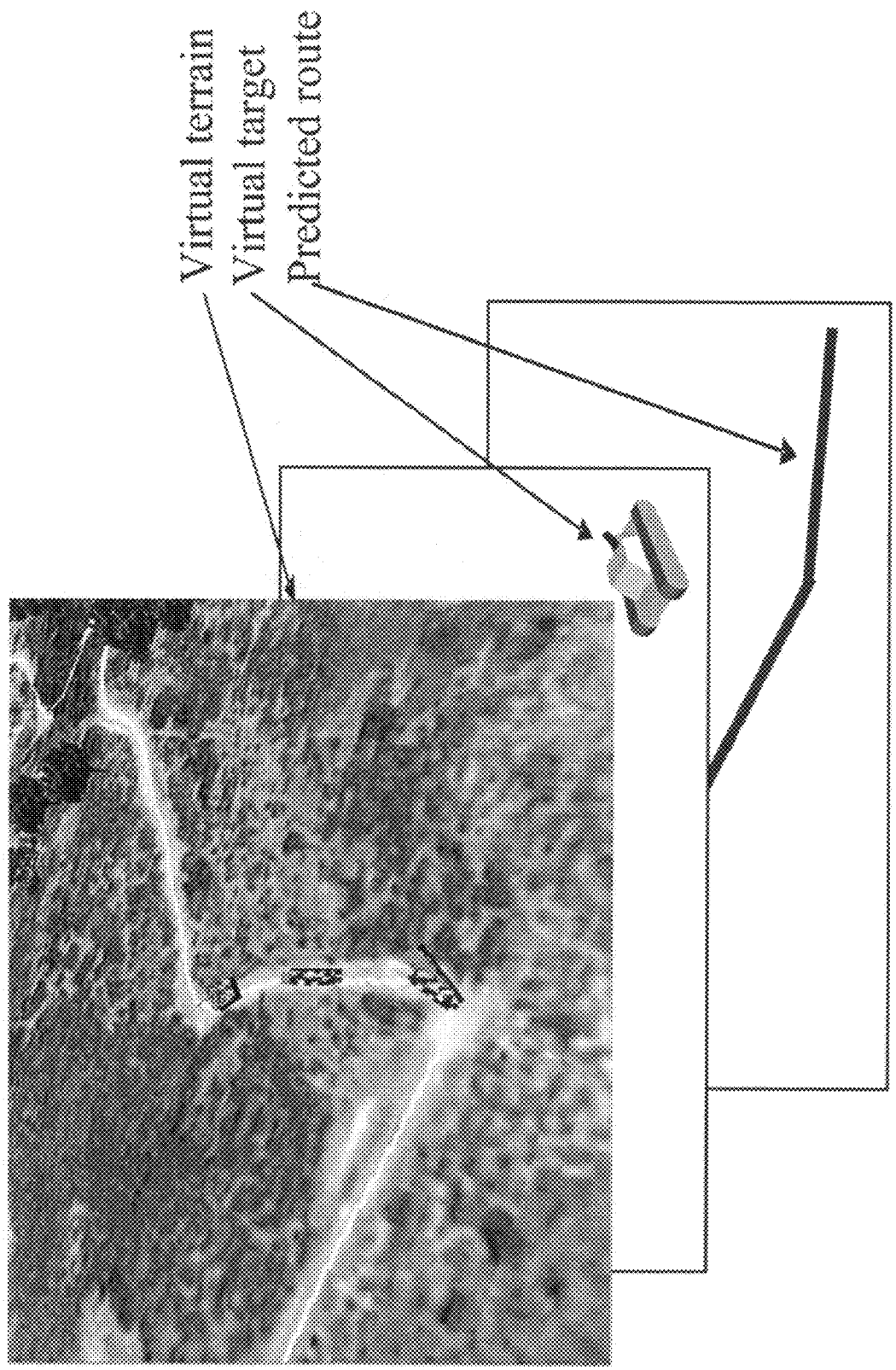
FIG. 13 illustrates three layers model of 4D simulation for moving target prediction.

In order to produce a 4D motion simulation of moving targets and engaging the targets, a three-layer model of 4D simulation is designed to generate a virtual scene of moving targets in a 3D terrain environment. The three-layer model consists of three different simulation data for animation synthesis: (1) the virtual terrain; (2) virtual moving targets, possibly including Vehicle & Weapon Sound Database, and (3) the routes or trajectories from the output of the tracking and prediction algorithms, as shown in FIG. 13.

Figure 14:
FIG. 14 illustrates the initial version for GUI of 3D visualization subsystem of 4D GIS.

One of the most important needs for the final user of a 4D GIS system is easy-to-use and explicit visualization technology which will enable displaying in near real-time all the datasets and manipulate those datasets through the graphical user interface. AGNC have integrated the designed 4D visualization software. As a result the Army users will be able to browse and perform queries of the 4D GIS target tracking and prediction system by means of 3D visualization interface as it is depicted in FIG. 14.

AGNC not only developed system architecture simulation, prediction and visualization, as it is described in the previous sections, but also provided significant foundation by development of 3D geospatial dataset for the ARDEC Picatinny, N.J. facility and it's vicinities. A similar 4D-GIS database was developed for the vicinity of our facility in Simi Valley, Calif. Components used to generate the 4D-GIS databases included: high-resolution aerial images, NED-10 digital elevation data, USGS DOQQs and 1:24000 topographic maps. FIG. 15 shows components used to develop the 4D GIS databases.

At the next step of the databases preparation the 3D buildings were produced by image digitalization and texture extraction for buildings rendering.

The Database developed enables us to visualize and realistically simulate target's trajectory in the geospatial environment. For example, the real car object and the projected path of its predicted movements in a virtual reality environment have been depicted.

For 4D GIS virtual reality visualization AGNC built the realistic geospatial models of the targets from different viewing perspectives and even from the driver cockpit.

Analogously, AGNC is capable to produce the modeling of the flying targets such as helicopters and aerial jets. The front-back and the cockpit views for the helicopter (or helicopter UAV) have been demonstrated. Capabilities of an F15 jet flying in ARDEC's Picatinny area have also been demonstrated.

AGNC's development of the 4D GIS efforts culminated by modeling of a battlefield tactical simulation including snipers and their line of sight modeling, have been demonstrated.

Analogously AGNC modeled the threat dome for the virtual launcher located geospatially at the Picatinny object area have also been demonstrated.

A mission planning virtual battlefield picture is depicted. It includes aerial and land static and moving targets such as tanks.

The major advantage of 4D GIS target, tracking prediction and visualization over the most usual shareware Google Earth based open source developments is the high degree of confidence, security and realism in operation with geospatial and military data. AGNC is confident to claim that a fully functional 4D GIS system will be highly efficient in Army military operations. Furthermore, the technology developed has a great civilian commercial promise.

4D GIS Man Machine Interface

Figure 16:
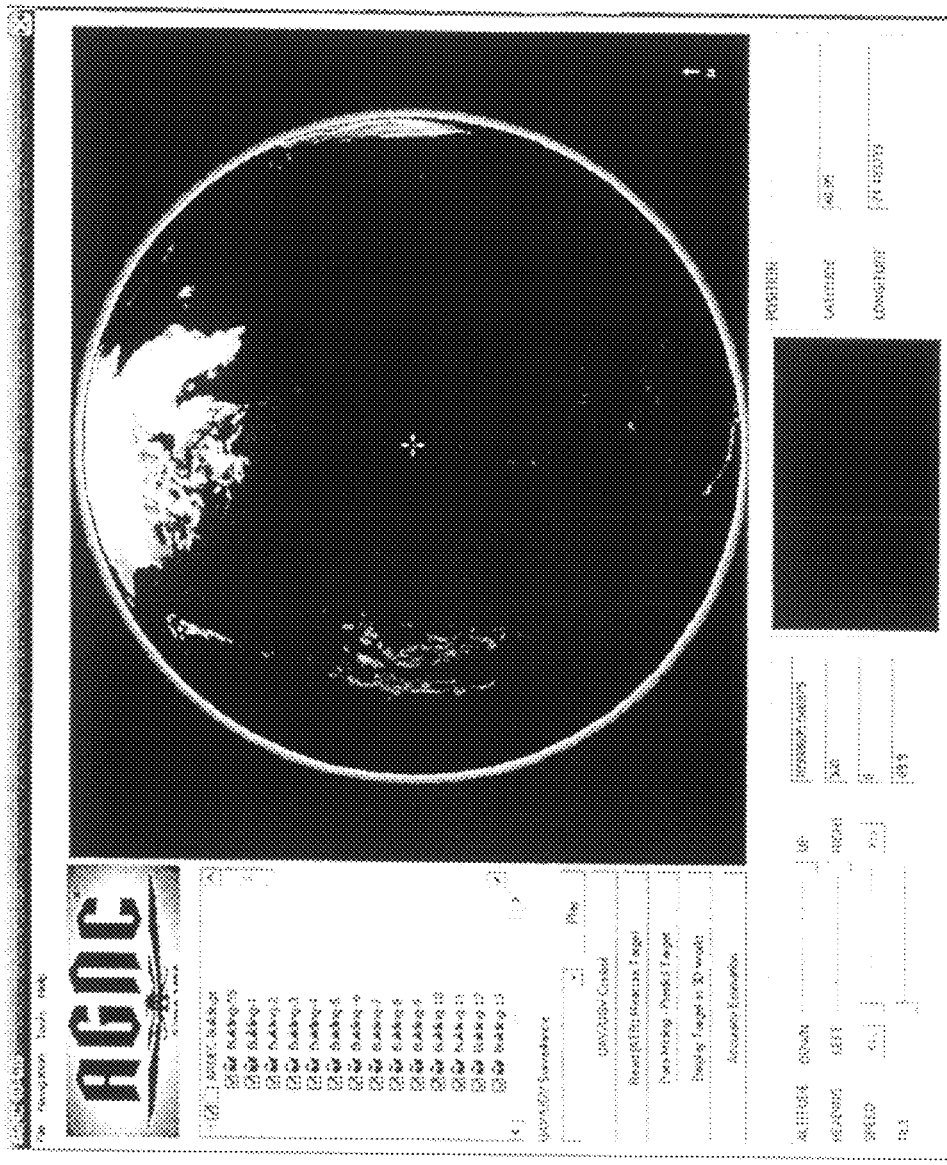
FIG. 16 illustrates the AGNC 4D GIS man-machine interface (initial version).

The principal concept AGNC pursued through this design is the use 4D GIS not only as a visualization tool, but also as a convenient interface for control of the AGNC unmanned robotic system such as the Talon robot and other devices. FIG. 16 shows the design of the new 4D GIS man-machine interface.

Figure 17:
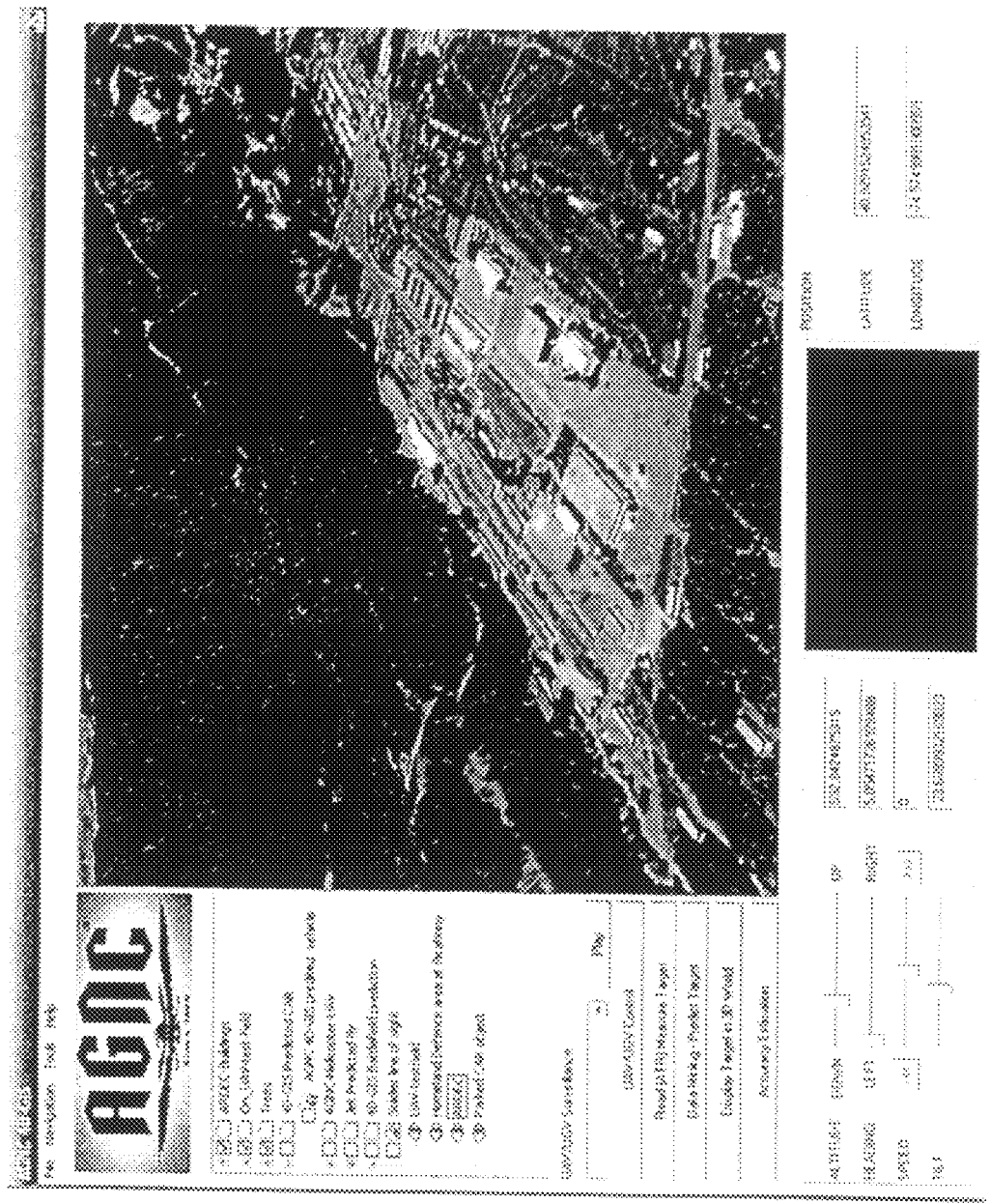
FIG. 17 illustrates the ARDEC dataset visualized in new version of 4D GIS.

FIG. 17 depict ARDEC Picatinny Arsenal, N.J.

UAV test field and tactical events simulations are demonstrated, respectively.

Figure 18:
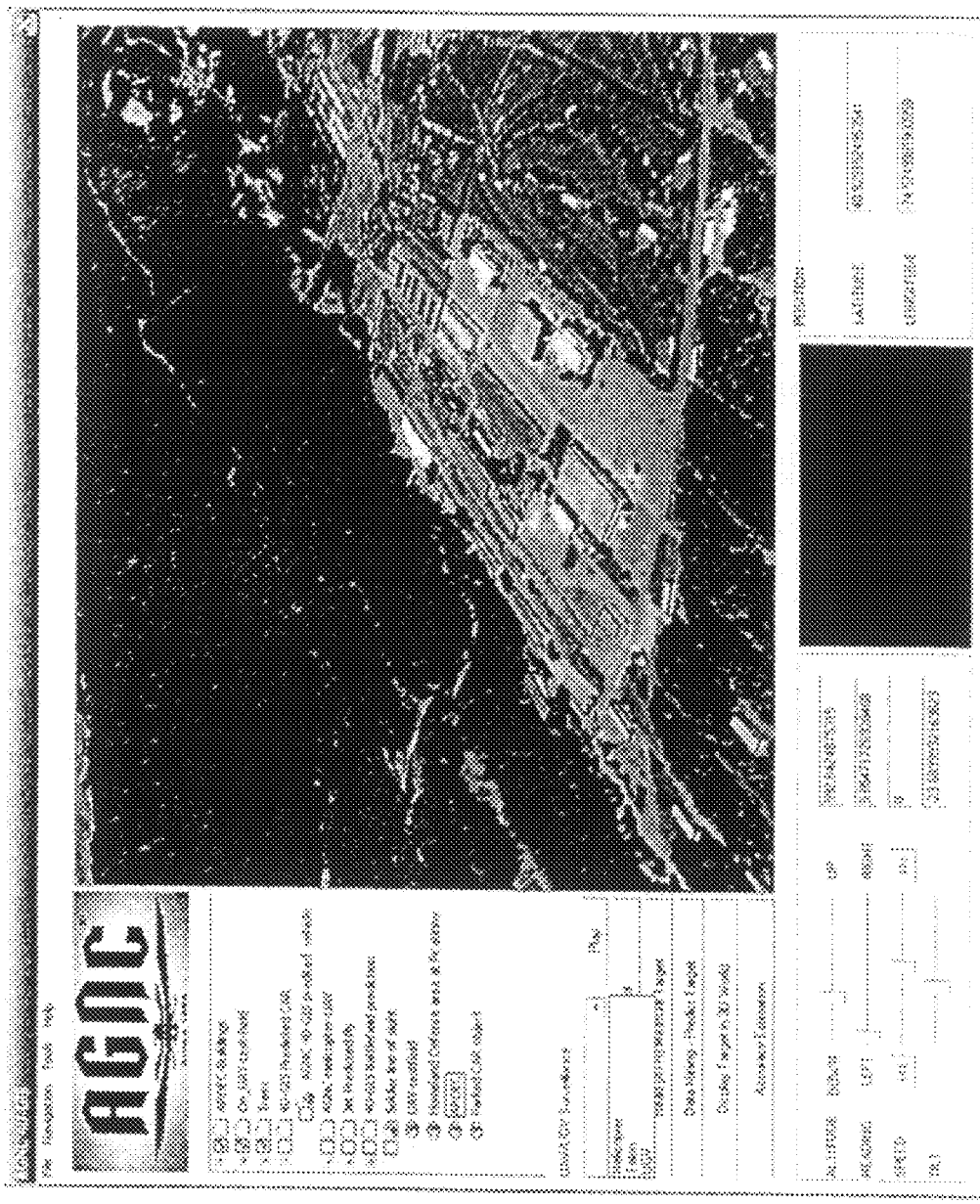
FIG. 18 illustrates the 4D GIS manned and unmanned platform decision support and control tool.

Specific controls for the unmanned robotic system have been demonstrated as shown in FIG. 18.

The development of the manned and unmanned platform tool will enable to switch between robotic platforms and browse their video streams both draped on the 3D terrain model and in a separate (lower central on the figures) window.

We have accomplished:

Development of the software architecture integrating 3D library objects capabilities;

Expand the terrain video sources by different UAV/UGV capabilities including inside building image acquisitions.—To address this requirement AGNC works intensively on in-house and external UAV/UGV video streams and telemetric files. The most important is inclusion of a WMP files format driver into the 4D-GIS system. It opens the capability of video-streams integrating practically on-the-fly.

4D GIS—Sensor Control Tool Integration

Figure 19:
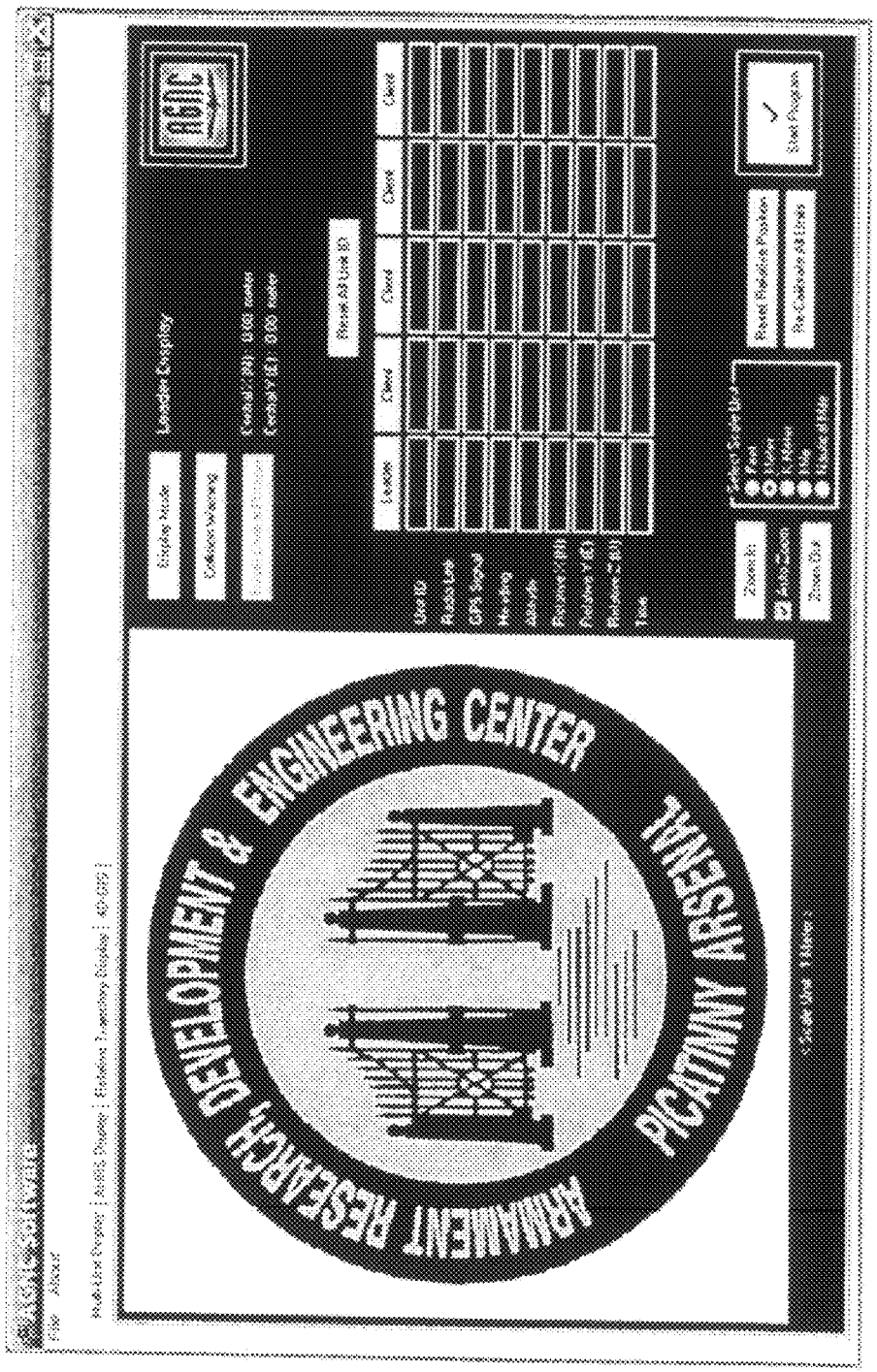
FIG. 19 illustrates the 4D GIS integrated with the AGNC robotic sensor tool.

4D GIS is a convenient environment for providing efficient integration of 3D visualization with robotic sensors control and communication functionalities. FIG. 19 depicts the results of the integrated man machine interface integrating these two AGNC tools.

Figure 20:
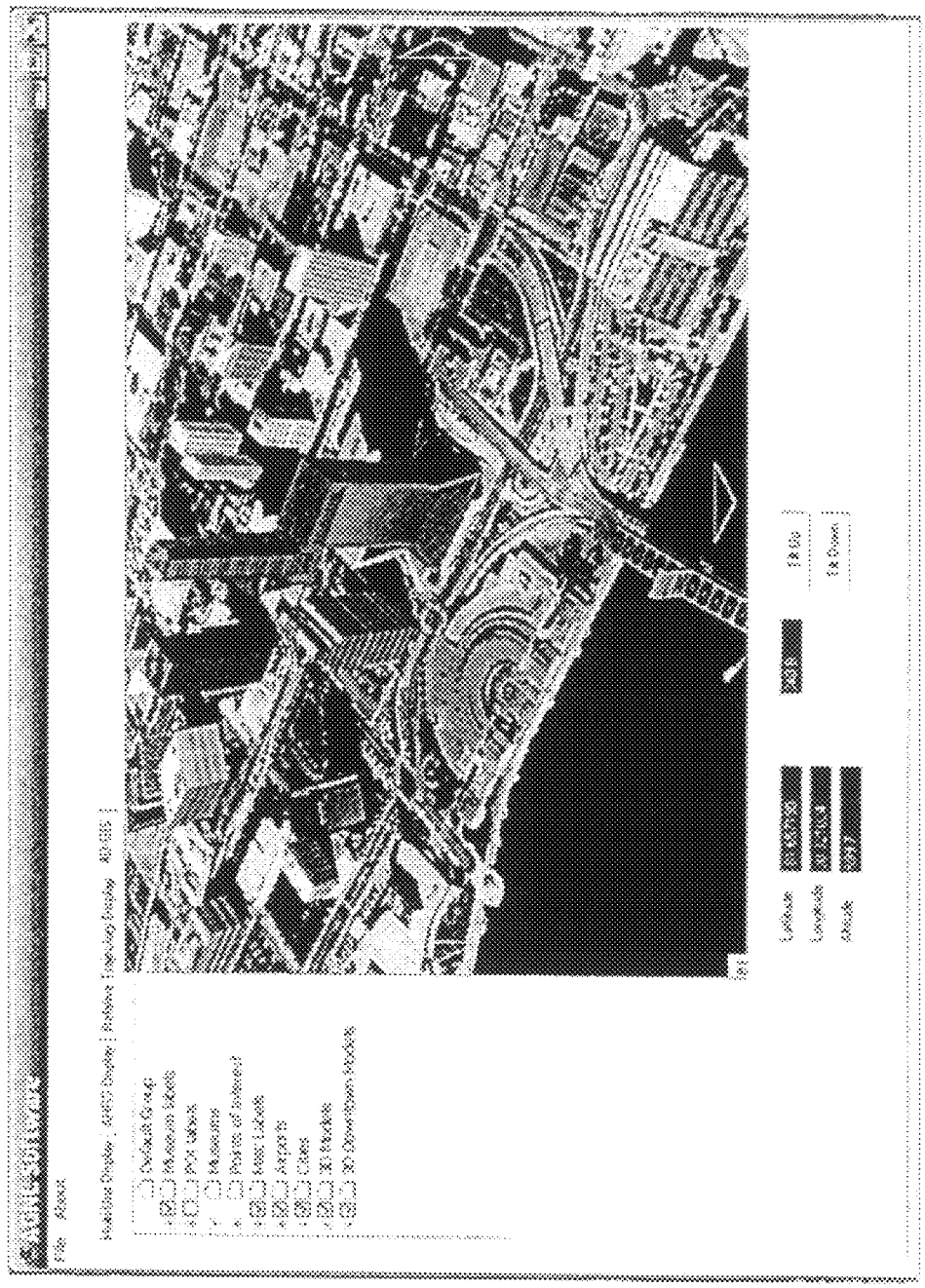
FIG. 20 illustrates the 3D geospatial dataset visualized on integrated AGNC platform.
Figure 21:
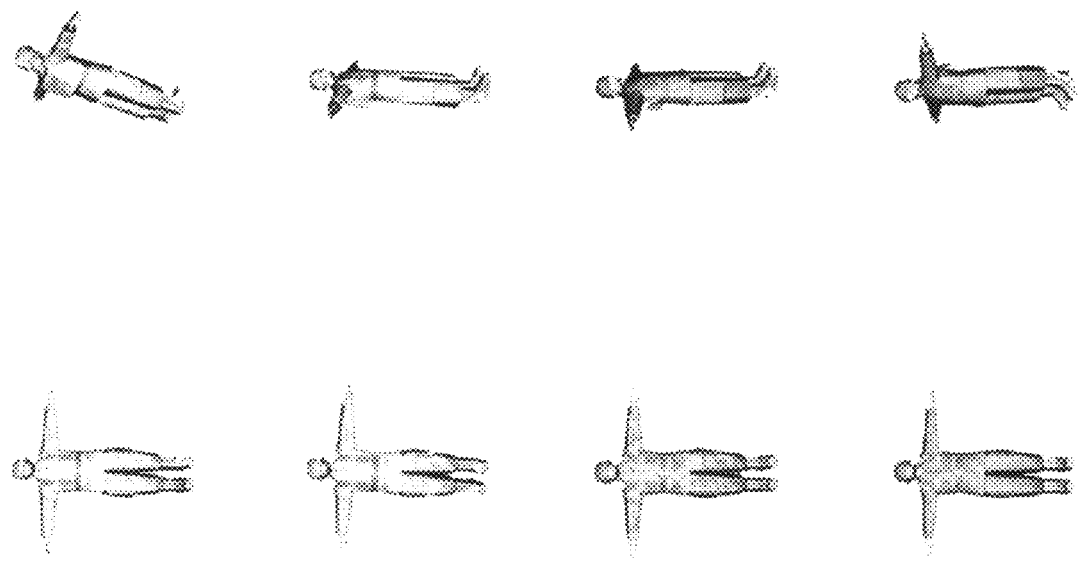
FIG. 21 illustrates the combatant 3D object a) desert uniform; b) desert camouflage; c) green uniform; d) green camouflage.

FIG. 20 illustrates functional capabilities of the 4D GIS integrated with the AGNC sensor robotic tools.

Expanding 4D-GIS Tactical 3D Objects Library

In support of Tactical capabilities decision support 4D-GIS visualization and virtual reality needs to be enriched by various 3D objects types such as: combatants, tanks, military vehicles, airplanes, weapons etc. AGNC started development of such graphical libraries. The figures below are depicting results of this development for the Soldier object type.

Figure 22:
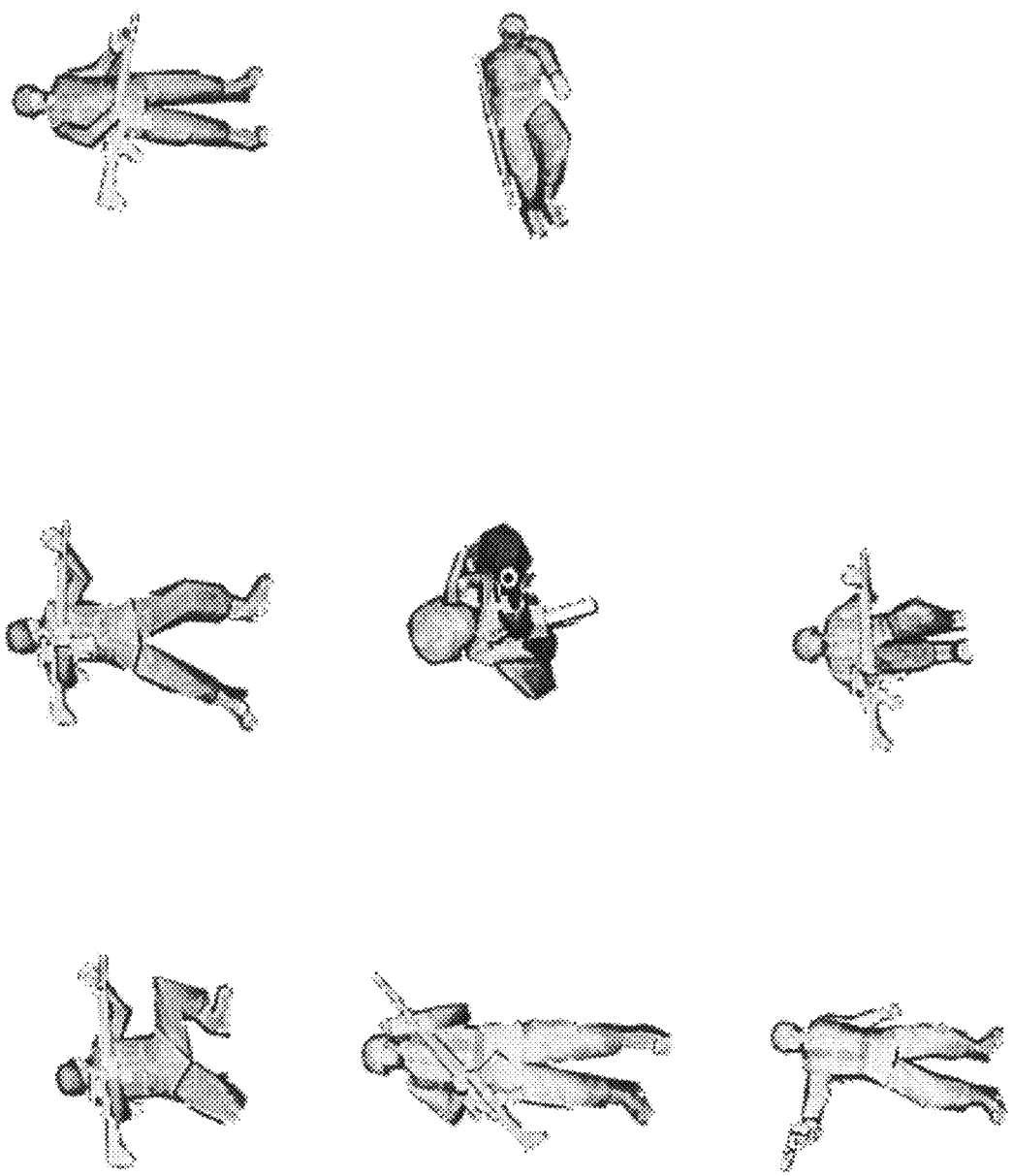
FIG. 22 illustrates combatant objects in different poses for the 4D GIS 3D objects database.

The 4D GIS application scenarios consider deployment of soldiers in different poses. The 4D GIS database contains soldiers at 9 various poses, as depicted in FIG. 22.

Figure 23:
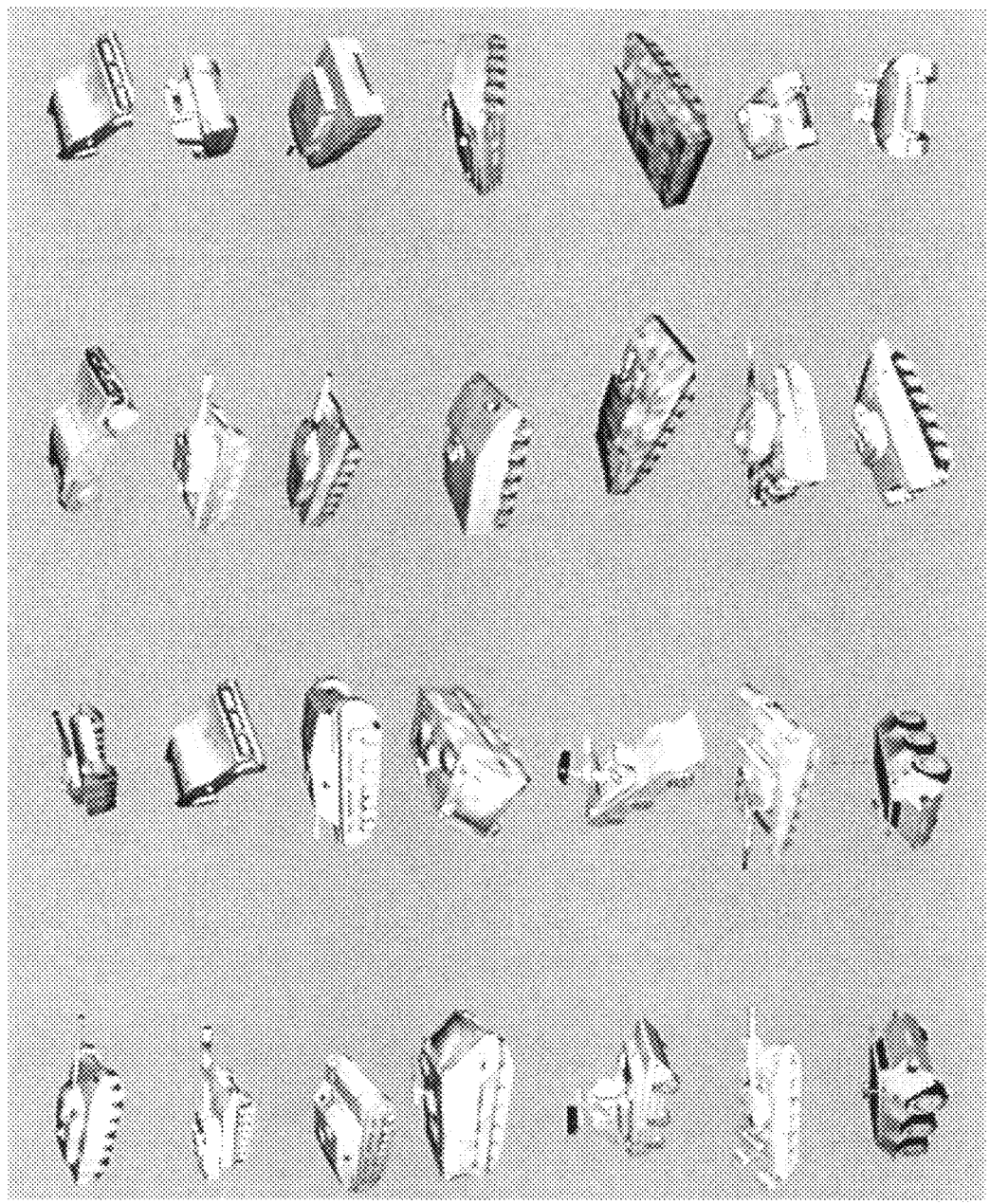
FIG. 23 illustrates tanks and military trucks supported by 4D-GIS 3D dynamic objects database.
Figure 24:
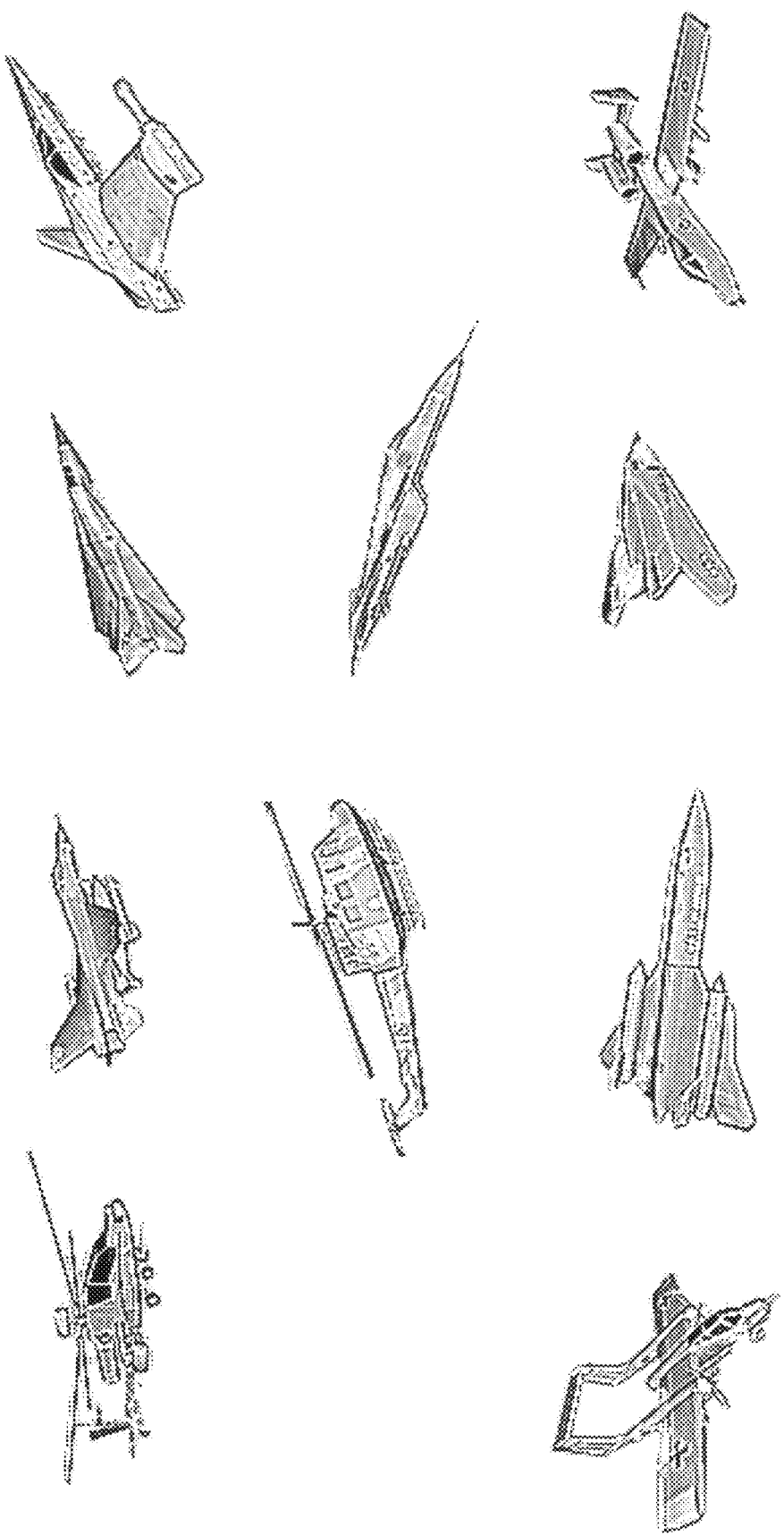
FIG. 24 illustrates military jets and helicopters supported by 4D-GIS 3D dynamic objects database.

The FIG. 23 below depicts results of this development for the Tank and Military trucks object type.

Use of interoperable *.3ds format will make it possible to deploy objects in multiple 4D GIS realistic and virtual application scenarios. Expansion of 4D-GIS 3D objects databases will be continued per ARDEC's request if needed.

4D-GIS System

Figure 25:
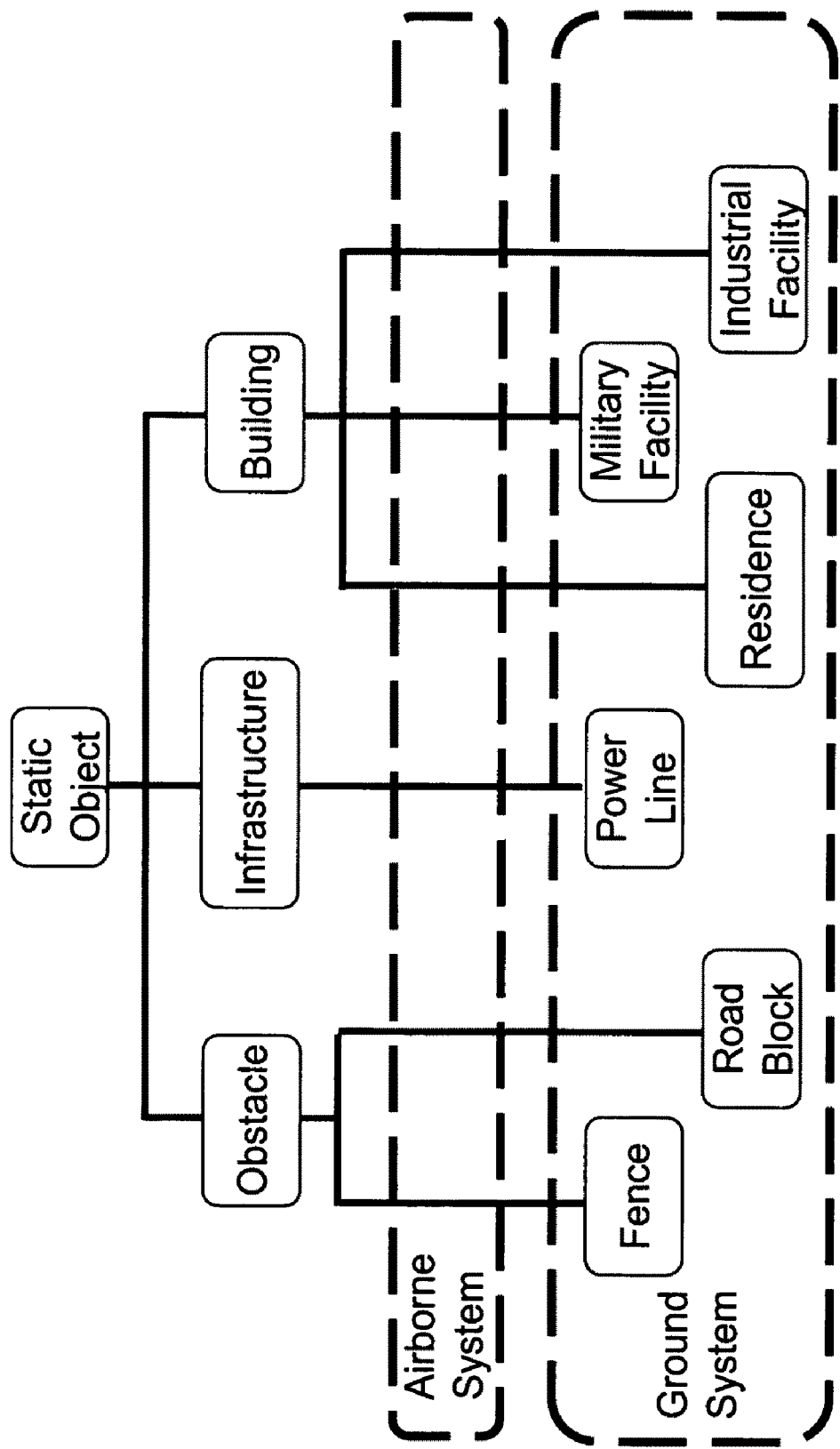
FIG. 25 illustrates the 4D-GIS static objects system architecture.

AGNC developed of the static/dynamic objects hierarchy. Capability to support static/dynamic 3D objects is one of the central 4D-GIS functionalities. This capability should be supported by a certain system architecture organizing objects hierarchy in an efficient way. Initial design of such static objects architecture is depicted on FIG. 25.

Figure 26:
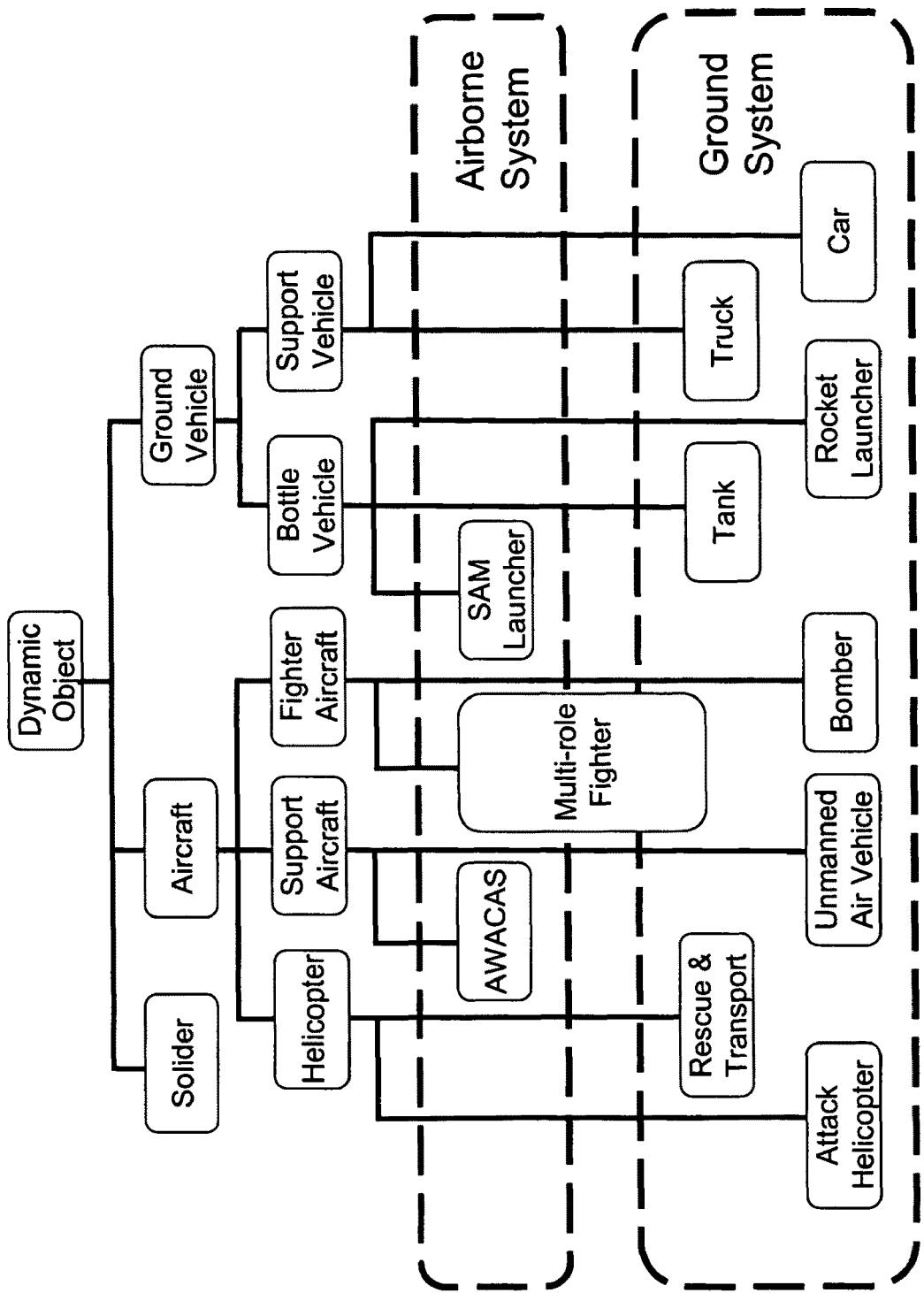
FIG. 26 illustrates 4D-GIS dynamic objects system architecture.

Current state of the dynamic objects architecture development is depicted in FIG. 26.

Conclusion

The important significant breakthrough results and innovations are as follows:

A. Fractal dimension analysis automated technology of the terrain for locating the moving targets through the registration of the moving target indication (MTI) image with a digital map from the GIS system.

B. UAV-based sensor's suite that includes gimbaled cameras, GPS, INS and AGNC proprietary coremicro devices. This sensors suite was successfully applied for targets surveillance experiments and will be optimized in terms of accuracy and performance C. Fuzzy logic reasoning algorithm developed to enhance the prediction of the moving target's trajectory is used to estimate the destination of a moving target through synthesizing data from GIS, target statistics, tactics and other past experience derived information, such as, likely moving direction of targets in correlation with the nature of the terrain and surmised mission.

D. Visualization algorithms for predicting moving targets that combine Virtual Reality (VR) and GIS to provide a virtual environment using 4D simulation and visualization technologies for the representation of the real natural and cultural world.

E. Statistical model based image classifiers, 3D GIS and virtual reality to provide a virtual scenario of moving targets motion prediction and possible aimpoint within the COP.

F. Geospatial reasoning based on spatiotemporal data mining, which will increase the degree of confidence of the target motion prediction processes.

The innovative targeting, prediction and 4D simulation system uses GIS-based algorithms to predict and track moving targets that will optimize and visualize 4D information (3D position plus ID time prediction). The advanced algorithms developed at AGNC utilize new advanced technology, including UAV computer vision based moving target surveillance and tracking, fractal dimension, statistical model based image classifiers, 3D GIS and virtual reality, to provide a virtual scenario of moving targets motion prediction and possible aimpoint within the COP. The innovative system for tracking, prediction and visualization of ground moving targets will find wide applications in the military and civilian sectors. Commercial applications include traffic control and management, aerial vehicle navigation, civilian emergency, law enforcement, firefighting, and environment monitoring.

GIS-based virtual reality for moving targets prediction and tracking plays important roles in ARDEC's CDAS, FCS, FFW, and the Common Operating Picture for targeting system such as AFATDS. This innovative targeting, prediction and 4D simulation system uses GIS-based algorithms to predict and track moving targets that will optimize and visualize 4D information (3D position plus ID time prediction). A computer DEMO System for the 4D simulation of moving target prediction is being demonstrated which can provide a virtual scenario of moving targets motion prediction and possible aimpoint within the COP.

The significant importance of this innovation is as follows:

A. Tracking and Prediction of Moving Targets: the presented system uses a GIS-based positioning algorithm to determine the location of moving targets through registering the terrain image from a Moving Target Indication (MTI) sensor with the digital map from GIS. For motion prediction, the target state is estimated using an Extended Kalman Filter (EKF). In order to enhance the prediction of the moving target's trajectory, a fuzzy logic reasoning algorithm is used to estimate the destination of a moving target through synthesizing data from GIS, target statistics, tactics, and other past experience derived information, such as likely moving direction of targets in correlation with the nature of the terrain and surmised mission. The trajectory prediction of moving targets can be divided into two different types: road-dependent trajectory and road-independent trajectory. Geographical data and vehicle mobility are used in the proposed algorithms for moving target tracking and prediction. The terrain and road knowledge from GIS allow for more reliable motion tracking and prediction. For road-dependent targets, like cars and trucks, a road network is used as a constraint for motion prediction. For other road-independent targets, like tanks, a time-varying adaptive algorithm based on target state, local terrain conditions, and expert knowledge is used for motion speed and direction estimation. Motion trajectories of military vehicles in the battlefield environment follow the dictates of the intended mission task conditioned by the feasibility of their realization dependent on the terrain and potential threats. Empirical models of vehicle motions are of direct relevance to the prediction of vehicle motion. For example, military vehicles often execute their movements in a manner that exploits terrain elevation to prohibit, as much as possible, exposure to potential hostile fire. Operational constraints lead to a blending between the pure dynamic motion extrapolation considerations with those of obstacles avoidance and terrain profiling for maximum possible vehicle concealment. Accounting for the terrain profile is, in turn, also complemented by concerns about vehicle motion limitations induced by factors, such as the maximum safe vehicle tilt angles. It is thus realized that vehicle motion prediction takes into account the baseline vehicle motion patterns, as derived form knowledge and experience, and adjusts any anticipated new motion variations on the basis of the current conditions.

B. UAV Computer Vision based Moving Target Surveillance and Tracking: a UAV computer vision based moving target surveillance and tracking system has been developed for the target detection, tracking and prediction in battlefield surveillance. The UAV computer vision system simulates the human eye-brain using image sensor and artificial intelligence (AI) technology to understand the real world of the battlefield, detect, track and predict moving targets through vision, and then make decisions in attacking the target in practical missions. A sequence of video images contains large amounts of information that can be used for many military applications and civilian applications described above. In addition, computer vision is critical in guidance and navigation of UAVs for the success of autonomous missions.

C. Visualization and 4D Movement Simulation: new methodology and advanced algorithms are developed and established for 3D virtual terrain generation and predicted motion simulation. The main advanced component algorithms include 3D terrain generation and 3D animation synthesis to generate virtual reality of target moving simulation. The 3D virtual terrain is generated from the elevation data of GIS using the ESRI software product ArcView and 3D Analyst. Elevation data, also called the "terrain skin", is a numeric representation that accurately portrays the character of the landscape. This data is an essential element of any database used to develop an accurate virtual environment. ESRI ArcView 3D Analyst supports Triangulated Irregular Networks (TINs). TINs are vector based topologically structured models that have desirable characteristics for representing terrain and other surfaces.

The needs of the FCS program have been met by the development of a GIS-based Virtual Reality for Moving Target Prediction System which can be easily integrated with ARDEC's CDAS for the Future Combat System (FCS) and the Homeland Defense applications. Our integrated moving target prediction and 4D simulation system is not a closed system. It is open to other systems. The target prediction unit and 4D target motion simulation unit can be integrated seamlessly with other combat information systems, including the targeting system AFATDS, ARDEC's CDAS using web services technology through full-secure intranet, for example, ASIPRNET (Army Secure Internet Protocol Routed Network).

The advantages of the integrated 4D GIS robotic control communication platforms include:
  possibility to visualize the robotic platform's position in real-time;
  convenience to setup the robotic platform's position due to the current or predicted tactical situation;
  uniform environment for manipulation with geospatial, real-time sensors delivered data by robotic platforms and predicted data in an operationally simple and efficiently 3D visualized way;
  operational data fusion of all the datasets in an intuitive way based on the geographical location;
  capability to improve operability of 4D GIS prediction based on inclusion of into the prediction processing of data obtained by robotic platforms in real-time This work has wide military and commercial innovative applications.
  This system provides the capability to predict and simulate the targets' motion and the possible aimpoints in a virtual scenario for military applications, such as, FCS, FFW, CDAS and AFATDS systems;
  The GIS-based moving targets prediction and simulation system is directly applicable to the National Automated Highway System programs in which the Department of Transportation (DoT) and Federal Highway Administration (FHWA) are willing to invest their funding to improve safety for future surface transportation.
  Highway transportation systems are faced with soaring demands for highway control and management. The current National Highway System architecture and management is not able to efficiently handle this increase. A smart computer system for highway transportation monitoring, tracking, prediction, visualization and simulation is very helpful to highway transportation management applications.
  Computer-aided decision-making and planning for transportation control and management will become very popular as the information technology is rapidly used in transportation and communications. The seamless integration and links of the motion tracking, prediction, visualization and simulation system with highway information systems and transportation systems can provide smart planning and decisions for automobiles, such as, autonomous navigation, routing planning, autonomous collision avoidance, entertainment, internet access, emergency response, etc.

The 4D GIS system can be integrated with ARDEC's CDAS for FCS, FFW and the COP of AFATDS. Integrated with CDAS, this system provides a virtual environment to enable a single operator to manage the tracking and targeting of multiple moving ground moving targets, such that time critical moving targets may be attacked with both precision guided and non-precision guided munitions with a high probability of success.

Referring to FIGS. 27 to 35, a method and system for pointing and stabilizing a device, which needs to be pointed and stabilized at a determined orientation, according to a preferred embodiment of the present invention is illustrated.

Rapid advance in MEMS technologies makes it possible to fabricate low cost, lightweight, miniaturized size, and low power gyros and accelerometers. "MEMS" stands for "MicroElectroMechanical Systems", or small integrated electrical/mechanical devices. MEMS devices involve creating controllable mechanical and movable structures using IC (Integrated Circuit) technologies. MEMS includes the concepts of integration of Microelectronics and Micromachining. Examples of successful MEMS devices include inkjet-printer cartridges, accelerometers that deploy car airbags, and miniature robots.

Microelectronics, the development of electronic circuitry on silicon chips, is a very well developed and sophisticated technology. Micromachining utilizes process technology developed by the integrated circuit industry to fabricate tiny sensors and actuators on silicon chips. In addition to shrinking the sensor size by several orders of magnitude, integrated electronics can be placed on the same chip, creating an entire system on a chip. This instrument will result in, not only a revolution in conventional military and commercial products, but also new commercial applications that could not have existed without small, inexpensive inertial sensors.

MEMS (MicroElectronicMechanicalSystem) inertial sensors offer tremendous cost, size, reliability improvements for guidance, navigation, and control systems, compared with conventional inertial sensors.

American GNC Corporation (AGNC), Simi Valley, Calif., invented MEMS angular rate sensors and MEMS IMUs (Inertial Measurement Units), referring to US patents, "MicroElectroMechanical System for Measuring Angular Rate", U.S. Pat. No. 6,508,122; "Processing Method for Motion Measurement", U.S. Pat. No. 6,473,713; "Angular Rate Producer with MicroElectroMechanical System Technology", U.S. Pat. No. 6,311,555; "Micro Inertial Measurement Unit", U.S. Pat. No. 6,456,939. Either the micro IMU or the coremicro IMU is "The world's smallest" IMU, and is based on the combination of solid state MicroElectroMechanical Systems (MEMS) inertial sensors and Application Specific Integrated Circuits (ASIC) implementation. The coremicro IMU is a fully self contained motion-sensing unit. It provides angle increments, velocity increments, a time base (sync) in three axes and is capable of withstanding high vibration and acceleration. The coremicro IMU is opening versatile commercial applications, in which conventional IMUs can not be applied. They include land navigation, automobiles, personal handheld navigators, robotics, marine users and unmanned air users, various communication, instrumentation, guidance, navigation, and control applications.

The coremicro IMU makes it possible to build a low-cost, low-weight, and small-size automatic stabilization and pointing control of a device.

It is worth to mention that although the coremicro IMU is preferred for the present invention, the present invention is not limited to the coremicro IMU. Any IMU device with such specifications can be used in the system of the present invention.

Figure 27A:
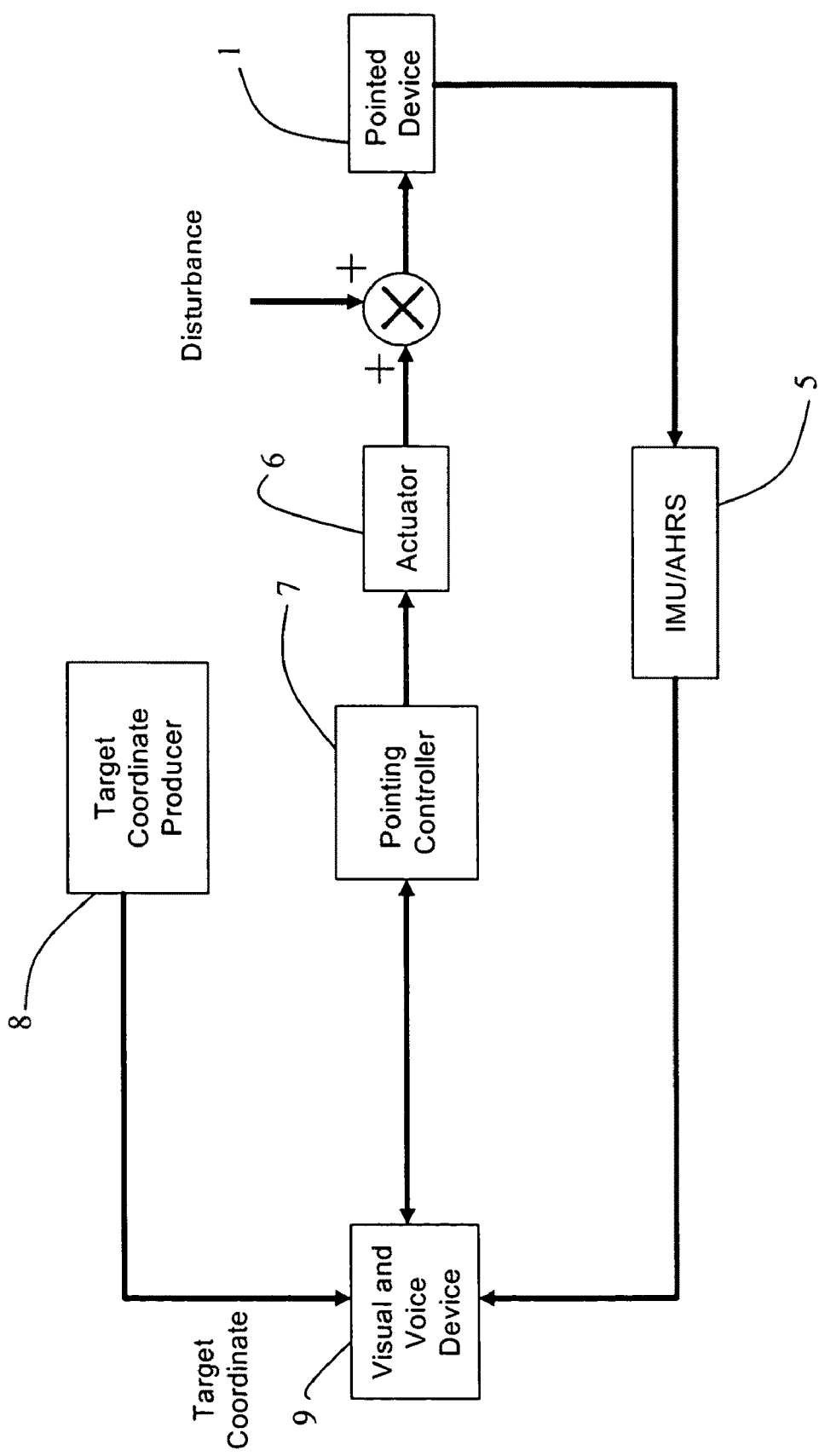
FIG. 27A is a block diagram illustrating the system according a preferred embodiment of the present invention.

Referring to FIG. 27A, the automatic stabilization and pointing control system of the present invention for a device comprises an attitude producer 5, a target coordinate producer 8, a pointing controller 7, an actuator 6, and a visual and voice device 9.

The attitude producer 5 includes an IMU/AHRS (Inertial Measurement Unit/Attitude and Heading Reference System) device or GPS (Global Positioning System) attitude receiver for determining current attitude and attitude rate measurements of a device 1.

The target coordinate producer 8 is adapted for measuring the desired point direction of the device 1 by capturing and tracking a target.

The pointing controller 7 is adapted for computing platform rotation commands to an actuator 6 using the desired pointing direction of the device and the current attitude measurement of the device 1 to rotate the device 1.

The actuator 6 is adapted for rotating the device 1 to the desired pointing direction.

The visual and voice device 9, which can be a hand-held or head-up device or others, is adapted for providing the operator with audio and visual means to improve his/her decision, including displaying the desired pointing direction and current attitude of the device, target trajectory, and producing a voice representing the pointing procedure.

The automatic stabilization and pointing control system of the present invention is a feedback control system. The operator uses the target coordinate producer 8 to capture and track a target to measure the desired point direction of the pointed device 1. The IMU/AHRS 5 is used to measure the current attitude of the pointed device 1. Using errors between the desired point direction and current direction of the pointed device 1, the pointing controller 7 determines platform rotation commands to the actuator 6. The actuator 6 changes the current attitude of the pointed device 1 to bring it into closer correspondence with the desired orientation.

Since arbitrary disturbances and unwanted fluctuations can occur at various points in the system of the present invention, the system of the present invention must be able to reject or filter out these fluctuations and perform its task with the prescribed accuracy, while producing as faithful a representation of the desirable pointing direction as feasible. This function of the filtering and smoothing is achieved by the above mentioned pointing controller with different types of feedback approaches, namely:

(a) Angle position feedback,
(b) Angular rate and acceleration feedback.

Figure 27B:
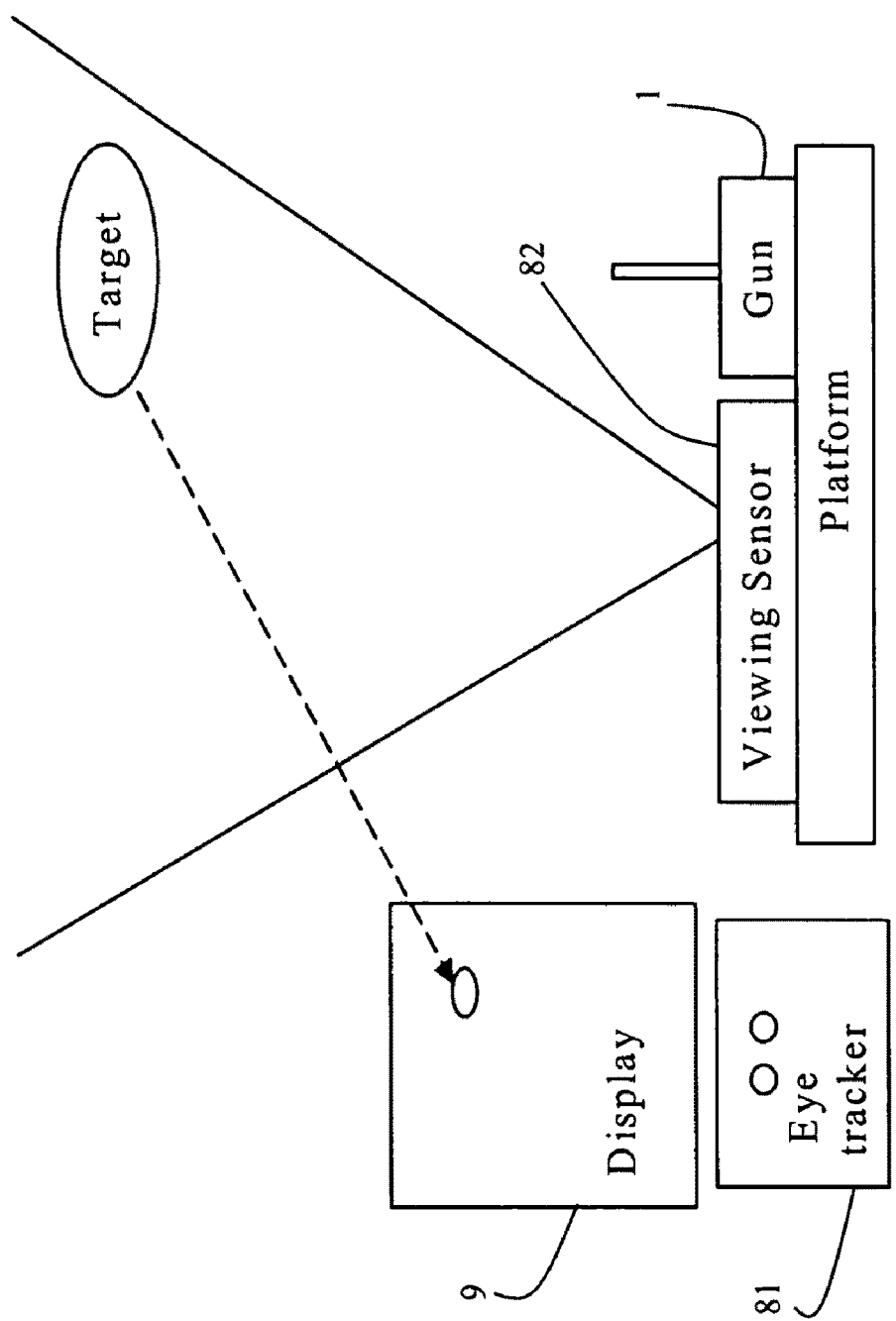
FIG. 27B depicts the Viewing Sensor/Weapon and Operator Display/Eye Tracking of the present invention.

As shown in FIG. 27B the target coordinate producer 8 comprises of eye tracker 81 and viewing sensor 82. The target coordinate producer 8 using eye tracker measuring a desired pointing direction for the remote controlled weapon-firing of said device by capturing and tracking a target comprises a platform on which reside a viewing sensor 82 and a weapon 1 such as a gun, a gun turret, a mortar, an artillery, etc.

There is an operator system that is remotely monitoring the scene on a display as viewed by the viewing sensor. The goal of the operator system is to acquire and track a selected target according to the scanning motion of the eyes of the object and the locking point at a selected target of the eyes. The operator system can therefore subsequently track the target according to the eye motion of an object.

The movement of the object's eyes is followed by a dual camera sensor of the eye tracker 81 that the operator is looking into. This sensor is monitoring the object's eyesight motion while the object simultaneously monitors the external viewing sensor's scene, locking and tracking with his eyesight some selected target.

The goal is to translate the display coordinates of the target, the operator system has selected and is tracking, to point the weapon on the external platform so that the object can fire at the target when he so desires.

The problem is thus summarized as one of controlling the weapon pointing, movement and firing on a target that has been selected and is tracked by the eyes of an operator viewing a display.

The viewing sensor 82 includes an Infrared sensor (IR), RF (Radio Frequency) radar, Laser radar (LADAR), and CCD (Charge Couple Devices) camera, or a multisensor data fusion system. Multisensor data fusion is an evolving technology that is analogous to the cognitive process used by humans to integrate data from their senses (sights, sounds, smells, tastes, and touch) continuously and make inferences about the external world.

Figure 28:
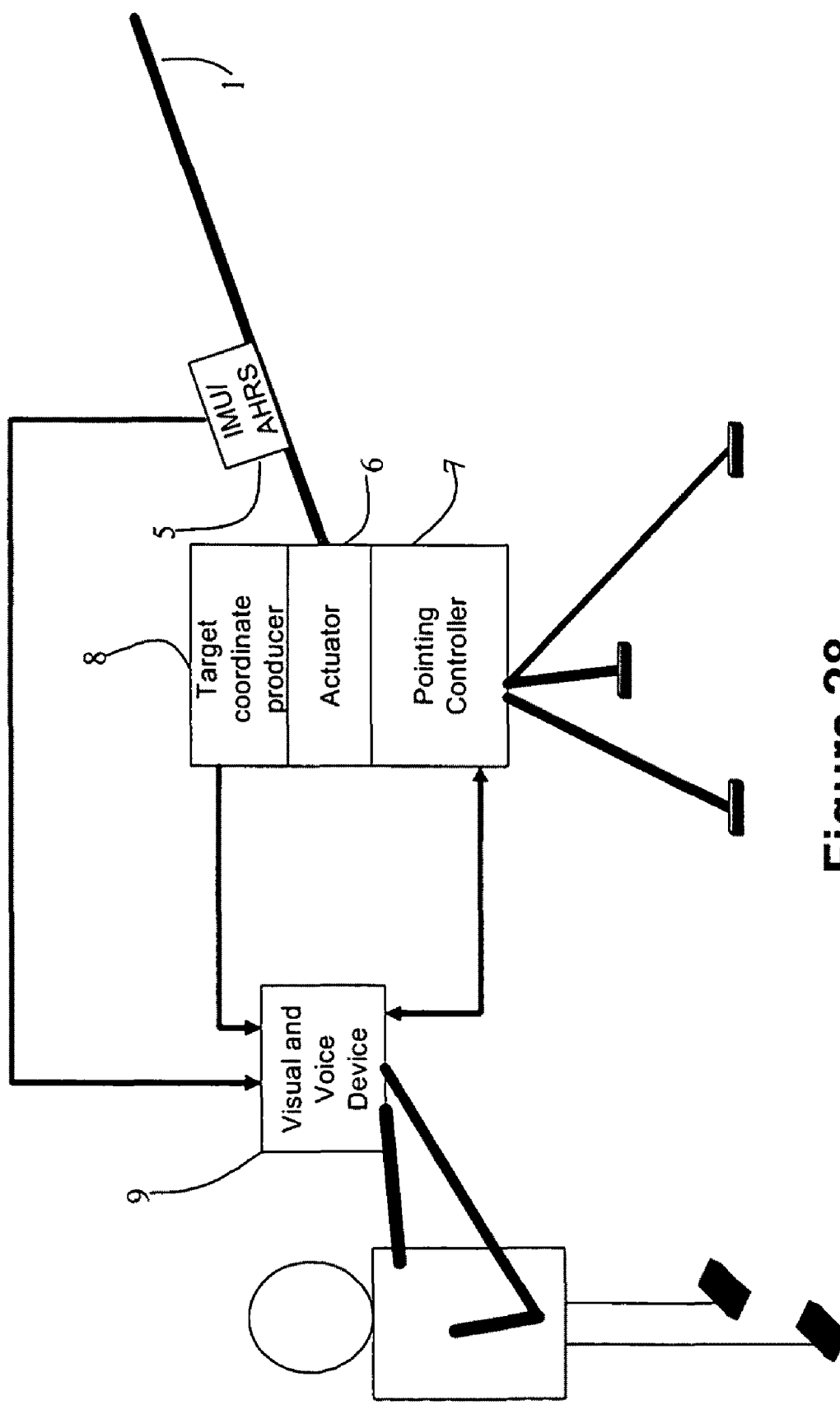
FIG. 28 is a block diagram illustrating the machine gun application according to the above preferred embodiment of the present invention.

In general, the benefit of employing multisensor data fusion system includes:

(1) Robust operational performance
(2) Extended spatial coverage
(3) Extended temporal coverage
(4) Increased confidence
(5) Improved ambiguity
(6) Improved detection performance
(7) Enhanced spatial resolution
(8) Improved system operational reliability In the preferred gun turret smart machine gun application of the present invention, referring to FIG. 28, the user identifies the coordinates of a target by the use of the target coordinate producer 8, including a radar and laser rangefinder. The coordinates of a target are electronically relayed to the pointing controller 7 through the visual and voice device 9. The actuator 6, including a machine gunner, slews the gun barrel boresight toward the precise coordinates of the target so that it is ready to start laying down fire. The visual and voice device 9 shows the location of the target and the pointing procedure. After the user selects the target from the display, the target coordinates are automatically relayed to the pointing controller 7, as well as current attitude of the device 1 from the IMU/AHRS 5. The actuator 6 (the machine gunner) interacts with the pointing controller 7 to implement the fire control mission.

The gun turret smart machine gun application of the present invention is required to perform its missions in the presence of disturbances, parametric uncertainces and malfunctions, and to account for undesired vibrations. The system of the present invention integrates the techniques of signal/image processing, pattern classification, control system modeling, analysis and synthesis. The system of the present invention balances and optimizes tightly coupled signal processing and control strategies, algorithms and procedures.

Figure 29:
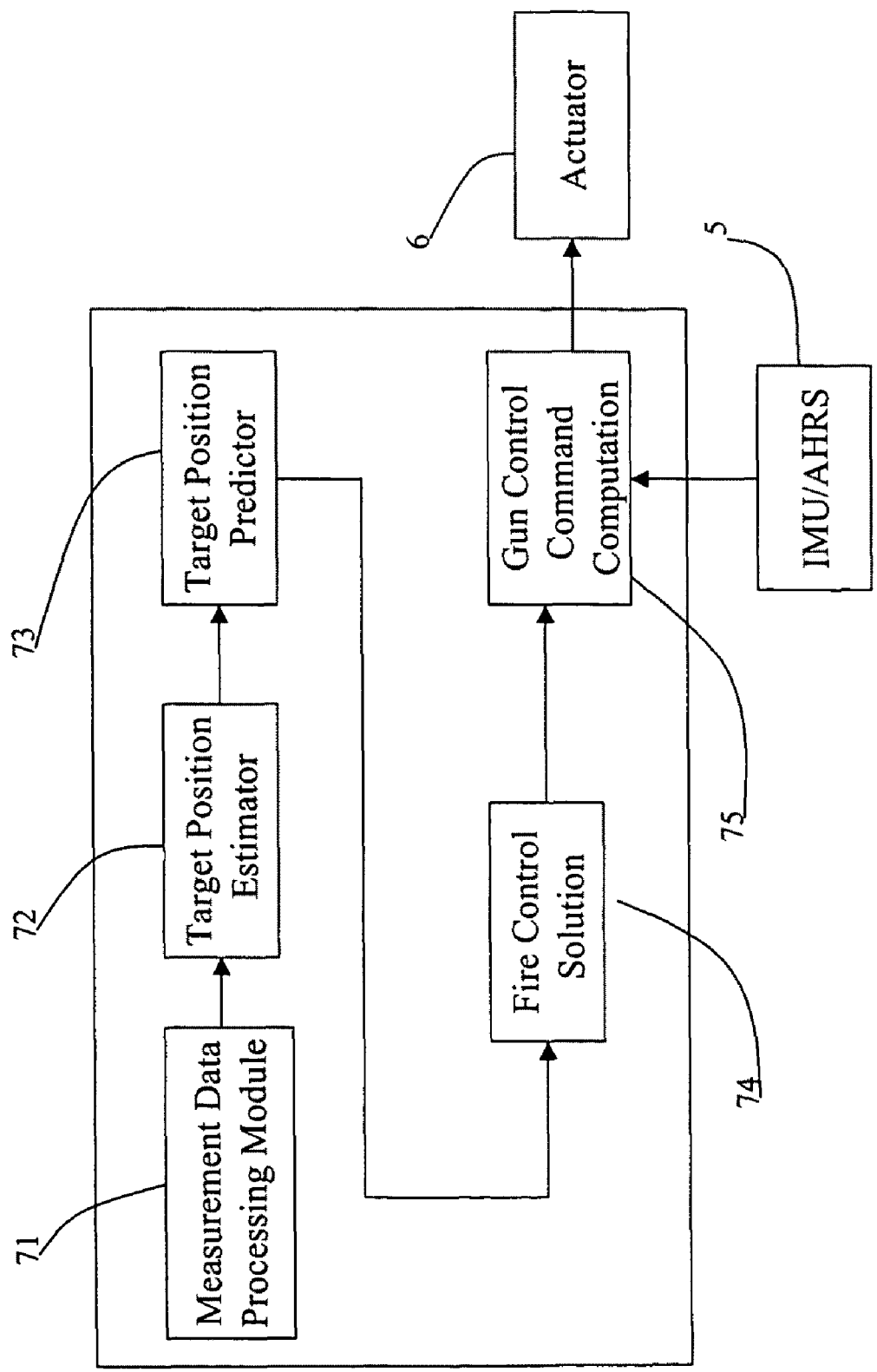
FIG. 29 is a block diagram illustrating the pointing controller in the machine gun application according to the above preferred embodiment of the present invention.

Referring to FIG. 29, the pointing controller 7 further comprises:

a measurement data processing module 71, for transforming the target positioning measurements, measured by the target coordinate producer 8 and corrupted with measurement noise, from the target coordinate producer body coordinates to local level coordinates;

a target position estimator 72, for yielding the current target state including target position estimation using the target positioning measurements;

a target position predictor 73, for predicting the future target trajectory and calculating the interception position and time of a projectile launched by the gun turret and the target;

a fire control solution module 74, for producing the gun turret azimuth and elevation required for launch of the projectile; and a device control command computation module 75, for producing control commands to the actuator 6 using the required gun turret azimuth and elevation and current attitude and attitude rate data of the gun turret 1 from the IMU/AHRS 5 to stabilize and implement the required gun turret azimuth and elevation with disturbance rejection.

Generally, radar measurements include the target range, range rate, azimuth, azimuth rate, elevation and elevation rate. The relationship between the target position and velocity, and the radar measurements can be expressed as:

$$r_m = \sqrt{x_T^2 + y_T^2 + z_T^2} + w_1$$

$$\theta_m = \tan^{-1}\left(\frac{-z_T}{\sqrt{x_T^2 + y_T^2}}\right) + w_2$$

$$\varphi_m = \tan^{-1}\left(\frac{y_T}{x_T}\right) + w_3$$

$$\dot{r}_m = \frac{\dot{x}_T x_T + \dot{y}_T y_T + \dot{z}_T z_T}{\sqrt{x_T^2 + y_T^2 + z_T^2}} + w_4$$

$$\dot{\theta}_m = \frac{z(\dot{x}_T x_T + \dot{y}_T y_T) - \dot{z}(x_T^2 + y_T^2)}{(x_T^2 + y_T^2 + z_T^2)\sqrt{x_T^2 + y_T^2}} + w_5$$

$$\dot{\varphi}_m = \frac{\dot{y}_T x_T - \dot{x}_T y_T}{x_T^2 + y_T^2} + w_6$$

where $(x_T, y_T, z_T)$=real target position;
$(\dot{x}_T, \dot{y}_T, \dot{z}_T)$=real target velocity;
$(r_m, \dot{r}_m)$=measured target line of sight (LOS) range and range rate;
$(\theta_m, \dot{\theta}_m)$=measured target LOS elevation and elevation rate;
$(\varphi_m, \dot{\varphi}_m)$=measured target LOS azimuth and azimuth rate;

The radar measurements are expressed in radar antenna coordinates. The target position estimator 72 is embodied as a Kalman filter 72. In order to simplify the software design of the Kalman filter 72, the radar measurements are transferred back into local level orthogonal coordinates. The measurement data processing module 71 maps nonlinearly the radar measurements presented in radar antenna coordinates into those presented in the local level orthogonal coordinates. The relationship between the input and output of the measurement data processing module 71 are:

$$x_{mT} = r_m \cos(\theta_m)\cos(\varphi_m)$$

$$y_{mT} = r_m \cos(\theta_m)\sin(\varphi_m)$$

$$z_{mT} = r_m \sin(\varphi_m)$$

$$\dot{x}_{mT} = \dot{r}_m \cos(\theta_m)\cos(\varphi_m) - r_m \sin(\theta_m)\dot{\theta}_m - r_m \cos(\theta_m)\sin(\varphi_m)\dot{\varphi}_m$$

$$\dot{y}_{mT} = \dot{r}_m \cos(\theta_m)\sin(\varphi_m) - r_m \cos(\theta_m)\sin(\varphi_m)\dot{\theta}_m + r_m \cos(\theta_m)\cos(\varphi_m)\dot{\varphi}_m$$

$$\dot{z}_{mT} = -\dot{r}_m \sin\theta_m - r_m \cos(\theta_m)\dot{\theta}_m$$

where $(x_{mT}, y_{mT}, z_{mT})$=transformed target position measurement;
$(\dot{x}_{mT}, \dot{y}_{mT}, \dot{z}_{mT})$=transformed target velocity;

For a successful engagement, the future target trajectory needs to be predicted accurately. Then the intercept position and time can be solved rapidly in terms of predicted target trajectory and the projectile flight dynamics. The inputs to the target position predictor 73 are the currently estimated target states, including target position and velocity, from the target position estimator 72, while the outputs the target position predictor 73 are the predicted intercept and intercept time.

Figure 30:
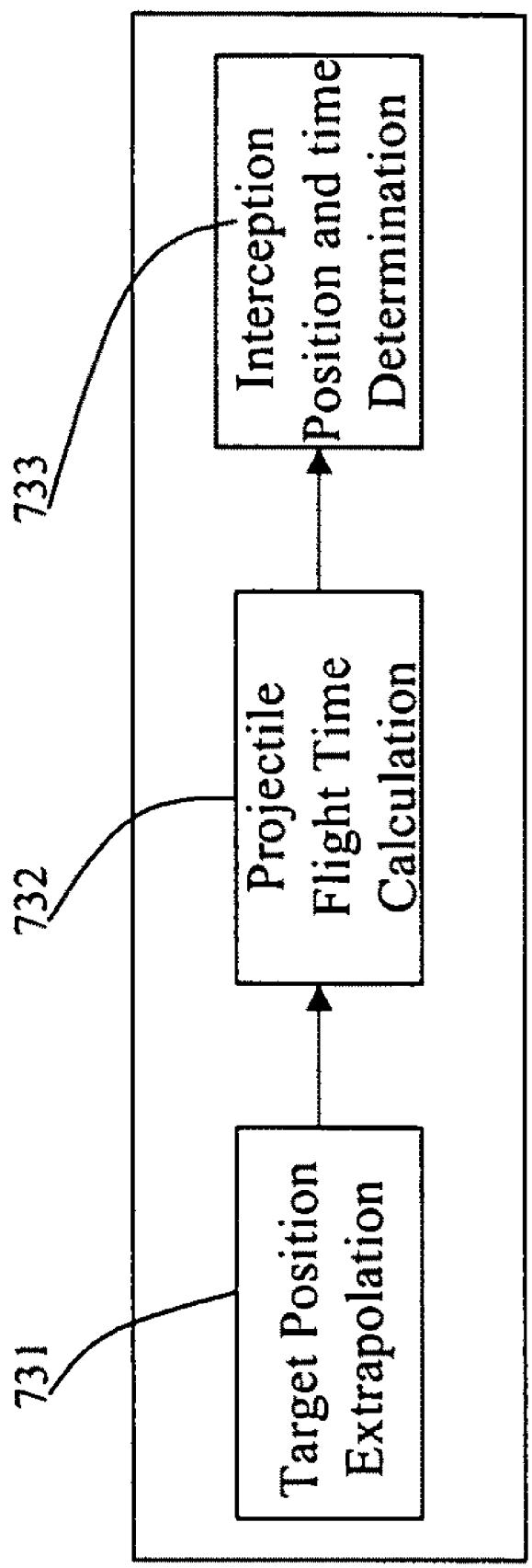
FIG. 30 is a block diagram illustrating the target position predictor according to the above preferred embodiment of the present invention.

Referring to FIG. 30, the target position predictor 73 further comprises a target position extrapolation module 731, a projectile flight time calculation 732, and an interception position and time determination 733.

The target position extrapolation module 731 is adapted for extrapolating the future trajectory of the projectile using the current target state including the target position estimation and system dynamic matrix:

$$X(t_{k+j}) = \Phi X(t_{k+j-1})$$

where $X(t_k)$ is the current target state estimating from the target position estimator 72. $X(t_{k+j})$ is predicted target state vector at time $t_{k+j} = t_k + \delta t * j$, where $\delta t$ is chosen much less than the Kalman filtering step $\delta T = t_{k+1} - t_k$.

The projectile flight time calculation module 732 is adapted for computing the time of the projectile to fly from the gun turret to the interception position. As a preliminary design of the projectile flight time calculation module 732, the projectile flight time is approximately calculated by the LOS distance divided by a constant projectile speed.

The interception position and time determination module 733 is adapted for computing the interception position and time using the predicted future projectile trajectory and projectile flight time. Once the predicted target trajectory is determined, the time $t_1$ for the projectile to fly from the gun turret to each point of the predicted target trajectory and the time $t_2$ for the target to fly to the point can be calculated. Then the interception position can be determined, since for the interception point, the time $t_1$ should be equal to the time $t_2$.

The fire control solution module 74 gives the required gun turret azimuth and elevation by means of the given interception time and position from the target position predictor 72. Once the interception position is known, the gun tip elevation and azimuth can be accurately determined by using the fire control solution algorithms. The desired device tip azimuth $\varphi_{gun}^d$ and elevation $\theta_{gun}^d$ are calculated by $$\varphi_{gun}^d = \tan^{-1}\left(\frac{y_{TP}}{x_{TP}}\right)$$

$$\theta_{gun}^d = \tan^{-1}\left(\frac{-z_{TP}}{\sqrt{x_{TP}^2 + y_{TP}^2}}\right)$$

where $(x_{mT}, y_{mT}, z_{mT})$=the predicted interception position.

The device control command computation module 75 computes the platform rotation commands to the actuator 6 using the desired device tip azimuth and the elevation from the fire control solution module and the current attitude and attitude rate data from the IMU/AHRS 5 to place the gun tip to the desired position and stabilize the gun tip at the desired position with any disturbance rejection.

The device control command computation module 75 is a digital controller and definitely essential to isolate the gun turret from vibrations while maintaining precision stabilization and pointing performance.

As a preferred embodiment of the visual and voice device 9, the visual and voice device 9 is designed to display the target of the field of view of the gun turret motion, the projectile and target flight trajectories during the interception process.

Referring to FIGS. 27 to 30, the automatic stabilization and pointing control method according to the above preferred embodiment of the present invention comprises the steps of:

(1) identifying a desired pointing direction of a device by providing coordinates of a target by a means, including a target coordinate producer 8;

(2) determining a current attitude measurement of the device by a means, including an inertial measurement unit;

(3) computing platform rotation commands of the device using the desired pointing direction of the device and the current attitude measurements of the device by a means, including a pointing controller 7;

(4) rotating the device to the desired pointing direction by a means, including an actuator 6.

(5) visualizing the targets and desired pointing direction and current direction of the device; and (6) producing a voice representing the pointing procedure.

According to the preferred embodiment of the present invention, the step (3) further comprises the steps of, 3.1 transforming the target positioning measurements, measured by the target coordinate producer 8 and corrupted with measurement noise, from the target coordinate producer body coordinates to local level coordinates;

3.2 yielding the current target state including target position estimation using target positioning measurements measured by the target coordinate producer 8;

3.3 predicting the future target trajectory and calculating interception position and time of a projectile launched by the gun turret and the target;

3.4 producing gun turret azimuth and elevation required for launch of the projectile; and 3.5 producing control commands to the actuator using the gun turret azimuth and elevation and the current attitude and attitude rate data of the gun turret from the IMU/AHRS to stabilize and implement the gun turret azimuth and elevation with disturbance rejection.

Also, the step (3.3) further comprises the steps of:

3.3.1 extrapolating the future trajectory of the projectile using the current target state, including the current target position estimation and system dynamic matrix;

3.3.2 computing time of the projectile to fly from the gun turret to interception position; and 3.3.3 computing interception position and time using the predicted future projectile trajectory and projectile flight time.

The preferred IMU/AHRS 5 is a micro MEMS IMU in which a position and attitude processor is built in. The IMU/AHRS 5 is disclosed as follows.

Generally, an inertial measurement unit (IMU) is employed to determine the motion of a carrier. In principle, an inertial measurement unit relies on three orthogonally mounted inertial angular rate producers and three orthogonally mounted acceleration producers to obtain three-axis angular rate and acceleration measurement signals. The three orthogonally mounted inertial angular rate producers and three orthogonally mounted acceleration producers with additional supporting mechanical structure and electronic devices are conventionally called an Inertial Measurement Unit (IMU). The conventional IMUs may be cataloged into Platform IMU and Strapdown IMU.

In the platform IMU, angular rate producers and acceleration producers are installed on a stabilized platform. Attitude measurements can be directly picked off from the platform structure. But attitude rate measurements can not be directly obtained from the platform. Moreover, there are highly accurate feedback control loops associated with the platform.

Compared with the platform IMU, in the strapdown IMU, angular rate producers and acceleration producers are directly strapped down with the carrier and move with the carrier. The output signals of the strapdown rate producers and acceleration producers are expressed in the carrier body frame. The attitude and attitude rate measurements can be obtained by means of a series of computations.

A conventional IMU uses a variety of inertial angular rate producers and acceleration producers. Conventional inertial angular rate producers include iron spinning wheel gyros and optical gyros, such as Floated Integrating Gyros (FIG), Dynamically Tuned Gyros (DTG), Ring Laser Gyros (RLG), Fiber-Optic Gyros (FOG), Electrostatic Gyros (ESG), Josephson Junction Gyros (JJG), Hemisperical Resonating Gyros (HRG), etc. Conventional acceleration producers include Pulsed Integrating Pendulous Accelerometer (PIPA), Pendulous Integrating Gyro Accelerometer (PIGA), etc.

The processing method, mechanical supporting structures, and electronic circuitry of conventional IMUs vary with the type of gyros and accelerometers employed in the IMUs. Because conventional gyros and accelerometers have a large size, high power consumption, and moving mass, complex feedback control loops are required to obtain stable motion measurements. For example, dynamic-tuned gyros and accelerometers need force-rebalance loops to create a moving mass idle position. There are often pulse modulation force-rebalance circuits associated with dynamic-tuned gyros and accelerometer based IMUs. Therefore, conventional IMUs commonly have the following features:

1. High cost,
2. Large bulk (volume, mass, large weight),
3. High power consumption,
4. Limited lifetime, and
5. Long turn-on time.

These present deficiencies of conventional IMUs prohibit them from use in the emerging commercial applications, such as phased array antennas for mobile communications, automotive navigation, and handheld equipment.

New horizons are opening up for inertial sensor device technologies. MEMS (MicroElectronicMechanicalSystem) inertial sensors offer tremendous cost, size, and reliability improvements for guidance, navigation, and control systems, compared with conventional inertial sensors.

MEMS, or, as stated more simply, micromachines, are considered as the next logical step in the silicon revolution. It is believed that this coming step will be different, and more important than simply packing more transistors onto silicon. The hallmark of the next thirty years of the silicon revolution will be the incorporation of new types of functionality onto the chip structures, which will enable the chip to, not only think, but to sense, act, and communicate as well.

Prolific MEMS angular rate sensor approaches have been developed to meet the need for inexpensive yet reliable angular rate sensors in fields ranging from automotive to consumer electronics. Single input axis MEMS angular rate sensors are based on either translational resonance, such as tuning forks, or structural mode resonance, such as vibrating rings. Moreover, dual input axis MEMS angular rate sensors may be based on angular resonance of a rotating rigid rotor suspended by torsional springs. Current MEMS angular rate sensors are primarily based on an electronically-driven tuning fork method.

More accurate MEMS accelerometers are the force rebalance type that use closed-loop capacitive sensing and electrostatic forcing. Draper's micromechnical accelerometer is a typical example, where the accelerometer is a monolithic silicon structure consisting of a torsional pendulum with capacitive readout and electrostatic torquer. Analog Device's MEMS accelerometer has an integrated polysilicon capacitive structure fabricated with on-chip BiMOS process to include a precision voltage reference, local oscillators, amplifiers, demodulators, force rebalance loop and self-test functions.

Although the MEMS angular rate sensors and MEMS accelerometers are available commercially and have achieved micro chip-size and low power consumption, however, there is not yet available high performance, small size, and low power consumption IMUs.

Currently, MEMS exploits the existing microelectronics infrastructure to create complex machines with micron feature sizes. These machines can have many functions, including sensing, communication, and actuation. Extensive applications for these devices exist in a wide variety of commercial systems.

The difficulties for building a micro IMU is the achievement of the following hallmark using existing low cost and low accuracy angular rate sensors and accelerometers:

1. Low cost,
2. Micro size
3. Lightweight
4. Low power consumption
5. No wear/extended lifetime
6. Instant turn-on
7. Large dynamic range
8. High sensitivity
9. High stability
10. High accuracy To achieve the high degree of performance mentioned above, a number of problems need to be addressed:

(1) Micro-size angular rate sensors and accelerometers need to be obtained. Currently, the best candidate angular rate sensor and accelerometer to meet the micro size are MEMS angular rate sensors and MEMS accelerometers.

(2) Associated mechanical structures need to be designed.

(3) Associated electronic circuitry needs to be designed.

(4) Associated thermal requirements design need to be met to compensate the MEMS sensor's thermal effects.

(5) The size and power of the associated electronic circuitry needs to be reduced.

The micro inertial measurement unit of the present invention is preferred to employ with the angular rate producer, such as MEMS angular rate device array or gyro array, that provides three-axis angular rate measurement signals of a carrier, and the acceleration producer, such as MEMS acceleration device array or accelerometer array, that provides three-axis acceleration measurement signals of the carrier, wherein the motion measurements of the carrier, such as attitude and heading angles, are achieved by means of processing procedures of the three-axis angular rate measurement signals from the angular rate producer and the three-axis acceleration measurement signals from the acceleration producer.

In the present invention, output signals of the angular rate producer and acceleration producer are processed to obtain digital highly accurate angular rate increment and velocity increment measurements of the carrier, and are further processed to obtain highly accurate position, velocity, attitude and heading measurements of the carrier under dynamic environments.

Figure 31:
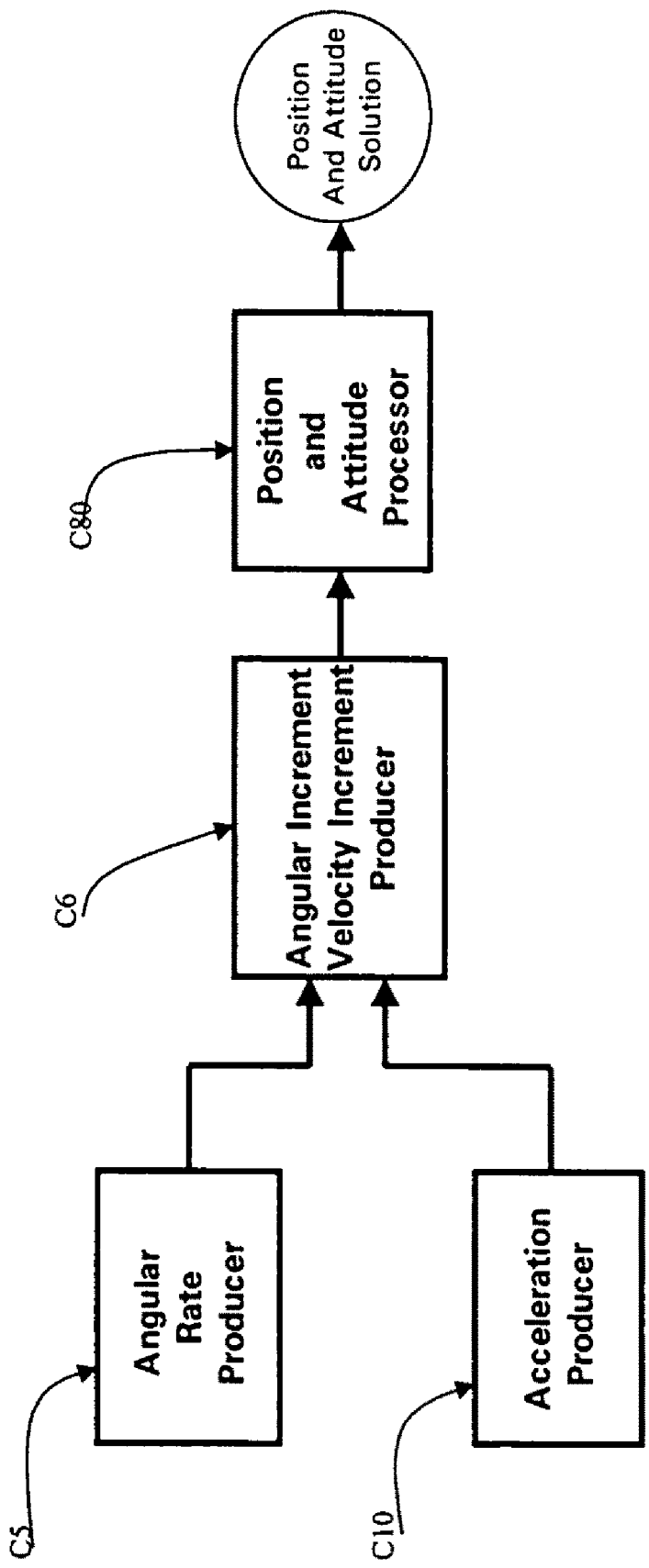
FIG. 31 is a block diagram illustrating the processing module for a micro inertial measurement unit according to a preferred embodiment of the present invention.

Referring to FIG. 31, the micro inertial measurement unit of the present invention comprises an angular rate producer c5 for producing three-axis (X axis, Y axis and Z axis) angular rate signals; an acceleration producer c10 for producing three-axis (X-axis, Y axis and Z axis) acceleration signals; and an angular increment and velocity increment producer c6 for converting the three-axis angular rate signals into digital angular increments and for converting the input three-axis acceleration signals into digital velocity increments.

Moreover, a position and attitude processor c80 is adapted to further connect with the micro IMU of the present invention to compute position, attitude and heading angle measurements using the three-axis digital angular increments and three-axis velocity increments to provide a user with a rich motion measurement to meet diverse needs.

The position, attitude and heading processor c80 further comprises two optional running modules:

(1) Attitude and Heading Module c81, producing attitude and heading angle only; and (2) Position, Velocity, Attitude, and Heading Module c82, producing position, velocity, and attitude angles.

Referring to FIG. 31, the digital three-axis angular increment voltage values or real values and three-axis digital velocity increment voltage values or real values are produced and outputted from the angular increment and velocity increment producer c6.

Figure 32:
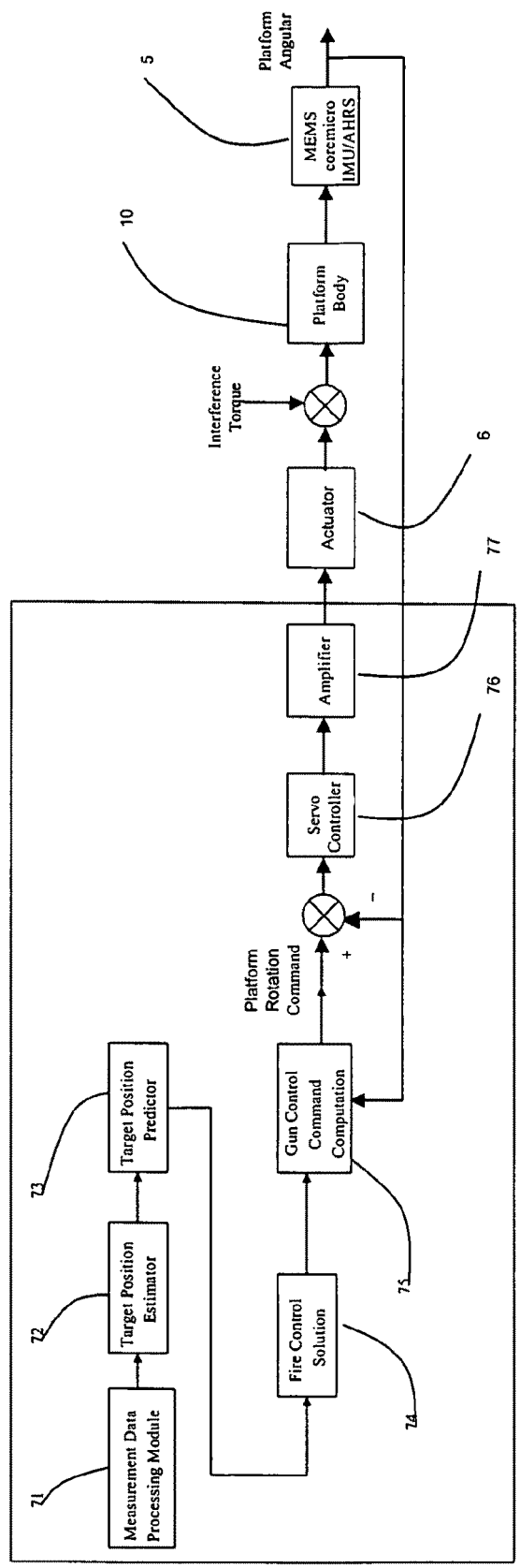
FIG. 32 depicts the operational principle of the Method and System for Automatic Stabilization and Pointing Control of a Device.

FIG. 32 is another embodiment of the detailed block diagram of System for Automatic Stabilization and Pointing Control of a Device in which the pointed device 1 in FIG. 27, 28, is specifically referred to as the platform 1 or platform body 1 or gimbaled platform and the pointing controller 7 and the actuator 6 are further broken down into sublevels. With the application of the MEMS IMU, the design of the servo controller 76 is a key technical issue in this invention. The servo controller 76 signals are amplified by an amplifier 77. The stability and anti-interference performance of the automatic stabilization and pointing control of a device is mostly determined by the servo loop design. The characteristics of the MEMS gyro also impact the control loop design.

The stability and anti-interference performance of the pointing stabilization mechanism is mostly determined by the servo loop design. It is often difficult to determine the controller parameters that can satisfy different application environments. The system model has platform rates or platform angles as outputs, and three inputs, platform rotation command, interference torque, and gyro drift. The performance of the servo system can be described by the response of the platform 1 to the system inputs.

The platform 1 of the automatic stabilization and pointing control of a device can rotate with respect to inertial space if there is a command input. In the automatic stabilization and pointing control of a device, the command function can be used to reset or initialize the attitude system pointing direction. Because gyro drift exists, the platform of the attitude system needs to be reset periodically. In this invent, however, the major objective of the servo loop design is to eliminate the effect of short-term interference torque acting on the platform. The interference torque is induced by attitude changes of the vehicle, the elastic deformation of the platform and gimbals, and vehicle vibration. The frequency range of interest is from about one third of a hertz to 10 Khz. The design of the servo controller C(s) is the key issue in this task. After the hardware of the servo system is implemented, the performance of the servo system is mostly determined by the servo controller design. But the following factors make it difficult to design a servo controller that can satisfy requirements under different application conditions:

(A) The coupling between the two servo control channels of the pointing stabilization mechanism. In the servo controller design we can ignore it, but in practice the coupling can affect the system performance.

(B) The existence of non-linearity. The platform-gimbals system 1 is actually a nonlinear system that can be described by two interacting rigid bodies. The dry friction between the platform and gimbals is also nonlinear.

(C) The vibration models of the vehicle, gamble, and mirror are often unknown. Since in the gimbaled pointing stabilization mechanism the vibration induced interference torque to the platform is of special concern, the vibration model is needed in the servo controller design.

FIG. 29 is depicts a simplified mechanical system model of the gimbaled platform 1.

FIG. 30 depicts the system configuration of the experimental automatic stabilization and pointing control of a device.

Referring to FIGS. 27 to 34, the automatic stabilization and pointing control method according to the above preferred embodiment of the present invention comprises the steps of:

(1) identifying a desired pointing direction of a device by providing coordinates of a target by a means, including a target coordinate producer 8;

(2) determining a current attitude measurement of the device by a means, including an inertial measurement unit;

(3) computing platform rotation commands of the device using the desired pointing direction of the device and the current attitude measurements of the device 5 by a means, including measurement data processing module 71, target position estimator 72, target position predictor 73, fire control solution module 74, gun control command computation module 75;

(4) combining the computed platform rotation commands with the feedback signals from the coremicro IMU 5;

(5) computing the automatic stabilization and pointing control signal by with the servo controller 76;

(7) amplifying the servo controller 76 signals by an amplifier 77;

(8) sending the amplified the servo controller 76 signals to the actuator 6;

(9) the actuator 6—torque motors—converts the electric signals to torques and the torque exerted on the platform body 10 to eliminate interference to the platform body 10; and

(10) sensing the motion of the platform body 10 by coremicro IMU 5 and feedback the sensor signal to the servo controller 76;

(11) visualizing the targets and desired pointing direction and current direction of the device; and

(12) producing a voice representing the pointing procedure.

The present invention also provides a first alternative method for Automatic Pointing Stabilization and Aiming Control Device comprising the steps of:

(1) receiving platform rotation commands of said device using said desired pointing direction of said device and said current attitude measurement of said device;

(2) combining the computed platform rotation commands with the feedback signals from the coremicro IMU 5;

(3) computing the automatic stabilization and pointing control signal by with the servo controller 76;

(4) amplifying the servo controller 76 signals by an amplifier 77;

(5) sending the amplified the servo controller 76 signals to the actuator 6;

(6) the actuator 6—torque motors—converts the electric signals to torques and the torque exerted on the platform body 10 to eliminate interference to the platform body 10; and (7) sensing the motion of the platform body 10 by coremicro IMU 5 and feedback the sensor signal to the servo controller 76.

According to the present invention, a second alternative of the present invention comprises the steps of:

(1) identifying a desired pointing direction of a device by providing coordinates of a target by a means;

(2) determining a current attitude measurement of the device by a means, including an inertial measurement unit;

(3) computing platform rotation commands of the device using the desired pointing direction of the device and the current attitude measurements of the device 5;

(4) combining the computed platform rotation commands with the feedback signals from the coremicro IMU 5;

(5) computing the automatic stabilization and pointing control signal by with the servo controller 76;

(7) amplifying the servo controller 76 signals by an amplifier 77;

(8) sending the amplified the servo controller 76 signals to the actuator 6;

(9) the actuator 6—torque motors—converts the electric signals to torques and the torque exerted on the platform body 10 to eliminate interference to the platform body 10; and

(10) sensing the motion of the platform body 10 by coremicro IMU 5 and feedback the sensor signal to the servo controller 76.

Figure 33:
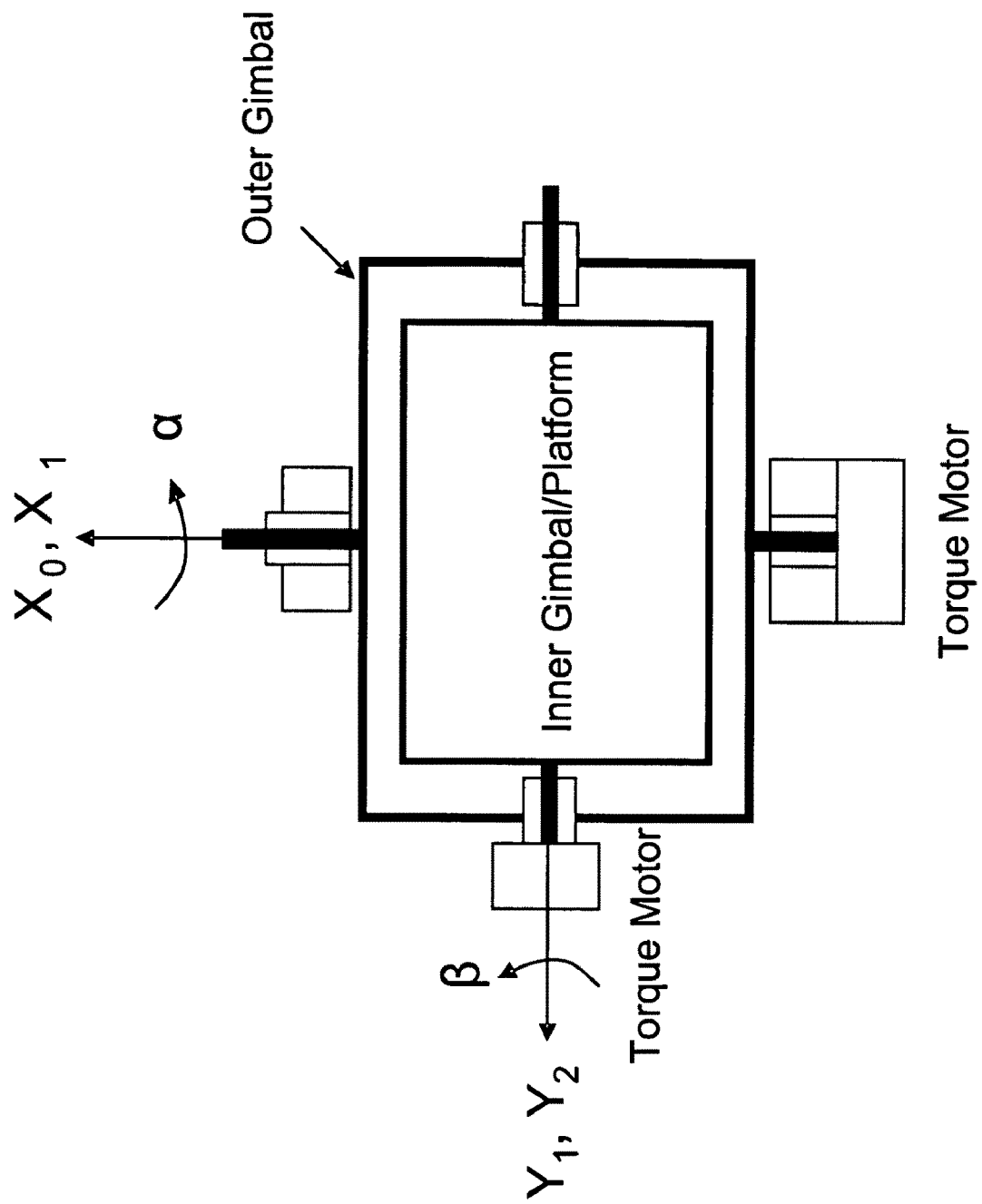
FIG. 33 depicts Gimbaled Platform Model and Frame Definition.

Referring to FIG. 33, the pointed device is usually a gambled two-degree-of-freedom platform body 10. Now we analyze the motion model of the gimbaled platform. A simplified mechanical system model of the gimbaled platform is depicted. It consists of 3 objects: a base that is stationary or fixed to a carrier, an outer gimbal, and the inner gimbal or platform. To describe the motion and establish a mathematical model for the gimbaled platform, we define 3 systems of coordinates (frames):

(I) Frame 0, $OX_0Y_0Z_0$ - - - fixed to the base.

(II) Frame 1, $OX_1Y_1Z_1$ - - - fixed to the outer gimbal.

(III) Frame 2 or B, $OX_2Y_2Z_2/OX_bY_bZ_b$ - - - fixed to the inner gimbal or platform.

FIG. 33 depicts the directions definition of the above 3 frames. The angular position of the platform can be described by the relative position of the frame B/2 with respective to the frame 0, which is determined by two gimbal angles along the two gimbal axes, $\alpha$ and $\beta$.

Using a directional cosine matrix (DCM) to describe the relative angular position, the frame 1 angular position with respective to frame 0 is expressed as:

$$C_0^1 = \begin{bmatrix} 1 & 0 & 0 \\ 0 & \cos\alpha & \sin\alpha \\ 0 & -\sin\alpha & \cos\alpha \end{bmatrix}$$

Similarly, the frame 2/B angular position with respective to frame 1 is expressed as:

$$C_1^2 = \begin{bmatrix} \cos\beta & 0 & -\sin\beta \\ 0 & 1 & 0 \\ \sin\beta & 0 & \cos\beta \end{bmatrix}$$

The angular velocity of the gimbaled platform is determined by the vector equation:

$$\omega = \dot{\alpha} + \dot{\beta}$$

Expressing it in component form and in the frame 2/B, we obtain:
Or:

$$\omega^b = C_1^2 \begin{bmatrix} \dot{\alpha} \\ 0 \\ 0 \end{bmatrix} + \begin{bmatrix} 0 \\ \dot{\beta} \\ 0 \end{bmatrix}$$

$$\omega_x = \dot{\alpha}\cos\beta$$

$$\omega_y = \dot{\beta}$$

$$\omega_z = \dot{\alpha}\sin\beta$$

The external torques applied on the gimbaled platform 1 are transferred from the outer gimbal. They can be expressed in the 3 axes directions of the frame 1:
 (i) Torque from motor in the $OX_1$ direction, $M_\alpha$.
 (ii) Torque from motor in the $OY_1$ direction, $M_\beta$.
 (iii) Torque from the base in the $OZ_1$ direction, $M_z$.

In addition, there are also external torques caused by friction and elastic properties of the gimbals. We consider them as external interference torques in the analysis and simulation.

The external torques transferred to the frame 2/B, the gimbaled platform 1, and expressed in the frame 2/B are:

$$M^b = C_1^2 \begin{bmatrix} M_\alpha \\ M_\beta \\ M_z \end{bmatrix}$$

Or in components:

$$M_x = M_\alpha \cos\beta - M_z \sin\beta$$

$$M_y = M_\beta$$

$$M_z = M_\alpha \sin\beta + M_z \cos\beta$$

At first, we consider the gimbaled platform 1 as a rigid body and the dynamic motion can be described by the so-called Euler Equations:

$$\dot{H} = [I^b]\dot{\omega} + \omega \times H = M^b$$

where H is the angular relative momentum of the gimbaled platform 1 and $$H = [I^b]\omega$$

where $[I^b]$ is the inertia matrix of the gimbaled platform 1 with respect to frame 2/B.

The Euler Equations in component form is:

$$I_x\dot{\omega}_x + (I_z - I_y)\omega_z\omega_y = M_x$$

$$I_y\dot{\omega}_y + (I_x - I_z)\omega_x\omega_z = M_y$$

$$I_z\dot{\omega}_z + (I_y - I_x)\omega_y\omega_x = M_z$$

where $I_x$, $I_y$, $I_z$ are the moments of inertia of the gimbaled platform 1 with respect to the axes of the frame 2/B.

Combining the angular velocity equations and torque equations into the Euler Equations, we can obtain the dynamic mathematical model of the gimbaled platform 1:

$$I_x(\ddot{\alpha}\cos\beta - \dot{\alpha}\dot{\beta}\sin\beta) + (I_z - I_y)\dot{\alpha}\dot{\beta}\sin\beta = M_\alpha\cos\beta - M_z\sin\beta$$

$$I_y\ddot{\beta} + (I_x - I_z)\dot{\alpha}^2\cos\beta\sin\beta = M_\beta$$

$$I_z(\ddot{\alpha}\sin\beta + \dot{\alpha}\dot{\beta}\cos\beta) + (I_y - I_x)\dot{\alpha}\dot{\beta}\cos\beta = M_\alpha\sin\beta + M_z\cos\beta$$

In the above 3 equations, $M_\alpha$, $M_\beta$ are controlling torques from the motors, while $M_z$ is a reaction torque from the base. Therefore, the first 2 equations are useful for control system analysis design and the third equation is a torque relation for the gimbaled system.

Referring to FIG. 32, the actuator 6 is usually a set of DC motors. A generic DC motor model can be expressed as:

$$V_{in} = iR + L\frac{di}{dt} + K_b\omega$$

$$M = K_t i$$

where:
 $V_{in}$ - - - motor input voltage;
 i - - - motor armature coil current;
 R - - - motor armature coil resistance;
 L - - - motor armature coil inductance;
 $K_b$ - - - motor back electromotive force (EMF) constant;
 ω - - - motor shaft angular velocity;
 M. - - - motor shaft torque;
 $K_t$ - - - motor torque constant.

Applying this model to the two motors to control the motion of the gimbaled platform 1 in the two axes, $OX_1$ and $OY_1$, respectively, we obtain two sets of motor equations:

$$V_{inx} = i_x R + L\frac{di_x}{dt} + K_b\dot{\alpha}$$

$$M_\alpha = K_t i_x$$

$$V_{iny} = i_y R + L\frac{di_y}{dt} + K_b\dot{\beta}$$

$$M_\beta = K_t i_y$$

Combined together, the dynamic model of the motor-gimbaled platform system is expressed as follows:

$$I_x(\ddot{\alpha}\cos\beta - \dot{\alpha}\dot{\beta}\sin\beta) + (I_z - I_y)\dot{\alpha}\dot{\beta}\sin\beta = K_t i_x\cos\beta - M_z\sin\beta$$

$$i_x R + L\frac{di_x}{dt} + K_b\dot{\alpha} = V_{inx}$$

$$I_y\ddot{\beta} + (I_x - I_z)\dot{\alpha}^2\cos\beta\sin\beta = K_t i_y$$

$$i_y R + L\frac{di_y}{dt} + K_b\dot{\beta} = V_{iny}$$

The inputs of the system are $V_{inx}$, $V_{iny}$, and outputs are α and β.

Two direct drive, brushless dc motors are used in the two-axis gimbals system for the experimental inertial pointing and stabilization mechanism. We need to have a motor controller circuit module to control the two direct drive, brushless dc motors. When making a DC brushless motor controller choice, there are several issues that have to be addressed so that the proper device is selected for the system.

In the two-axis gimbals system, the direction of the motor needs to be changed. This has to be taken into account in the controller selection. And the torque needs to be controlled, so a controller with a current loop control needs to be specified. Also, if the two-axis gimbals system control calls for a high bandwidth servo control loop, a full four-quadrant controller must be chosen.

There are four possible modes or quadrants of operation using a DC motor, brushless or otherwise. In an X-Y plot of speed versus torque, Quadrant I is forward speed and forward torque. The torque is rotating the motor in the forward direction. Conversely, Quadrant III is reverse speed and reverse torque. Now the motor is rotating in the reverse direction, spinning backwards with the reverse torque. Quadrant II is where the motor is spinning in the forward direction, but torque is being applied in reverse. Torque is being used to "brake" the motor, and the motor is now generating power as a result. Finally, Quadrant IV is exactly the opposite. The motor is spinning in the reverse direction, but the torque is being applied in the forward direction. Again, torque is being applied to attempt to slow the motor and change its direction to forward again. Once again, the motor is generating power.

A one-quadrant motor controller will drive the motor in one direction only. An example of this would be a small fan or blower, such as the brushless fans used on some PC power supplies. A small pump that only needs to run in one direction can also use such a controller. A two-quadrant controller has the capability of reversing the direction of the motor. If the pump needs to be backed up, this would be the controller to use. A four-quadrant controller can control the motor torque both in the forward and the reverse direction regardless of the direction of the motor. A servo control system needs just this kind of control.

In order to have complete control of torque, the feedback loop has to allow the amplifier to maintain control of the torque at all times. A missile fin actuator or antenna pointing system needs to have complete control of motor torque at all times in order to satisfy the system requirements. Examining what happens during the PWM sequence will reveal the difference in controllers.

Pulse width modulation, or PWM is the method by which all class D amplifiers operate. By turning the supply voltage on and off at a high rate to a load and letting the characteristics of the load smooth out the current spikes, a much more efficient means of varying the power to the load is achieved. A switch is placed between one end of a DC motor and the supply and another switch between the other end of the motor and the return to the supply. Modulating the on-off duty cycle of one or both of the switches results in the proportional control of power to the motor, in one direction only. This is how one quadrant operation is achieved.

Adding a second pair of switches to the first pair, basically making two totem pole half bridges, is how a two-quadrant controller is constructed. Modulating one or both of the second pair of switches will result in controlling the motor in the opposite direction. This is operation in quadrant three.

The construction of a four-quadrant controller is exactly the same as the two-quadrant controller. The difference is in the modulation of the four switches. By modulating the opposite pairs of switches together in a complementary fashion, there is modulation control occurring at all times. In the two-quadrant case, as the motor either stops or changes direction, the modulation decreases to zero and starts backing up the opposite way. The control loop is out of the control influence during the time the modulation is stopped.

With a four-quadrant controller, modulation is occurring at a 50 percent duty cycle when the motor is not turning. The controller maintains control as the motor speed passes through zero. The net result is tighter control without any discontinuity at zero, and the bandwidth capability of the control system is doubled because, in effect, double the supply voltage is being utilized at all times.

Using this concept in a three-phase brushless DC motor controller, another half bridge is added. The pairs of half bridges are controlled by the Hall sensors, as they electrically commutate the motor with the three half bridges. At any given time, only two of the half bridges are being used, but they are modulated exactly as previously discussed.

The selected three-phase brushless DC motor controller is a full four-quadrant DC brushless motor control "torque amplifier." It is designed to provide closed loop current control of a brushless motor by sensing the current through the motor, thereby controlling the torque output of the motor. In a DC motor, torque is proportional to current. Enough torque produces speed, and the controller is used as the inner loop of a servo speed control system. By controlling torque directly instead of speed, better control of a motor in a servo system is realized. In other controllers, the loop control is lost as the controller passes through zero torque. This is not acceptable in most servo control systems. This discontinuity will disrupt the control system in many cases.

To stabilize the gimbaled platform 1 with respect to the stationary base or the inertial space, a coremicro IMU is mounted on the platform to sense its motion. If, on the platform, the IMU's sensing axes are identical to those of the frame 2/B, respectively, the measurement model of the IMU can be expressed as:

$$\omega_{out} = \omega_{bi}^b + \varepsilon = C_1^2 \begin{bmatrix} \dot\alpha \\ 0 \\ 0 \end{bmatrix} + \begin{bmatrix} 0 \\ \dot\beta \\ 0 \end{bmatrix} + C_0^2 \omega_{0i}^0 + \varepsilon$$

where $\varepsilon$ is the total gyro drift, and $\omega_{0i}^0$ is the base angular velocity with respect to inertial space.

Figure 34:
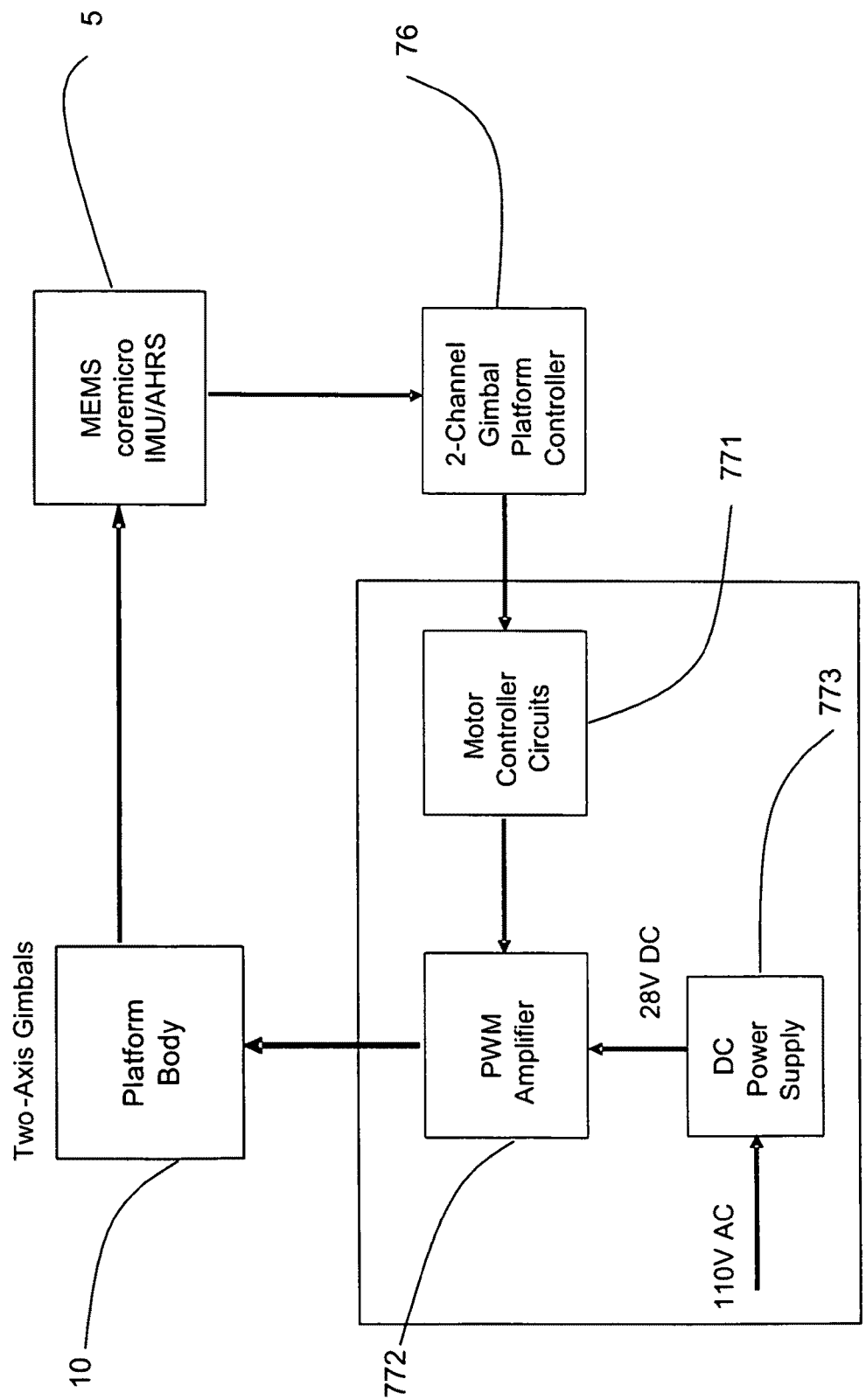
FIG. 34 depicts System Configuration of the Experimental Inertial Pointing and Stabilization Mechanism.

Referring to FIG. 34, the system configuration of the experimental automatic stabilization and pointing control system of a device. The experimental automatic stabilization and pointing control system consists of an AGNC coremicro AHRS/INS/GPS Integration Unit 5, a COTS 2-axis gimbals system 10, a 2-channel platform controller 76 and amplifier 77. Referring to FIG. 34 the amplifier 77 further comprises:

a motor controller circuits module 771 producing a suite of PWM control pulses (usually 4 channels) according to the data or signals from the platform controller 76. The produced signals control the PWM amplifier 772;

a PWM amplifier 772 to drive the gimbal motor in different operation modes, such as forward, backward, brake, lock, etc. The PWM amplifier 772 consists of a set of high speed high power semi-conductor switches, such as GTR, VMOS, or IGBT. Under the control of pulses from the motor controller circuits 771, the PWM amplifier 772 generates PWM voltages and currents to the motors; and a DC power supply 773. The electric power is from the DC power supply 773, which rectifies the AC to produce a 28V DC power.

The coremicro AHRS/INS/GPS Integration Unit 5 is embedded in the 2-axis gimbals platform 1 to measure the platform motion with respect to inertial space. The computation capability of the coremicro AHRS/INS/GPS Integration Unit 5 is also used to implement the 2-channel gimbals platform controller 76.

The two-axis gimbals system selected for the experimental inertial pointing and stabilization mechanism is a COTS gimbals meeting challenging performance demands for pointing various payloads at high degrees of accuracy and in extreme environments. These gimbals accommodate diverse payloads, including mirror flats, laser transponders, optical telescopes, and science instrument packages This two-axis gimbals system can be designed to meet specific needs. It combines direct drive, brushless dc motors, precision bearings, angular position transducers, and signal transfer devices with a lightweight, stiff structure. The gimbals system can be modified to embed the coremicro AHRS/INS/GPS Integration Unit with its structure.

The gimbals system utilizes a vacuum lubrication process to protect contacting surfaces. Wet or dry vacuum lubrication process offers very low outgassing lubrication options chosen based on life, temperature, contamination, or radiation requirements. This gimbals system and specialized lubrication have been integrated into some of the most precise pointing systems for ground, aircraft, and space-based applications.

The gimbals can be operated in either the position mode or the stabilization mode.

In the position mode, the gimbal control loop holds the gimbal in a given position with respect to the vehicle. An angle-measuring resolver is used as the loop feedback element.

In the stabilization mode, the gimbal control loop holds the gimbal in a given orientation in inertial space. This is realized because of the use of the coremicro AHRS/INS/GPS Integration Unit.

The coremicro AHRS/INS/GPS Integration Unit is used as the loop feedback element in the stabilization mode. In either mode, the gimbal controller sends a torque command signal to the motor current loop closed by the motor controller.

Figure 35:
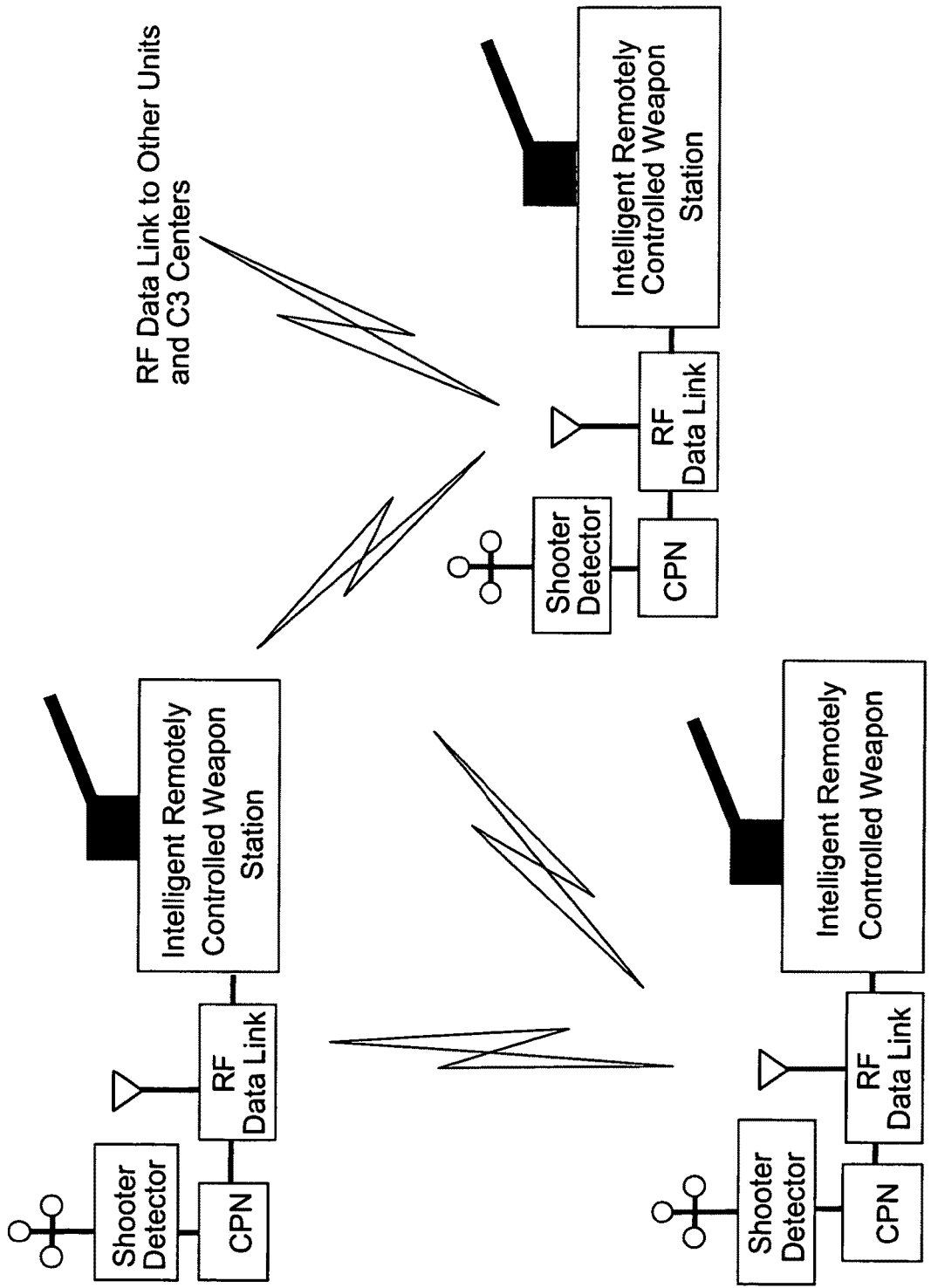
FIG. 35 depicts an Individual Intelligent Remotely Controlled Weapon Station with a Shooter Detection System.

Referring to FIG. 35, the Intelligent Remotely Controlled Weapon can be mounted on top of a vehicle and controlled from a command center within it. In an Intelligent Remotely Controlled Weapon Station equipped vehicle, the gunner sits safely inside the armored vehicle, looks at a computer screen and controls the weapon with the use of a joystick or other kind of user interface device, such as gaze tracking. In addition, the Intelligent Remotely Controlled Weapon Station is equipped with a powerful color camera, forward-looking infrared camera, a laser range finder, and other EO/IR/radar/Laser sensors, which make it possible to realize an automatic target tracking and fire control system. Once a target has been identified the computer builds a ballistic solution, taking into account distance, elevation and the type of weapon. All the gunner has to do now is to lock onto the target, tell the computer to fire the weapon and the computer executes the rest of the action.

Furthermore, the Intelligent Remotely Controlled Weapon Station has two types of user interfaces mounted inside the vehicle, allowing operation from within the vehicle's ballistic protection. 1) The first type of user interface is a video-mechanical system. Its main components include a display unit, switch panel unit, and hand controller joystick). The control user interface provides full remote control of the weapon system via on-screen menus presented on the display, and by the switches and joystick. 2) The second type of user interface is a video-eye tracker system. The switch panel unit and hand controller (joystick) is replaced by an eye tracker. The operator is remotely monitoring the scene on a display as viewed by a viewing sensor. The goal of the operator is to acquire and track a selected target. The operator does this by scanning the scene with his eyes and locking his eyesight onto a selected target. The operator subsequently tracks the target with his eyes. The movement of the operator's eyes is followed by a dual camera sensor that the operator is looking into. This sensor is monitoring the operator's eyesight motion while the operator simultaneously monitors the external viewing sensor's scene, locking and tracking with his eyesight some selected target. The goal is to translate the display coordinates of the target, the operator has selected and is tracking, to point the weapon on the external platform so that the operator can fire at the target when he so desires. A user eye controlled target tracking system is thus realized. This type of user interface can significantly reduce the operator's workload.

A typical Intelligent Remotely Controlled Weapon Station with a Shooter Detection System comprises the following main subsystems:

The gun and its mechanical supporting weapon cradle that form a two-degrees-of-freedom gun turret platform.

Electric motors for two-degrees-of-freedom gun turret traverse and elevation drives, including two channel motor servo control system based on microcontroller or microcomputer.

Weapon interface.

Weapon remote charger.

Ammunition feed system.

Viewing and sighting sensors and their stabilization unit.

Remote control user interface.

Fire control computer.

Acoustic sensors for the Shooter Detection System.

Coremicro® Palm Navigator (CPN) for navigation and Shooter Detection processing.

Shooter position indicator or display, etc.

A remotely operated weapon station has been built for the US military, called Stabilized Remotely operated Weapon Station (SRWS) or Common Remotely Operated Weapon Station (CROWS). However, it only provides the basic functions for remote operation and fire control. For example, the CROWS has no automatic target tracking function and its two-axis stabilization is with respect to the base or the vehicle. If the vehicle is in motion, the pointing direction of the gun turret will move with the vehicle. This makes it difficult for locking onto targets and tracking them in motion. The object of this invention is to add more advanced stabilization, control, shooter detection, and target tracking and hand-off functions to the existing weapon stations.

For the complete Intelligent Remotely Controlled Weapon Station system configuration, a basis is provided by the inertial two-degree-of-freedom gun turret stabilization and control system based on the application of AGNC's coremicro Palm Navigator. Based on the stabilization and control system, next comes the automatic moving target tracking system and the user eye controlled target tracking. The following is a detailed description of the inertial two-degree-of-freedom gun turret stabilization and control system.

Referring to FIG. 32, Inertial stabilization systems are widely used in navigation, control, tracking, pointing, imaging, and stabilization systems. In this invention, we use a gimbaled system for a physical inertially-stable platform - - - gun turret, as a reference object model. When mounted on a vehicle, the gun turret is capable to point in a fixed direction in inertial space or with respect to ground in a short time period, that is, the motion of the vehicle is isolated from the platform. In practice, a two-axis pointing stabilization mechanism has two coupled servo control loops. In the analysis of the system, however, the two loops can be decoupled and regarded as independent. The automatic stabilization and pointing control system of the present invention is a feedback control system. The operator uses the target coordinates producer to capture and track a target to measure the desired pointing direction of the pointed device. The CPN (IMU/AHRS) is used to measure the current attitude of the gun turret. Using errors between the desired pointing direction and the current direction of the gun turret, the pointing controller determines platform rotation commands to the actuator. The actuator changes the current attitude of the pointed device to bring it into closer correspondence with the desired orientation.

The weapon turret smart machine weapon application is required to perform its missions in the presence of disturbances, parametric uncertainces and malfunctions, and to account for undesired vibrations. The Gun Turret Inertial Automatic Stabilization and Pointing system integrates the techniques of signal/image processing, pattern classification, control system modeling, analysis and synthesis. The system balances and optimizes tightly coupled signal processing and control strategies, algorithms and procedures. The Gun Turret Inertial Automatic Stabilization and Pointing controller further comprises:

a measurement data processing module, for transforming the target positioning measurements, measured by the target coordinate producer and corrupted with measurement noise, from the target coordinate producer body coordinates to local level coordinates;

a target position estimator, for yielding the current target state including target position estimation using the target positioning measurements;

a target position predictor, for predicting the future target trajectory and calculating the interception position and time of a projectile launched by the weapon turret and the target;

a fire control solution module, for producing the weapon turret azimuth and elevation required for launch of the projectile; and a device control command computation module, for producing control commands to the actuator using the required weapon turret azimuth and elevation and current attitude and attitude rate data of the weapon turret from the CPN (IMU/AHRS) to stabilize and implement the required weapon turret azimuth and elevation with disturbance rejection.

The Coremicro® Palm Navigator embedded with the coremicro IMU employs the MEMS technology to provide angle increments (i.e., rotation rates), velocity increments (i.e., accelerations), a time base (sync) in three axes and is capable of withstanding high vibration and acceleration. The coremicro IMU is a low-cost, high-performance motion sensing device (made up of 3 gyros and 3 accelerometers) measuring rotation rates and accelerations in body-fixed axes. The coremicro IMU based Coremicro® Palm Navigator (CPN) is used as motion sensors for implementation of the intelligent remotely controlled weapon station with automated target hand-off.

Figure 36:
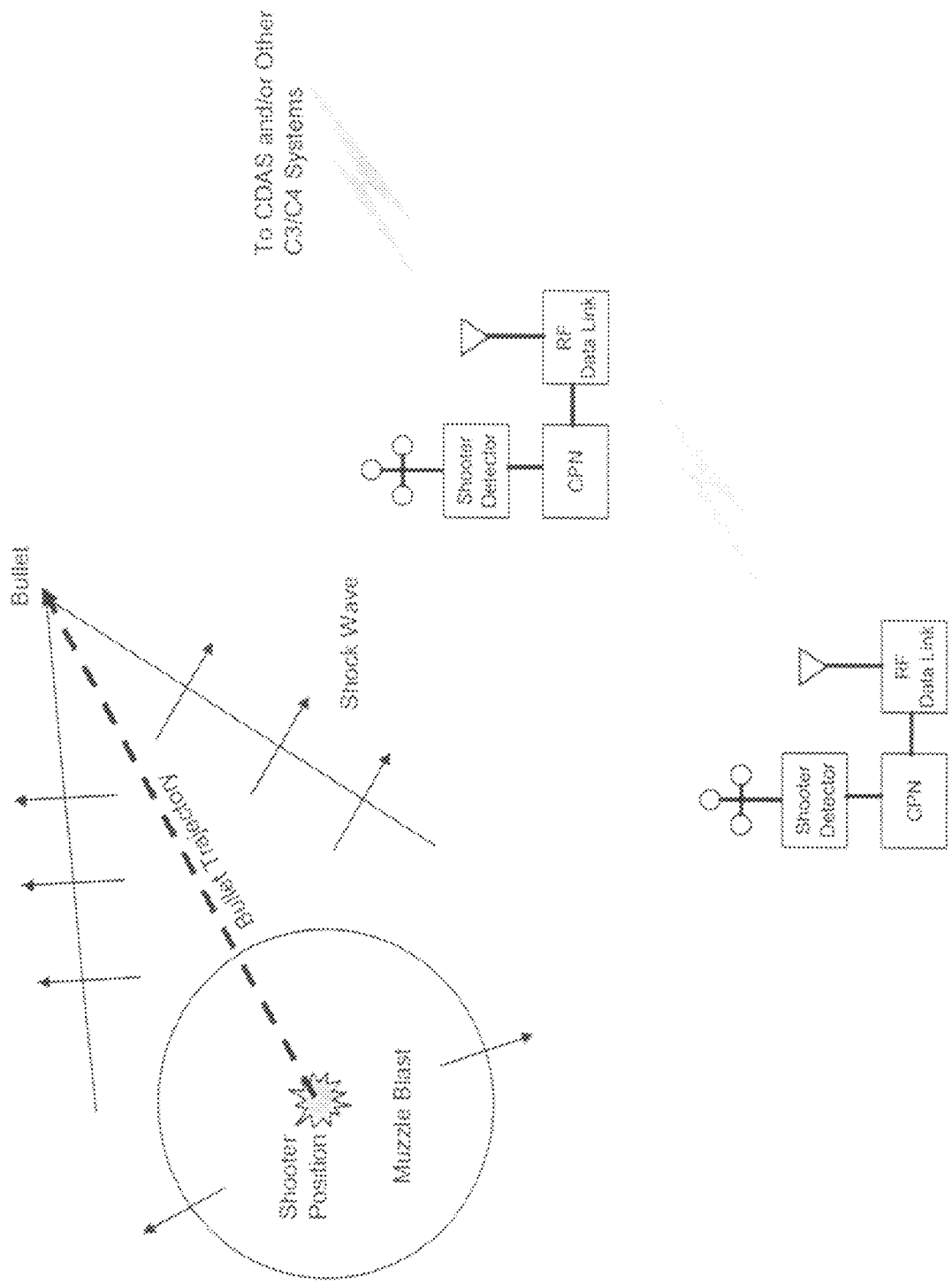
FIG. 36 depicts a Shooter Detection System with CPN and CDAS/C3/C4 Systems.

Referring to FIG. 36, a shooter/sniper detection system determines relative shooter azimuth, range, and elevation from incoming weapons fire. Currently, there are several different approaches for detecting weapons fire:

Acoustic approach to detect the muzzle blast and/or the supersonic acoustic shock wave;
IR imaging approach to detect bullets in flight;
Optical approach to detect muzzle flash;
Optics Laser reflection approach.

At present, most successful sniper-detecting systems today are based on acoustic measurements. But there are still many problems in the practical field applications. Based on the inventors past experience, we will mainly follow the acoustic approach for the shooter detection system.

The shooter detection can be regarded as a function augmentation for the CPN. With this function augmentation, based on the CPN provided absolute position and the shooter detector determined relative position of the shooter (sniper), the CPN can determine the absolute position of the shooter and report the shooter position to the CDAS and/or other C3 or C4 systems for battlefield awareness enhancement, decision aiding and fire control.

When a shooting is detected, the shooter/sniper position and the bullet trajectory is indicated and displayed in different media, such as:

Indicate the relative position (heading/bearing) of the sniper on the local unit's screen or LED/LCD array;
Mark the sniper position on the local CDAS map;
Display the bullet trajectory on the local CDAS map;
Through the RF data link, the sniper position and bullet trajectory is displayed on all individual units engaged in the mission;
Through the RF data link, the sniper position and bullet trajectory is reported to other remote C3/C4 stations and command center.

Using AGNC's existing products and technology, the shooter detection system is wirelessly networked to AGNC's 4D GIS system, map system, CDAS, and other C3 or C4 systems.

In summary, the present invention provides a method and system for an innovative design of the automatic stabilization and pointing control of a device based on the MEMS technology, which is small enough and has acceptable accuracy to be integrated into many application systems, such as, laser pointing systems, telescopic systems, imaging systems, and optical communication systems. The stabilization mechanism configuration design is based on utilization of AGNC commercial products, the coremicro IMU and the coremicro AHRS/INS/GPS Integration Unit. The coremicro AHRS/INS/GPS Integration Unit is used as the processing platform core for the design of the MEMS coremicro IMU based stabilization mechanism.

A platform is utilized on which reside a viewing sensor and a pointing system/weapon (e.g. gun, gun turret, mortar, artillery, communication system, etc.). There is an operator that is remotely monitoring the scene on a display as viewed by the viewing sensor. The operator gazes, acquires and tracks targets by scanning the scene with his eyes and locking his eyesight onto a selected target. The operator subsequently tracks the target with his eyes. The system further comprises a dual camera sensor the operator is looking into that follows the operator's eyes. This sensor is monitoring the operator's eyesight motion while the operator simultaneously monitors the external viewing sensor's scene, locking and tracking with his eyesight some selected target. The display coordinates of the target, the operator has selected and is tracking, are utilized to point the pointing system/weapon on the external platform so that the operator can fire at the target when he so desires. The problem is thus summarized as one of controlling the weapon pointing, movement and firing on a target that has been selected and is tracked by the eyes of an operator viewing a display.

The present invention also provides a method and system for innovative Intelligent Remotely Controlled Weapon Station with Automated Target Hand-Off. The purpose of the Intelligent Remotely Controlled Weapon Station is to get the gunner out of the turret where he is exposed to enemy fire and fragments, and position him inside the vehicle for protection. The Shooter Detection System can be considered as a function augmentation to the Coremicro® Palm Navigator (CPN). With this augmentation, using the CPN provided absolute position and the shooter detector determined relative bullet trajectory and position of the shooter (sniper), the CPN can determine the absolute position of the shooter and hand off the target to the fire control system by reporting the shooter's position to the local Intelligent Remotely Controlled Weapon Station. This is an automated hand-off situation for an individual unit of the Intelligent Remotely Controlled Weapon Station with a Shooter Detection System. The target acquired by a unit can be handed off to other units or C3/C4 systems centers.

As shown in FIGS. 27A and 27B, a target coordinate producer 8 using eye tracker measuring a desired pointing direction for the remote controlled weapon-firing of the device by capturing and tracking a target comprises a platform on which reside a viewing sensor 82 and a weapon 1 such as a gun, a gun turret, a mortar, an artillery, etc.

There is an operator system that is remotely monitoring the scene on a display as viewed by the viewing sensor. The goal of the operator system is to acquire and track a selected target by scanning the scene and locking onto a selected target according to the motion of the eyesight of an object. The operator system subsequently tracks the target.

The movement of the object's eyes is followed by a dual camera sensor of the eye tracker 81 that the object is looking into. This sensor is monitoring the object's eyesight motion while the object simultaneously monitors the external viewing sensor's scene, locking and tracking with his eyesight some selected target.

The goal is to translate the display coordinates of the target, the object has selected and is tracking, to point the weapon on the external platform so that the object can fire at the target when he so desires by using the operator system.

The problem is thus summarized as one of controlling the weapon pointing, movement and firing on a target that has been selected and is tracked by the eyes of an object viewing a display.

The external viewing sensor and the weapon are close to each other on an external platform. The operator can slew the platform to gaze at and search a large field of regard. The control achieves a smooth and accurate following of the target so that the weapon can successfully and rapidly engage the target. The viewing coordinates are translated to weapon pointing azimuth and elevation motion which accurately follows the target.

The design is general with a baseline that can be formulated and modified to take care of specific needs. For example, one can select eye tracking units that are already commercially available and COTS displays. One can select a platform and size it for a viewing sensor that can be useful for nominal target acquisition distances and select a machine gun that is already there, for shooting at objects, such as, helicopters.

Figure 27C:
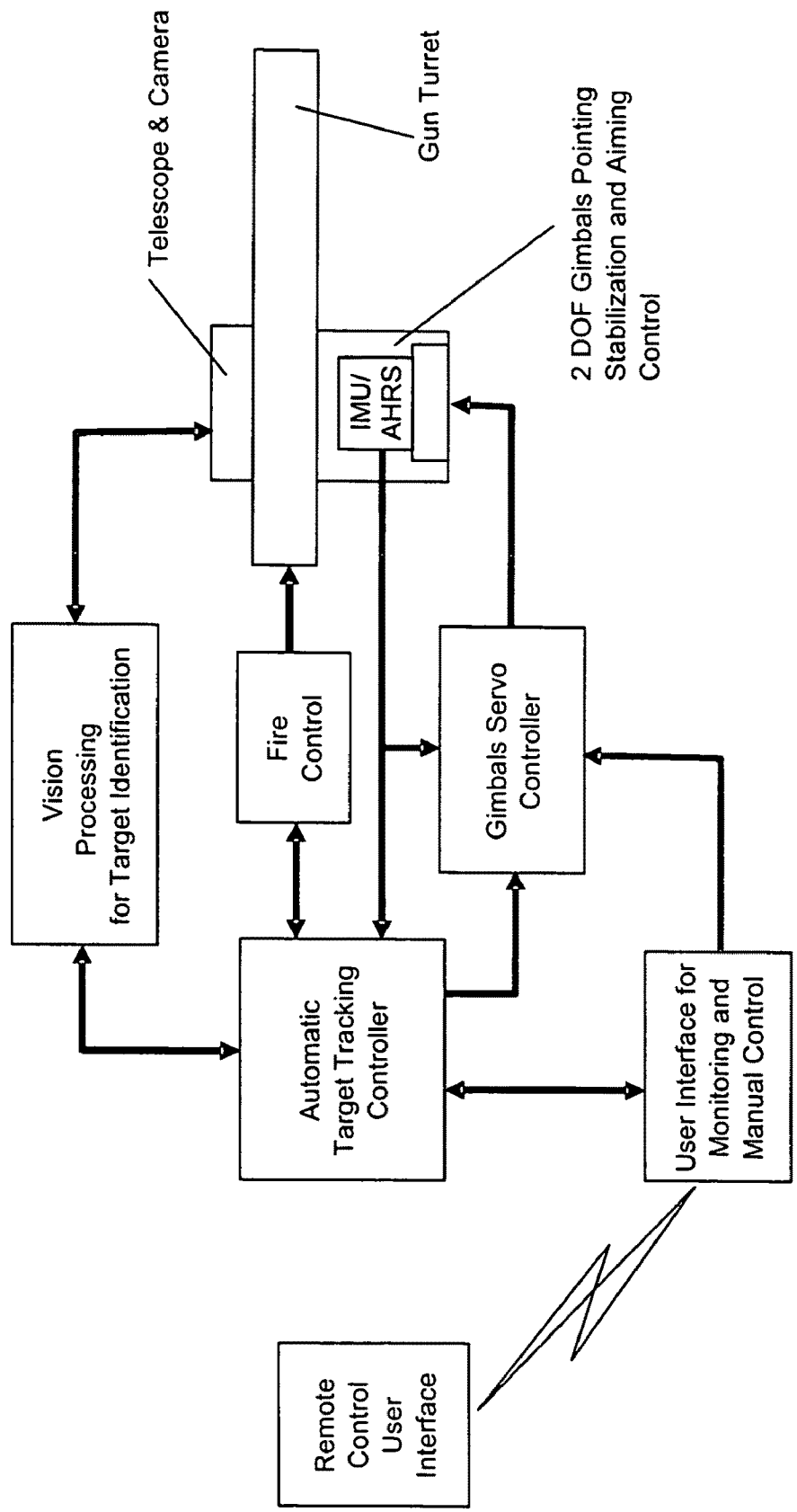
FIG. 27C is a block diagram illustrating the Automatic Weapon Turret Pointing Stabilization and Target Tracking/Aiming Control of the present invention.

As shown in FIG. 27C the operator can remotely monitor the scene on a display as viewed by the camera/telescope. The operator gazes at, acquires and tracks a selected target by scanning the scene with his eyes and locking his eyesight onto a selected target. The movement of the operator's eyes is followed by a dual camera sensor that the operator is looking into. This sensor is monitoring the operator's eyesight motion while the operator simultaneously monitors the external camera/telescope's scene, locking and tracking with his eyesight some selected targets. The display coordinates of the target that the operator has selected are translated to point the weapon on the external platform so that the operator can fire at the target when he desires.

The use of an autotracker is deemed to be of maximum benefit to the operator of a remotely controlled weapon system since, following initial designation by the operator, multiple targets can be autonomously tracked simultaneously, until the operator decides to engage them, Even in the single target case an autotracker can significantly alleviate the operator's monitoring workload.

Referring to FIG. 27, in many applications, a user needs to command a device to be pointed and stabilized with specified orientation. For example, an antenna or a transmitter and receiver beam in a mobile communication system carried in a vehicle needs to be pointed at a communication satellite in orbit in dynamic environments. Or, a weapon turret or a sniper rifle in the hands of a warrior of an Army elite sniper team needs to be pointed at a hostile target in a complex environment. A measurement device in a land survey system needs to be pointed at a specific direction with precision and stabilized.

The present invention provides a system for target tracking, pointing and trajectory estimation system comprising: an automated target tracking 76; a measurement data processing module 71 for transforming target positioning measurements, corrupted with measurement noise, from body coordinates to local level coordinates; a target position estimator 72 yielding the current target state; a target position prediction 73 of the future target trajectory and calculation of the interception position and time of a projectile, launched by the weapon platform, and the target; a fire control solution module 74 producing the weapon platform azimuth and elevation required for launch of a projectile; and a device control command computation module 75, for producing control commands to the actuator 6 using the required weapon platform azimuth and elevation and current attitude and attitude rate data of the weapon platform from an IMU/AHRS 5 to stabilize and implement the required weapon platform azimuth and elevation with disturbance rejection.

Collaboration Engagement: The target is acquired first by the Coremicro 4D GIS targeting system, as shown in FIG. 29. Then, the real-time projectile trajectory is determined by the automated stabilization and pointing control system, as shown in FIG. 29.

(1) Targeting: There are two modes of operation, as shown in FIG. 29. One mode of operation is the automatic target finding interface which automatically slews the gimbaled camera to line up with the target line of sight. The user can simply place the target icon at the center of the 3D virtual terrain and a mouse click on the "Find Target" button initiates the gimbaled camera pan motion. The second mode is the tele-operational mode that utilizes the virtual joystick on the Robotic Control Module to control the pan/tilt position of the gimbaled camera.

(2) Trajectory Estimation: After meteorological (MET) variables have been estimated, these variables are employed for the impact-point prediction and solving for the correct aiming, as shown in Error! Reference source not found.32. By specifying the desired target coordinates, the software will select the proper charge setting and solve for the correct azimuth and elevation angles needed for the desired impact point. The optimization problem for finding the real time aiming solution is to minimize the impact-point error, that is, to find the global minimum of the error function which is a nonlinear function of more than one independent variable (specifically, azimuth and elevation angles).

In a preferred embodiment of the present invention, a Coremicro® Robot together with the Coremicro 4D GIS provides the basis for target acquisition and target coordinates determination. The Coremicro Robot gimbaled camera control interface provides two modes of operation as described above.

The implementation of the gimbaled camera control provides adequate control of the gimbaled camera for surveillance and target geo-location. To expedite the targeting processes and simplify the graphical user interface, the remote gimbaled control is added using the mouse click on video functionalities. The user can now simply click on the image of the video feed and the camera will automatically center the camera field of view based on the mouse click position. Hence, the operator can control the pan and tilt motion of the gimbaled camera by simply using the mouse click on the live video feed.

Figure 37:
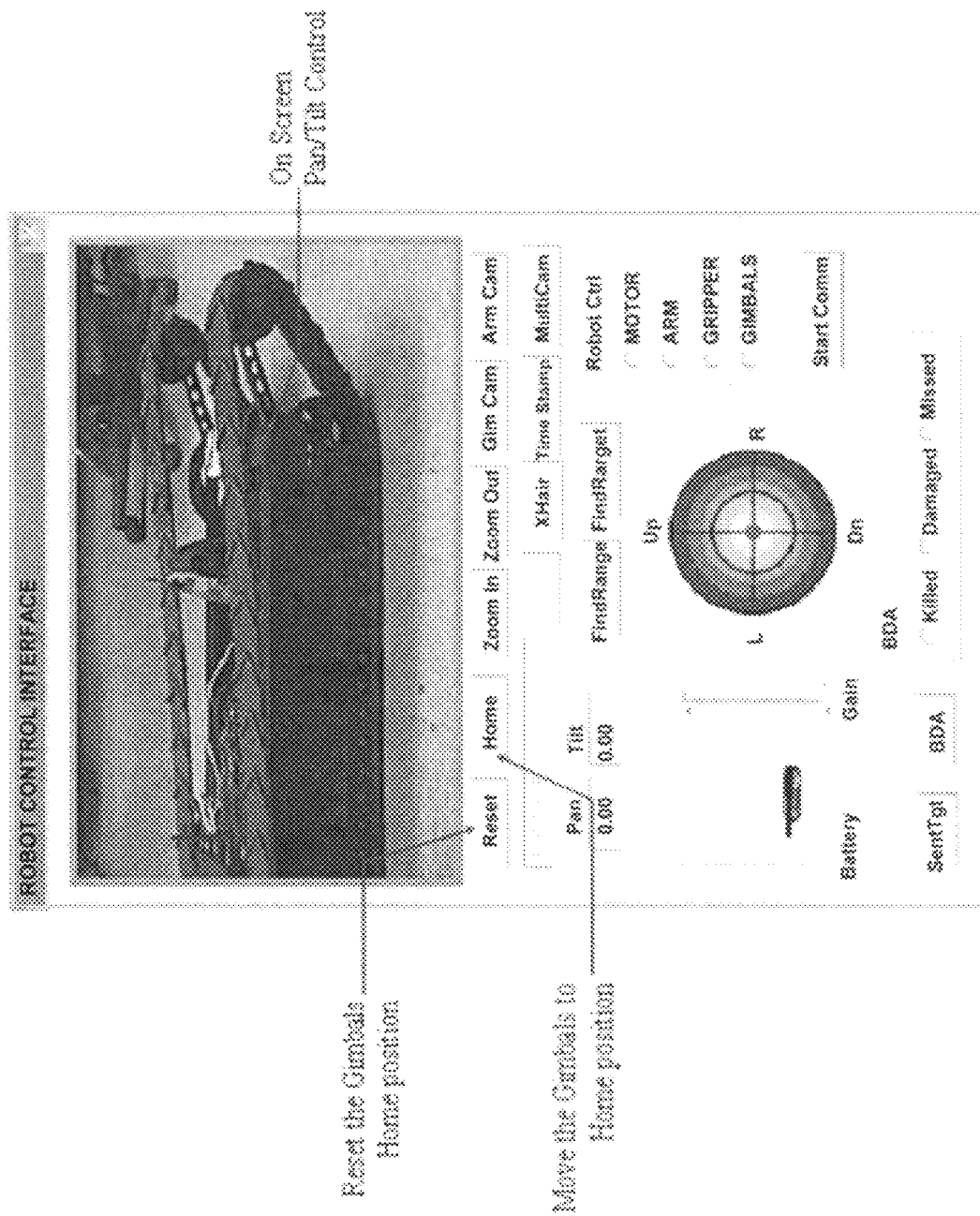
FIG. 37 illustrates a Coremicro robot control interface.

FIG. 37 shows the Robot control graphical user interface. The user can click on the live video feed image to control the pan and tilt positions of the gimbaled camera. The automatic pan/tilt control module automatically calculates the relative pixel position and sends the relative position to the Coremicro® Robot control processor. The automatic pan/tilt control module accommodates a zoom camera.

The Robot graphical user interface also provides two buttons for the "reset" and "home" control of the gimbaled camera, as shown in FIG. 37. The "reset" functionality resets or re-initialize the gimbaled position in the case where the zero position is no longer at the center due to inadvertent impact to the gimbals. The "home" button sends the gimbaled camera back to the zero position for both the pan and tilt angles. This graphical user interface enhancement expedites the targeting and target geo-location processes as well as provides ease of use and training for the operators.

Figure 38:
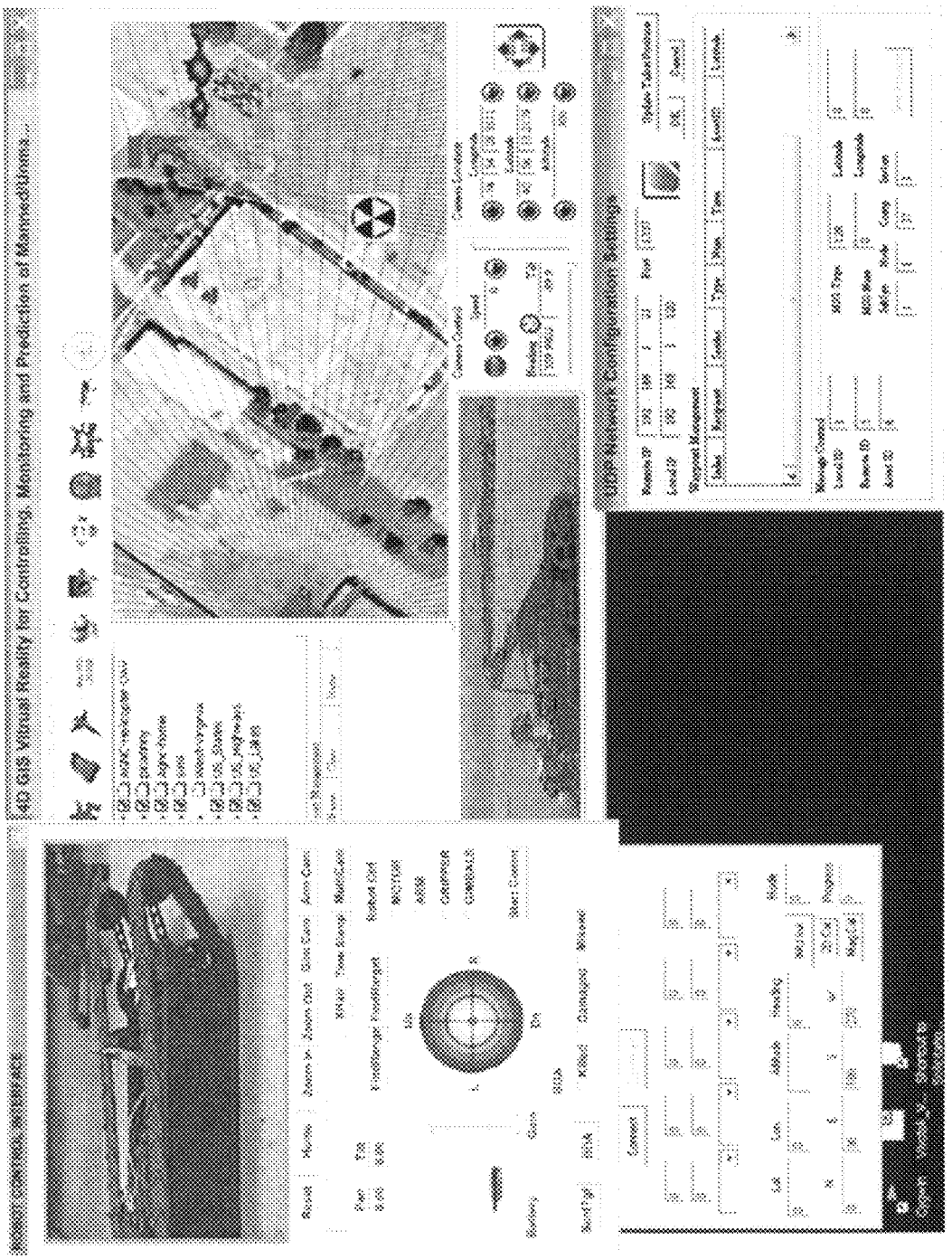
FIG. 38 illustrates a Coremicro 4D GIS system graphical user interface.

Features are incorporated in the Coremicro 4D GIS graphical user interface enhancing the overall layout of the various interface modules, expediting the targeting and target geo-location processes, minimizing the training effort for the operator as well as providing ease of use. At the start of the Coremicro 4D GIS system, it automatically loads the default database which includes the Map, shapefiles, and various simulation scenarios. It also automatically focuses the 3D virtual terrain viewpoint to the top view of the Building as the default start sequence. The initial position of various graphical user interface module windows are arranged to fit within the tablet pc display. The "Robot control Interface" virtual joystick also indicates the direction of the control based on the control modes, such as Forward (F), Backward (B), Left (L), Right (R) for the motor control, Up (Up), Down (Dn), Left (L), Right (R) for the gimbaled camera, (F), (B), (UP), (Dn) for the Arm, and Open (Op), Close (Cl) for the gripper. FIG. 38 shows the screen capture of the current Coremicro 4D GIS system graphical user interface.

Figure 39:
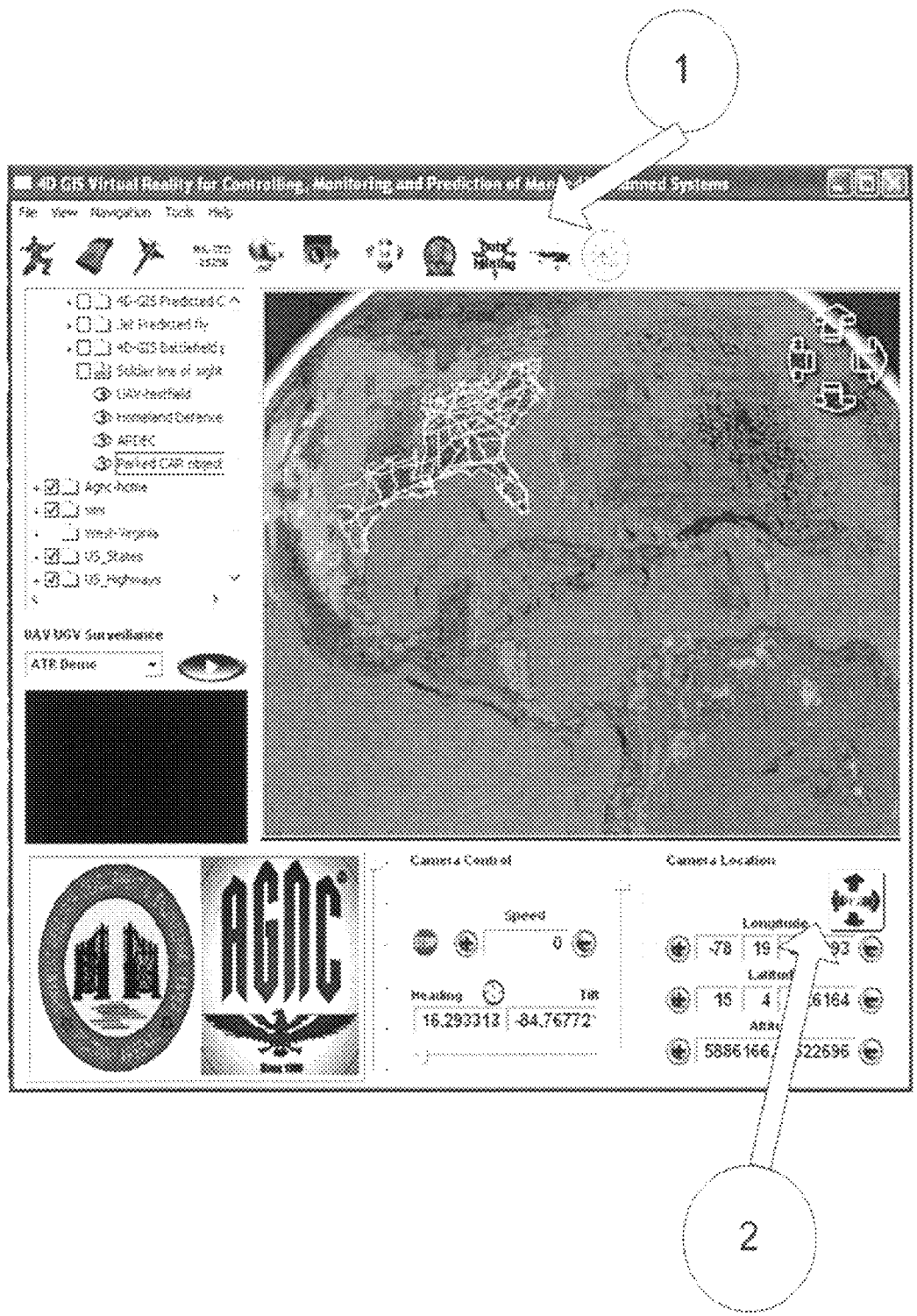
FIG. 39 illustrates a Coremicro 4D GIS GUI layout.
Figure 41:
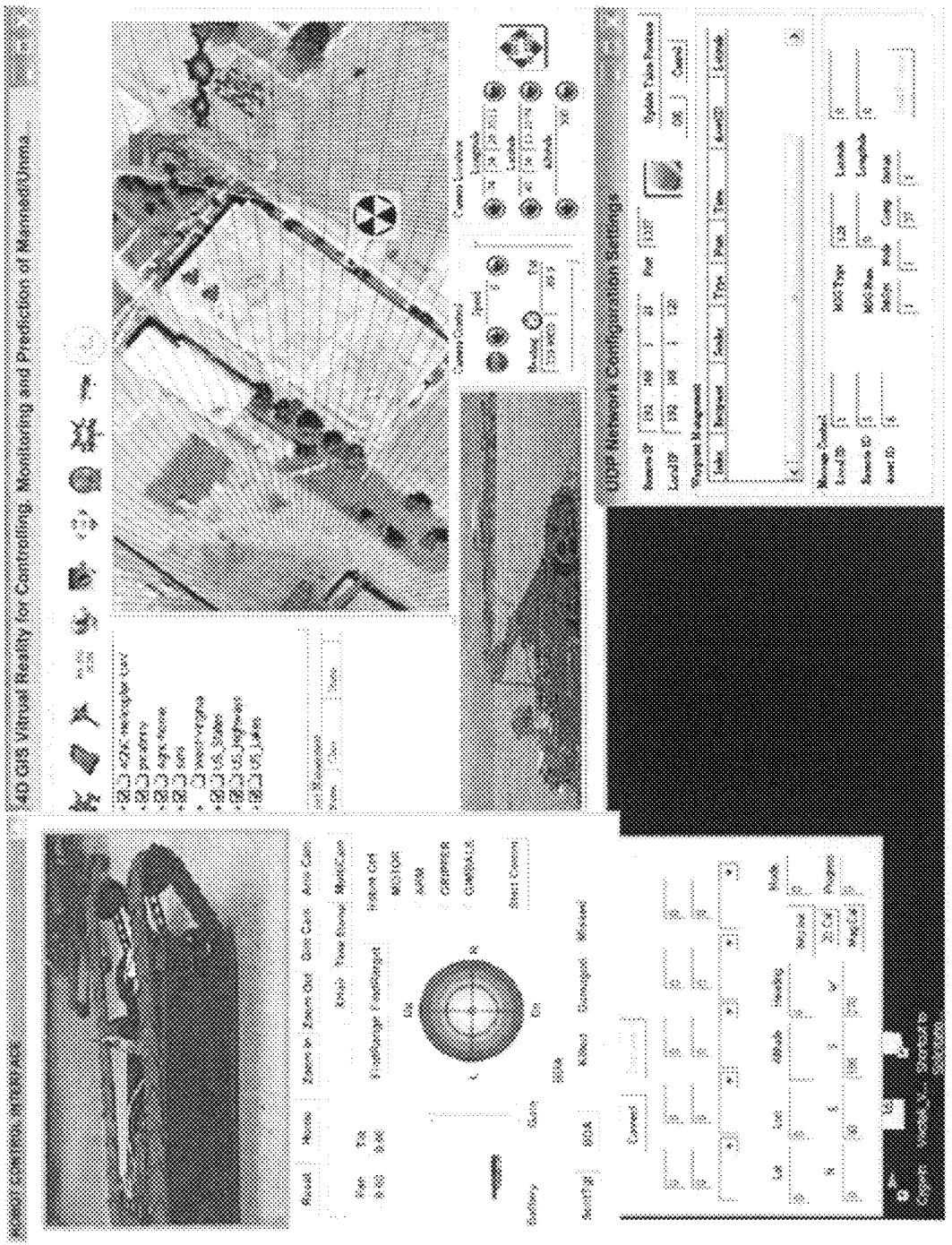
FIG. 41 illustrates a Coremicro 4D GIS system graphical user interface.
Figure 42:
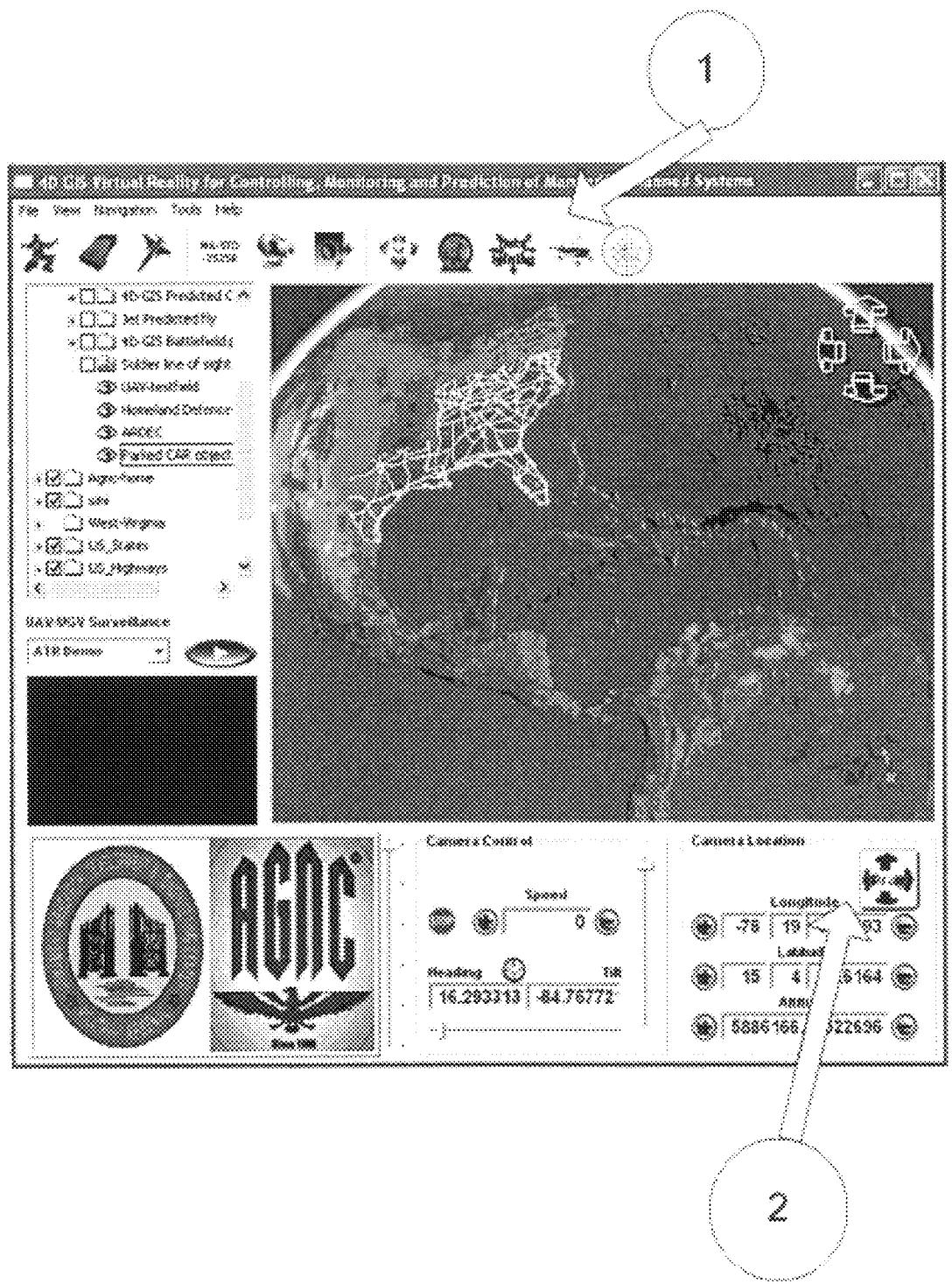
FIG. 42 illustrates a Coremicro 4D GIS GUI layout.
Figure 44:
FIG. 44 is a perspective view of a Vuzix Iwear VR920 Head Mount Display/Head Tracker system.
Figure 45:
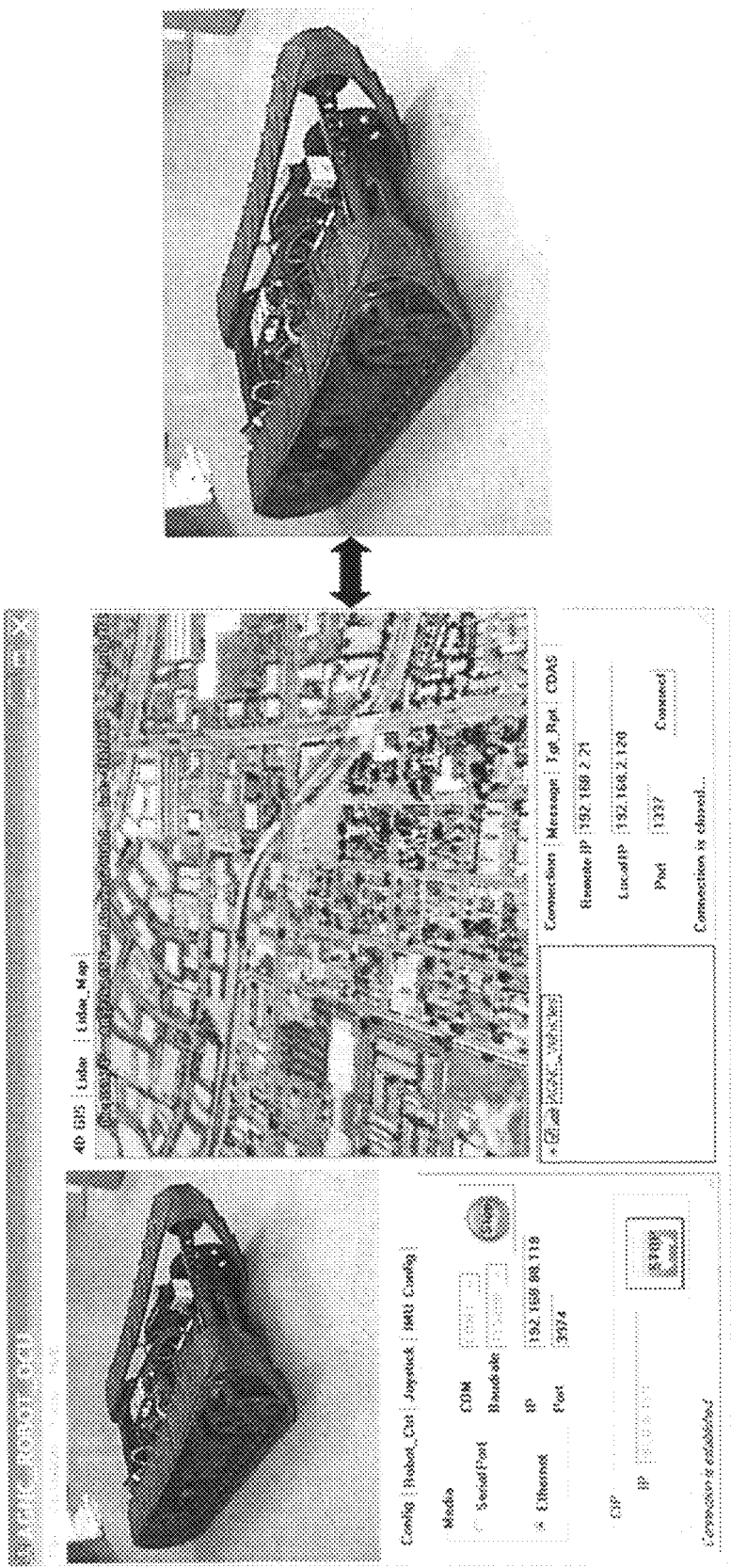
FIG. 45 illustrates the robot operator control interface with single button toggle between camera view and OCU view.

Targeting location from remotely sensed terrestrial and aerial imagery is one of the most important Coremicro 4D GIS functionalities. In order to render imagery into the Coremicro 4D GIS camera position and orientation angles need to be reconstructed. Orientation of the camera presented in the Coremicro 4D GIS is determined by three Euler angles. The Coremicro 4D GIS system GUI is depicted in FIG. 39.

The US ARDEC Combat Decision Aids System (CDAS) database shapefiles are integrated into the Coremicro 4D GIS demo database. All the GIS layers are reprojected to be consistent with the Coremicro 4D GIS cartographic projection and appear as separate GIS layers group when the database menu appears. GIS data is organized as separate layers each of which can be switched in on and off states in a database window. FIG. 40 depicts a borders layer of CDAS data integrated into the Coremicro 4D GIS database.

Current decision support systems do not have the ability to control multiple robotic platforms simultaneously with the ability of multi-sensor data processing, and prediction of future locations of moving targets within the Common Operational Picture (COP). Furthermore, abilities of efficient 3D visualization are also limited. In contrast, the Coremicro 4D GIS Virtual Reality for Moving Target Prediction and Visualization is an efficient computer vision and GIS tool which has all these capabilities. Augmenting the Coremicro 4D GIS environment by UGV/UAV network-centric controlling capabilities and plugging-in this system as a display closes the complete technological loop of the ARDEC network-centric warrior system. All the work is performed within the ARDEC MPC architecture. The Coremicro 4D GIS User Datagram Protocol (UDP) Connection to CDAS and a UDP Waypoints Object tool were created. GUI of the UDP connection tool is depicted in FIG. 40.

The AGNC Coremicro Robot together with the AGNC Coremicro 4D GIS provides the basis for target acquisition and target coordinates determination. The Coremicro Robot gimbaled camera control interface provides two modes of operation. One mode of operation is the automatic target finding interface which automatically slews the gimbaled camera to line up with the target line of sight. The user can simply place the target icon at the center of the 3D virtual terrain and a mouse click on the "Find Target" button initiates the gimbaled camera pan motion. The second mode is the tele-operational mode that utilizes the virtual joystick on the Robotic Control Module to control the pan/tilt position of the gimbaled camera.

The implementation of the gimbaled camera control provides adequate control of the gimbaled camera for surveillance and target geo-location. To expedite the targeting processes and simplify the graphical user interface, the remote gimbaled control is added using the mouse click on video functionalities. The user can now simply click on the image of the video feed and the camera will automatically center the camera field of view based on the mouse click position. Hence, the operator can control the pan and tilt motion of the gimbaled camera by simply using the mouse click on the live video feed.

Error! Reference source not found.37 shows the Robot control graphical user interface. The user can click on the live video feed image to control the pan and tilt positions of the gimbaled camera. The automatic pan/tilt control module automatically calculates the relative pixel position and sends the relative position to the AGNC's Coremicro Robot control processor. The automatic pan/tilt control module accommodates a zoom camera.

The Robot graphical user interface also provides two buttons for the "reset" and "home" control of the gimbaled camera, as shown in Error! Reference source not found.37. The "reset" functionality resets or re-initialize the gimbaled position in the case where the zero position is no longer at the center due to inadvertent impact to the gimbals. The "home" button sends the gimbaled camera back to the zero position for both the pan and tilt angles. This graphical user interface enhancement expedites the targeting and target geo-location processes as well as provides ease of use and training for the operators.

Features are incorporated in the Coremicro 4D GIS graphical user interface enhancing the overall layout of the various interface modules, expediting the targeting and target geo-location processes, minimizing the training effort for the operator as well as providing ease of use. At the start of the Coremicro 4D GIS system, it automatically loads the default database which includes the Map, shapefiles, and various simulation scenarios. It also automatically focuses the 3D virtual terrain viewpoint to the top view of the Building as the default start sequence. The initial position of various graphical user interface module windows are arranged to fit within the tablet pc display. The "Robot control Interface" virtual joystick also indicates the direction of the control based on the control modes, such as Forward (F), Backward (B), Left (L), Right (R) for the motor control, Up (Up), Down (Dn), Left (L), Right (R) for the gimbaled camera, (F), (B), (UP), (Dn) for the Arm, and Open (Op), Close (Cl) for the gripper. Error! Reference source not found.41 shows the screen capture of the current Coremicro 4D GIS system graphical user interface.

Targeting location from remotely sensed terrestrial and aerial imagery is one of the most important Coremicro 4D GIS functionalities. In order to render imagery into the Coremicro 4D GIS camera position and orientation angles need to be reconstructed. Orientation of the camera presented in the Coremicro 4D GIS is determined by three Euler angles. The Coremicro 4D GIS system GUI is depicted in Error! Reference source not found.42.

The US ARDEC Combat Decision Aids System (CDAS) database shapefiles are integrated into the Coremicro 4D GIS demo database. All the GIS layers are reprojected to be consistent with the Coremicro 4D GIS cartographic projection and appear as separate GIS layers group when the database menu appears. GIS data is organized as separate layers each of which can be switched in on and off states in a database window. Error! Reference source not found.43 depicts a borders layer of CDAS data integrated into the Coremicro 4D GIS database.

Current decision support systems do not have the ability to control multiple robotic platforms simultaneously with the ability of multi-sensor data processing, and prediction of future locations of moving targets within the Common Operational Picture (COP). Furthermore, abilities of efficient 3D visualization are also limited. In contrast, the Coremicro 4D GIS Virtual Reality for Moving Target Prediction and Visualization is an efficient computer vision and GIS tool which has all these capabilities. Augmenting the Coremicro 4D GIS environment by UGV/UAV network-centric controlling capabilities and plugging-in this system as a display closes the complete technological loop of the ARDEC network-centric warrior system. The Coremicro 4D GIS User Datagram Protocol (UDP) Connection to CDAS and a UDP Waypoints Object tool were created. GUI of the UDP connection tool is depicted in Error! Reference source not found.43.

To improve the portability and ease of use of the overall robotic system and meeting the particular needs of the mobile dismounted infantry, the integration of the head tracker and the head mount display for the gimbaled camera/robot tele-operations and targeting is implemented. The commercial off-the-shelf solution provides an integrated head tracker and head mount display, such as the one shown in Error! Reference source not found.44.

The head mount display provides a VGA connection to the external VGA connector of the laptop PC. The operator basically sees the same display as the laptop PC screen within the goggle display. The newly configured operator control unit shown in Error! Reference source not found.45 software provides the operator a simple single button toggle to switch between the onboard camera view and the overall OCU GUI display. Hence it provides the soldier an immersive perspective from the onboard camera while retaining the robot geolocation, target location, and communication functionalities to the base station from the 4D GIS system.

The integrated head tracker sensor also provides three axis head tracking, pitch, roll, and yaw. The head tracker input is integrated for direct gimbals control. This new interface provides an immersive control interface integrated within the new Robotic operator control software. The enhance perspective of this integrated system enable the operator to simultaneously conduct targeting mission as well as tele-operation of the robot. The simple single button target reporting, and automatic slew to cue command when the operator receives BDA requests from the command center are integrated within the new software configuration for ease of use and expedite the completion of the overall collaborative targeting and target engagement mission.

The current communication configuration of the intelligent coremicro Robot based on the existing AGNC Coremicro Robot technologies separates the video and data message into two distinct communication channels. The video is provided by a video server which transmits the digitized video stream through the Ethernet based network; while the data message for robot sensor and control commands are transmitted using RS232 based 900 MHz AGNC radiolink.

This separation of the data and video transmission provides some advantage over the communication through a single communication channel. The separation of data and video signal reduces the data traffic across a given communication channel. It also provides a more reliable non-line-of-sight communication channel for the data link for the robot status report and the control command communication between the operator control unit and the robot.

However, for the deployment of coremicro Robot with the mobile dismounted soldiers, the added hardware for the extra radio link and the limited communication channels in the battlefield, it is more feasible to combine the two data links. Hence, we implemented the Ethernet based messaging for the sensor data/robot status and the control commands between the OCU and the robot. Depending on the hardware configuration, the operator has the option to communicate using either communication channel/protocol.

Figure 46:
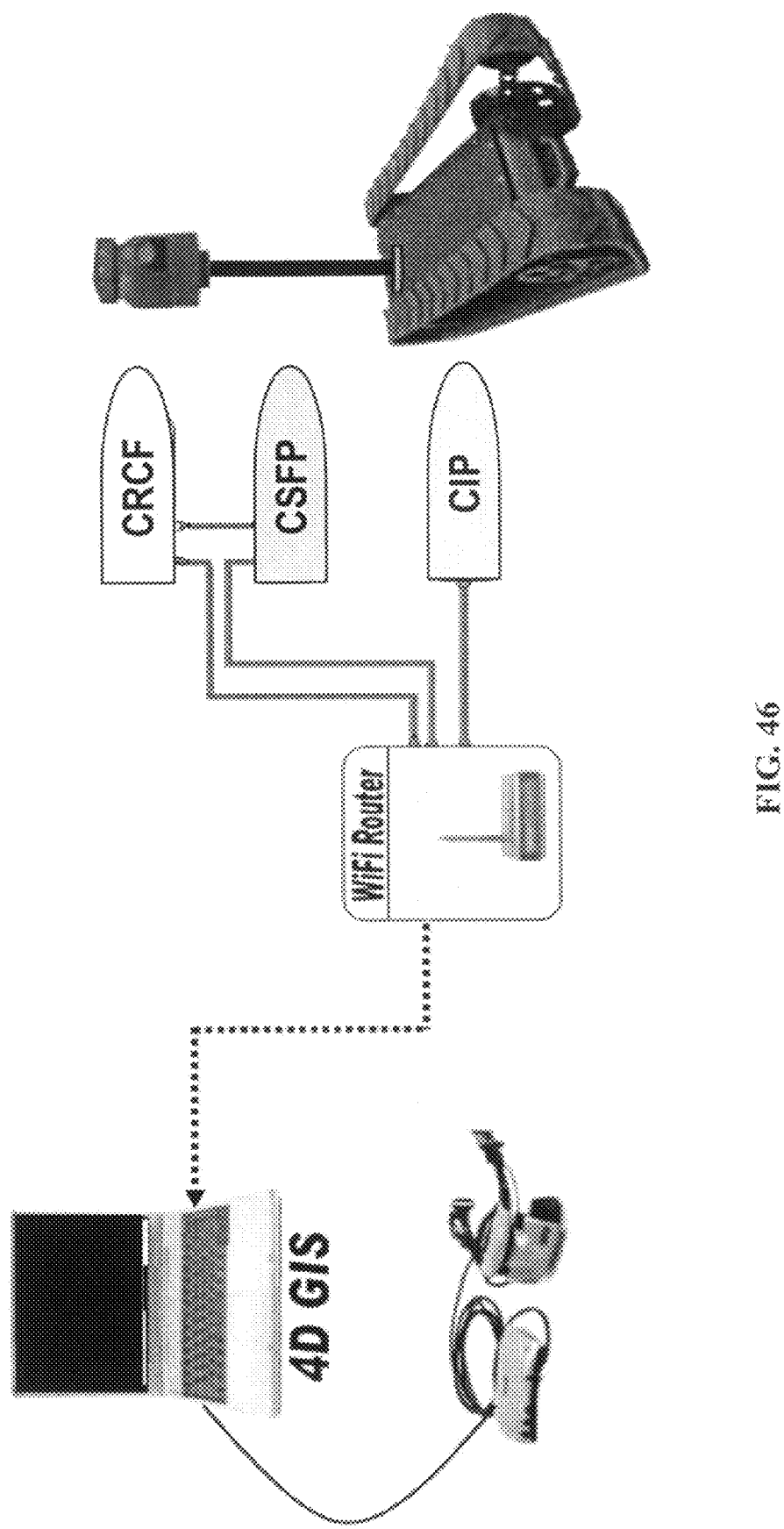
FIG. 46 illustrates consolidated communication with a single Wi-Fi.
Figure 47:
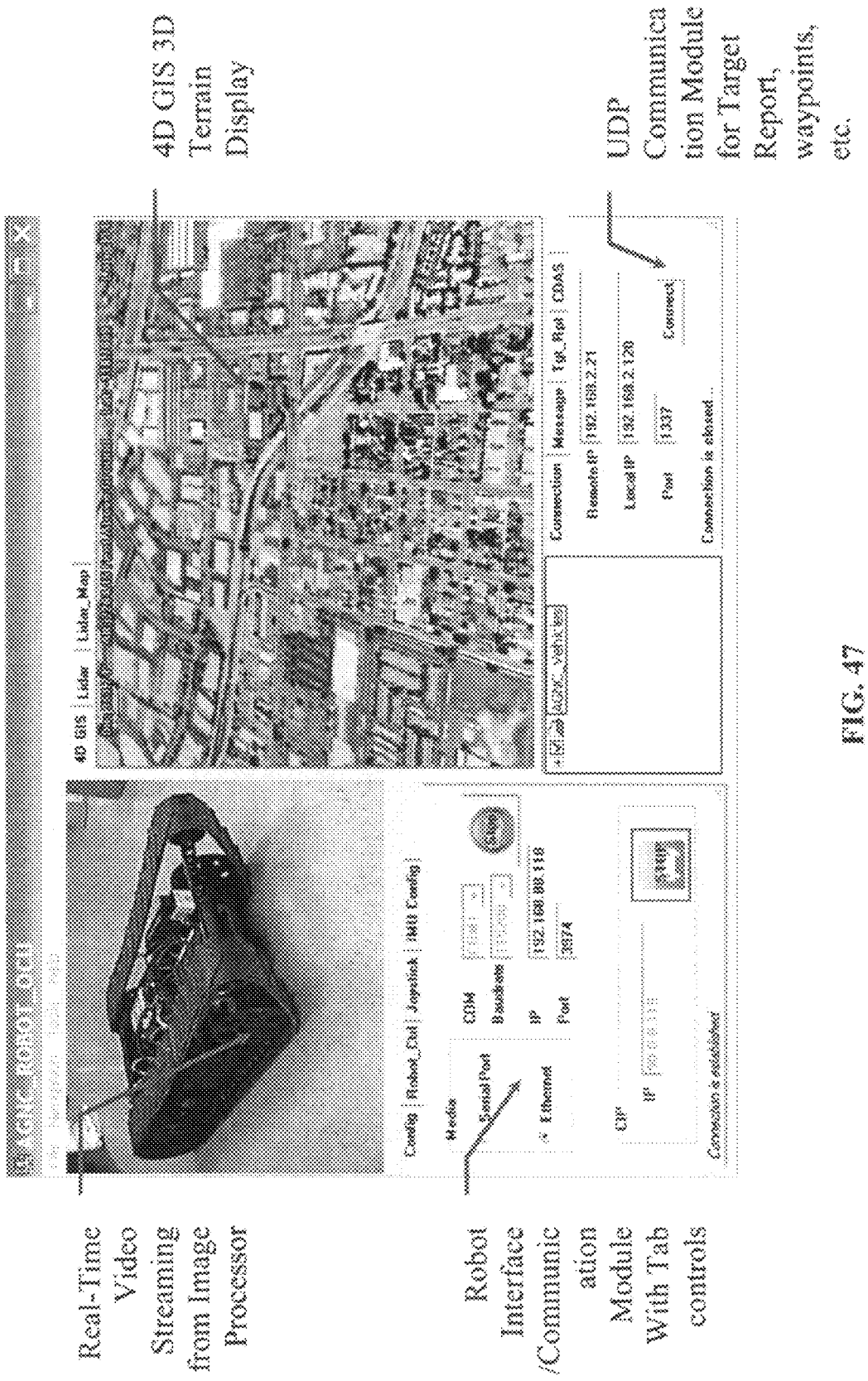
FIG. 47 illustrates a Coremicro 4D-GIS robot communication interface module.
Figure 48:
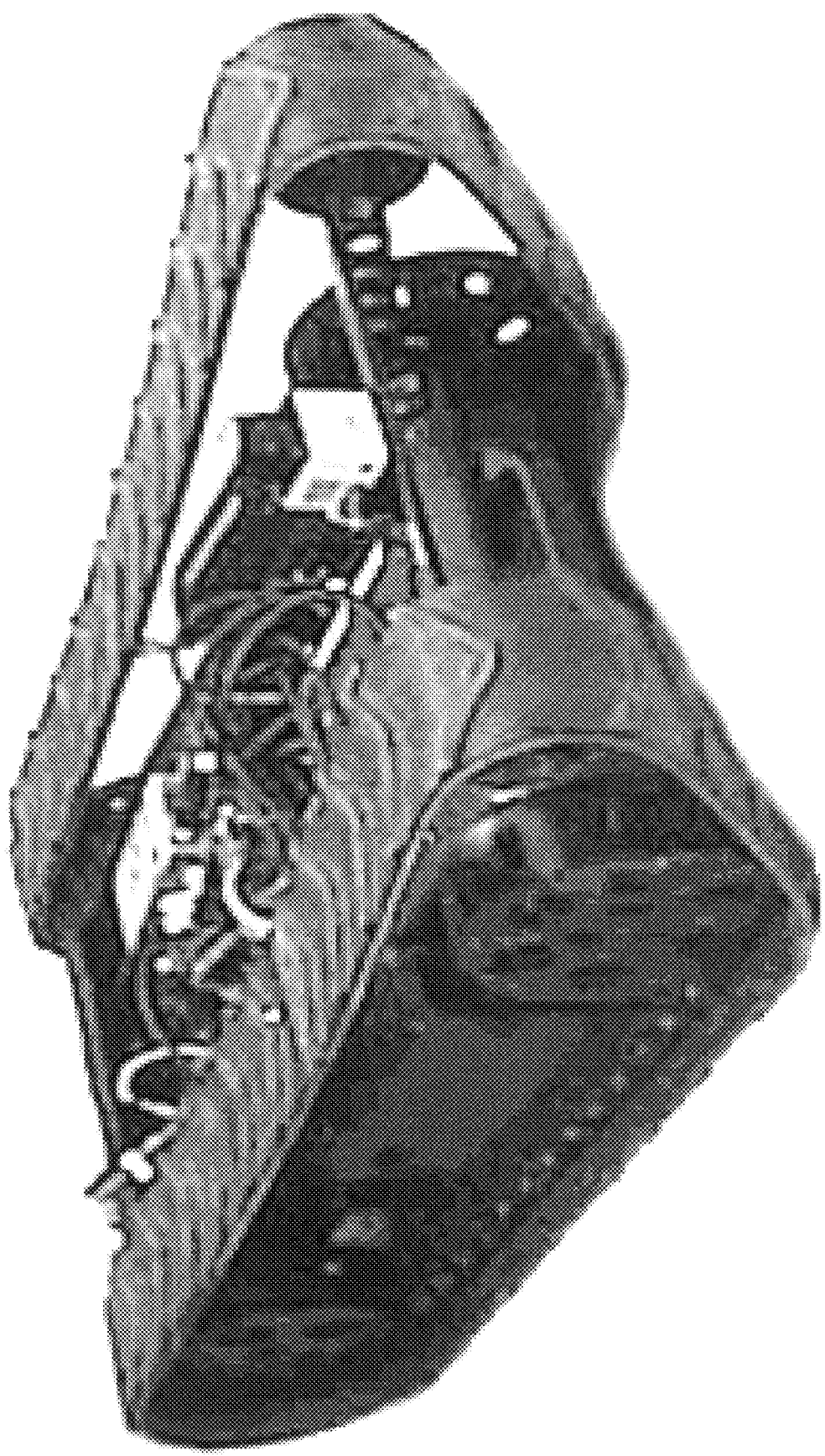
FIG. 48 is a perspective view of a full screen camera view with single button toggle.
Figure 49:
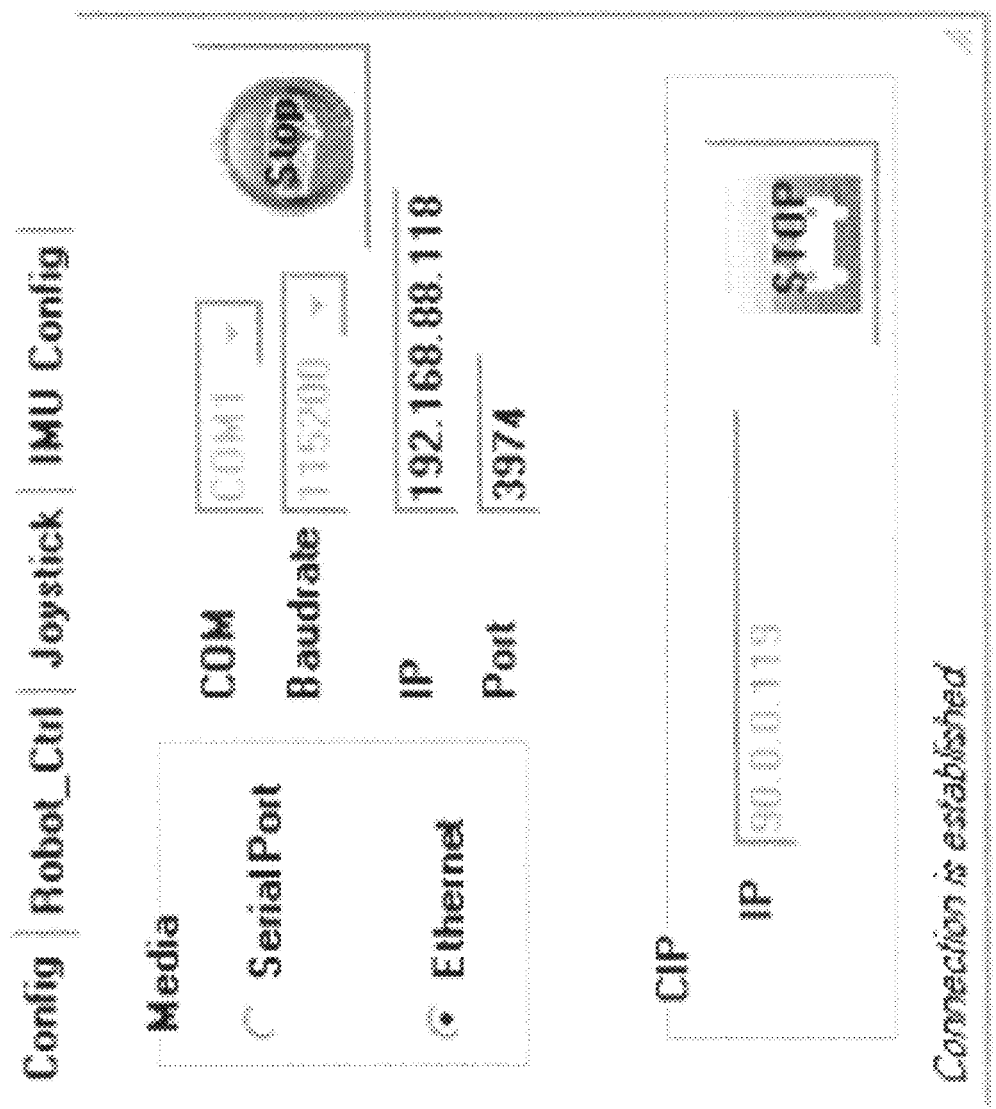
FIG. 49 illustrates a robot communication module.
Figure 50:
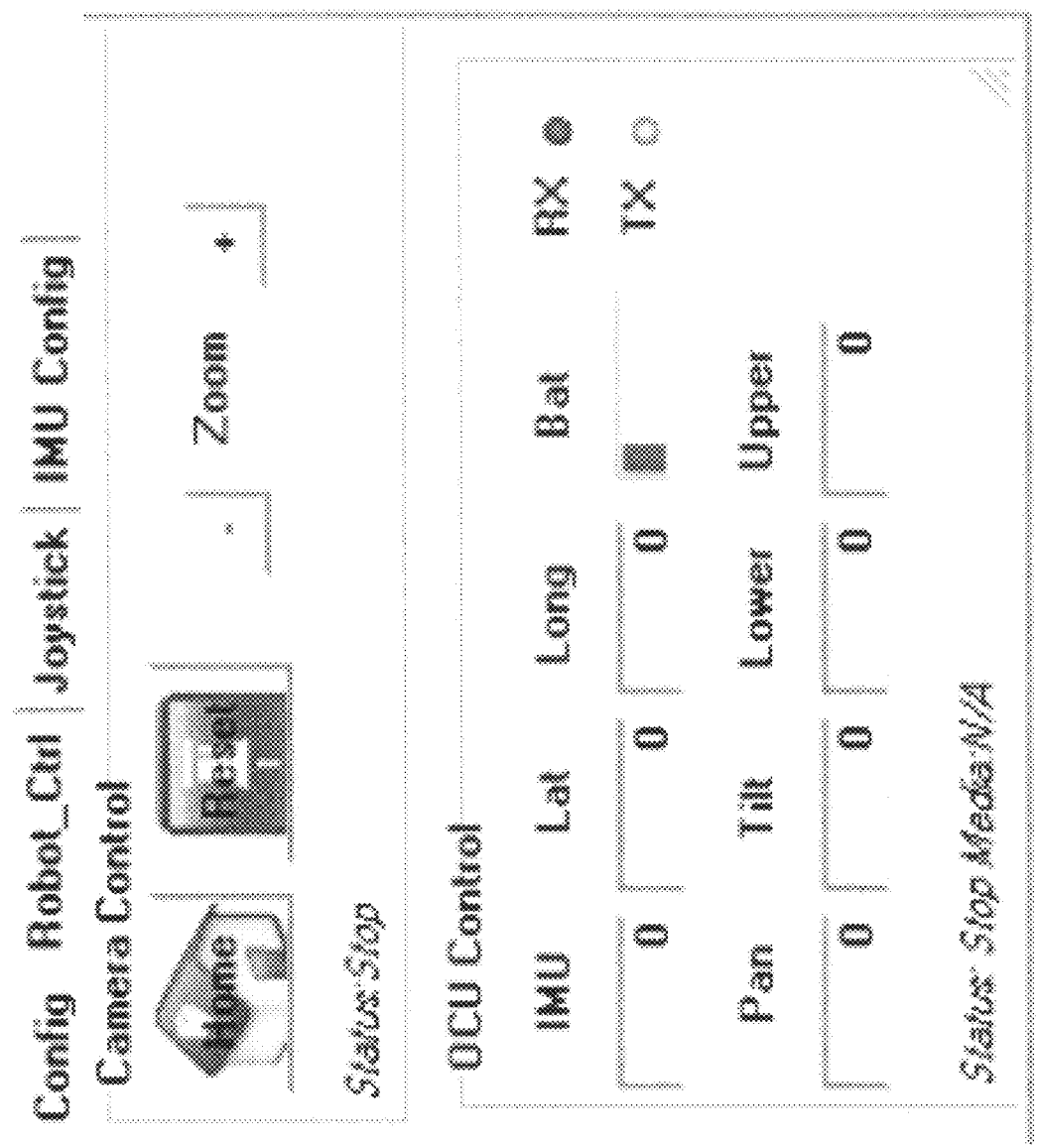
FIG. 50 illustrates a robot control interface module.
Figure 51:
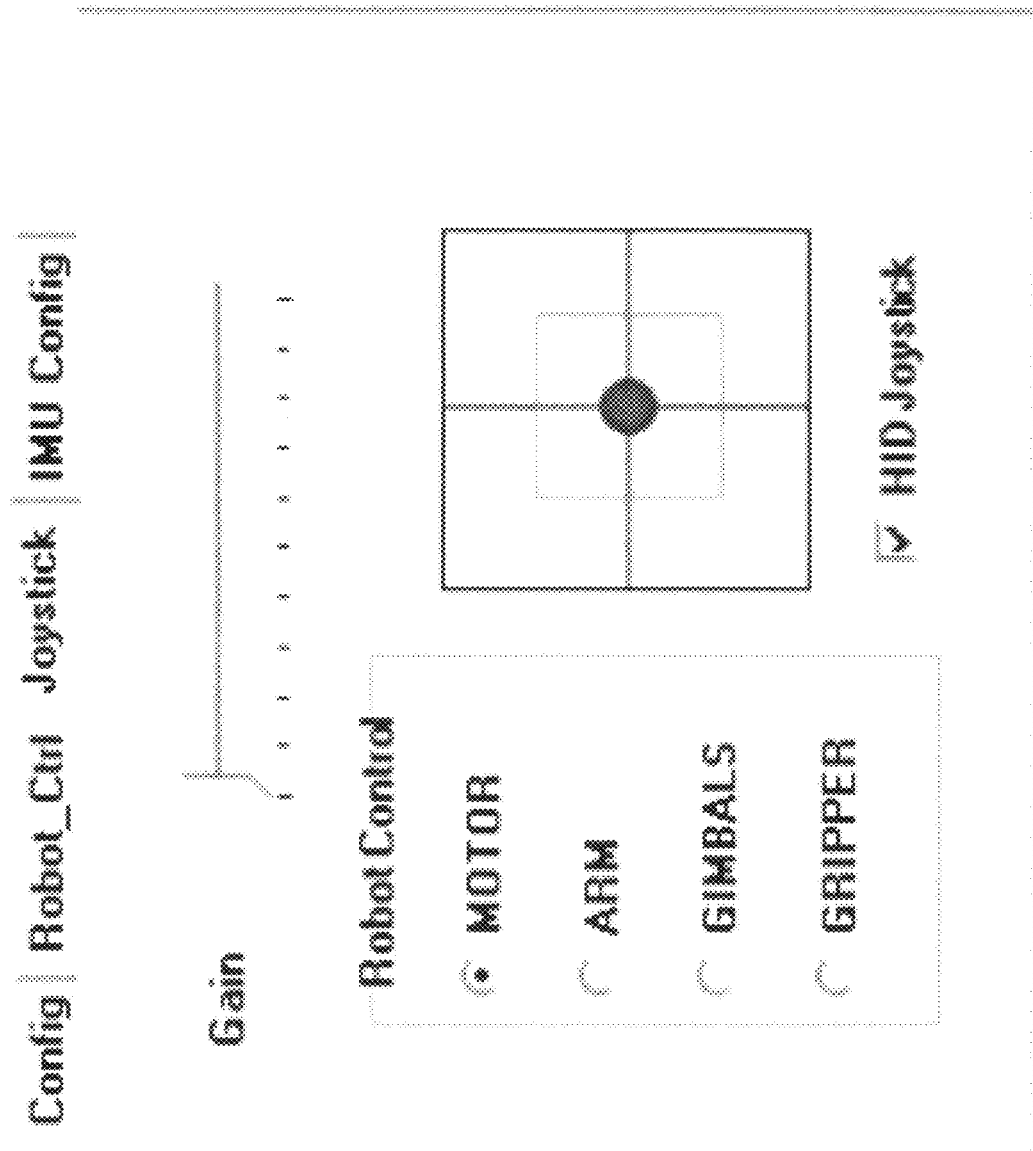
FIG. 51 illustrates a robot device control interface.
Figure 52:
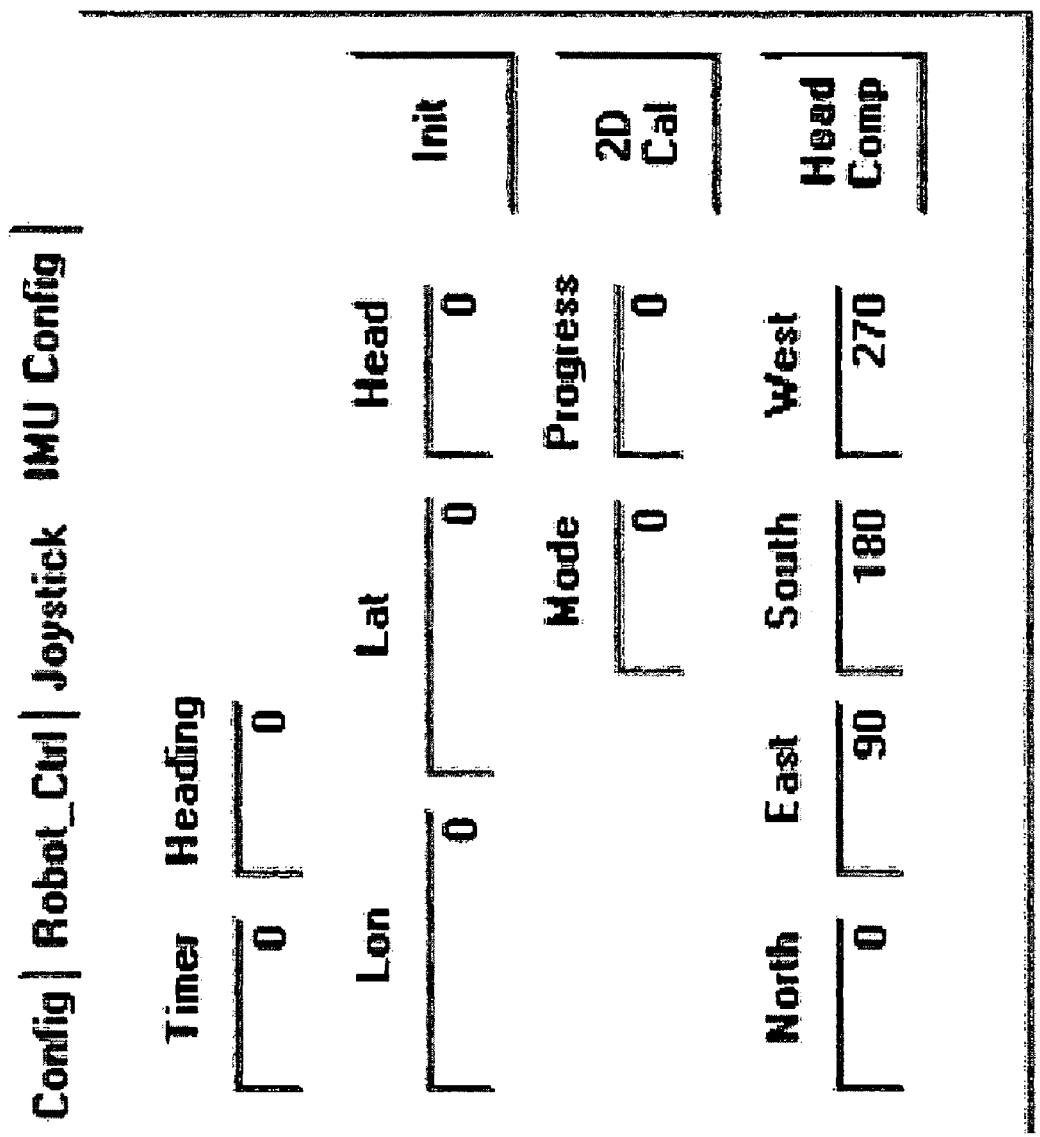
FIG. 52 illustrates an IMU configuration/calibration module.
Figure 53:
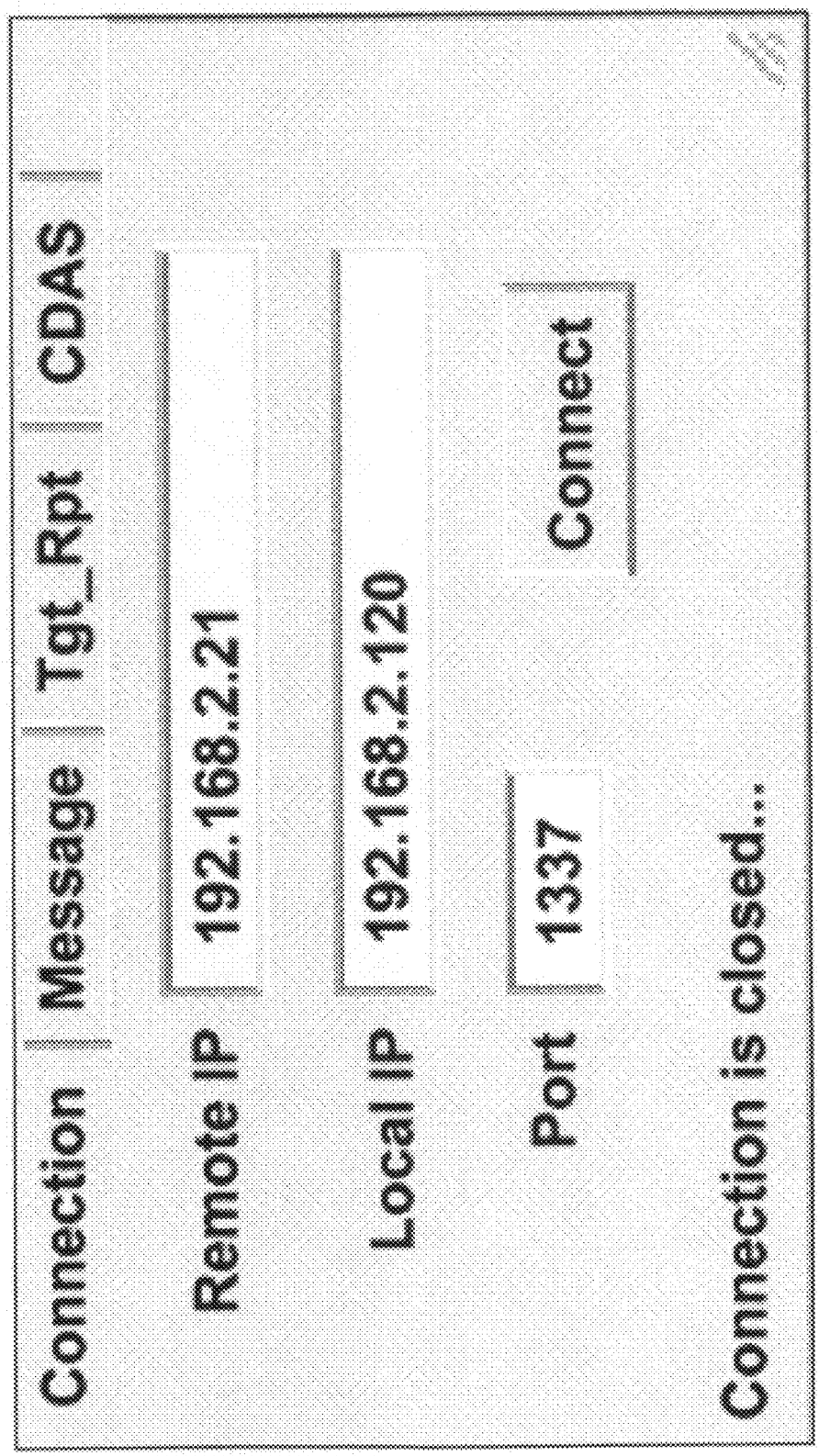
FIG. 53 illustrates a communication configuration module.
Figure 55:
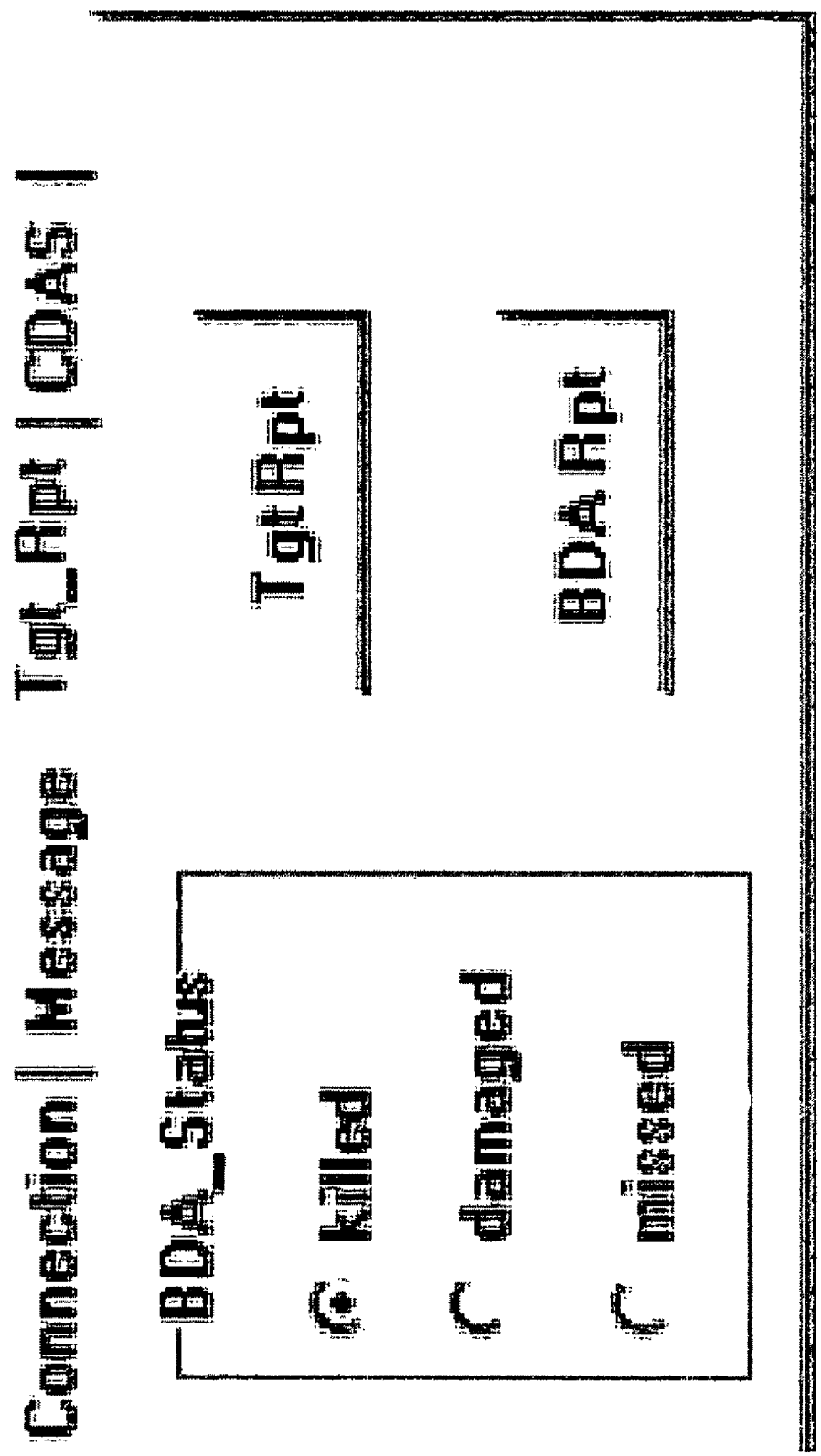
FIG. 55 illustrates a target report module.
Figure 57:
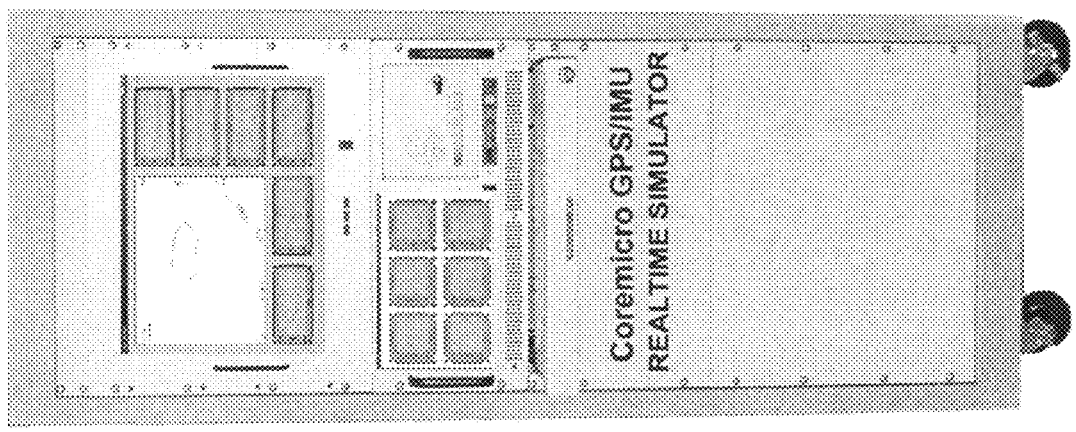
FIG. 57 is a perspective view of a GPS/IMU realtime simulator (AGNC-2000RTGIS) for target tracking testing.
Figure 58:
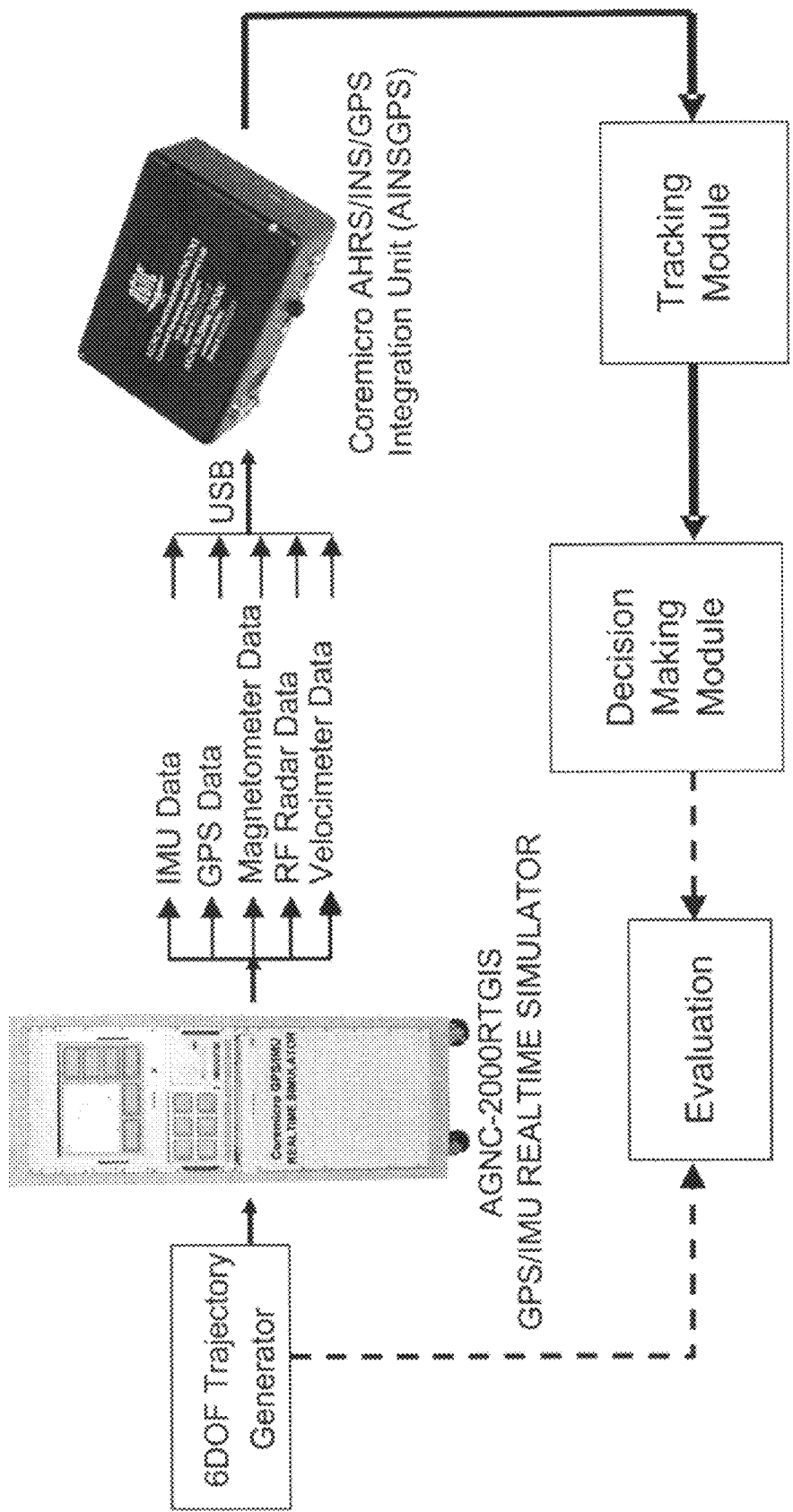
FIG. 58 is a block diagram of the GPS/IMU realtime simulator for the decision aid testing.

For other systems applications the additional radiolinks and controller hardware can be eliminated with the direct implementation of the head tracker/head mount display within the newly configured operator control interface. After the consolidation, the wireless communication link is reduced to a single Wi-Fi radio link, as shown in FIG. 46.

To enable the head mounted display interface for the robot control interface as well as all other communications with the command center, AGNC reconfigured the 4D GIS operator interface to provide the operator a simple intuitive control utilizing the combination of the head tracker for gimbaled control and an off-the-shelf game controller for all other functionalities such as tele-operation of robots locomotion, manipulators, single button target reporting and more.

The multi-windows 4D GIS system running in the desktop/laptop configuration provides high level of flexibility for customization and configuration; however for head mounted display application, the multi-windows interface is too complex for the operator. Hence the 4D GIS interface is partitioned within the single window interface and projected to the head mounted display, as shown in Error! Reference source not found.47. The window screen side is scaled to 800×600 resolution which is the typical head mounted display native resolution.

To simplify the interface with the combined head tracker with head mounted display, we also enabled a single button toggle to switch the Coremicro 4D GIS graphical user interface to a full screen camera view, as shown in Error! Reference source not found.48. This single button toggle functionality combined with other single button functions, such as target reporting, BDA reporting, and joystick driving, provide a simple and efficient interface for targeting and tele-operation of the robot.

The various 4D GIS system components are also incorporated within the new single window interface. These system components include:

1. Robot Communication Interface which provides both Ethernet and serial communications through AGNC radio-link and standard WiFi.
2. Robot Control Interface which provides robot status and interface to the camera server.
3. Robot device control interface which provides both on screen as well as game controller interface for various robot actuators and manipulators.
4. IMU configuration Module which provides an interface to the IMU for calibration and configuration.
5. UDP Communication Configuration Module which provides the connection to the CDAS system.
6. UDP Message Log Module which logs all messages received from CDAS.
7. Target Reporting Module which enables the operator to report target geolocation and provides target BDA report. These functionalities are also enabled through the joystick module which allows single button target report functionalities.
8. CDAS System configuration Module for dynamic CDAS asset identification configuration.

The GPS/IMU REALTIME SIMULATOR (AGNC-2000RTGIS) is utilized for simulation and hardware-in-the-loop test of target tracking shown in FIG. 29. It is improved to provide the multiple sensor simulation capabilities and interfaces for the target tracking tests. Error! Reference source not found.57 shows the GPS/IMU REALTIME SIMULATOR for target tracking test and verification.

The GPS/IMU REALTIME SIMULATOR is a very helpful tool for the test and verification of target tracking. The GPS/IMU REALTIME SIMULATOR generated IMU and GPS data are input into the coremicro AHRS/INS/GPS Integration Unit (AINSGPS) through a USB port. The applications of the GPS/IMU REALTIME SIMULATOR for the decision aid system include:

Real time decision aid system test and simulation.
Verification of system software and hardware.
System performance analysis.
Training of the real time decision aid user.

The GPS/IMU REALTIME SIMULATOR is designed to dramatically reduce the need to perform expensive and time-consuming field trials for testing, evaluating and qualifying air, space, ground, marine, and underwater vehicles.

The GPS/IMU REALTIME SIMULATOR is designed for use in many applications, including:

Ground test of installed systems
Laboratory hardware-in-the-loop dynamic simulation
GNC system analysis and development
Real-time differential GPS positioning.

Used as Installed System Test Equipment, it generates IMU and GPS signals on the ground, under static conditions, identical to what would be encountered if the vehicle was flying, or being driven, or sailing. Its design features support the final integration of a developmental Guidance, Navigation, Control and Communications (GNCC) system installed in a vehicle. It assures testers that GNCC avionics on-board the vehicle work properly before and during a real flight/driving/sailing test. It also helps to debug on-board GNCC avionics and verify system performance.

The GPS/IMU REALTIME SIMULATOR receives real-time data from the 6DOF trajectory generator and simulates IMU and GPS data according to the GPS/IMU measurement models and error models defined by the user. Simulated electronic signals are injected into the installed avionics system, which causes the on-board GNCC system computer into "thinking" that the vehicle is actually flying, or being driven, or sailing.

The GPS/IMU REAL TIME SIMULATOR is provided for simulation and hardware-in-the-loop test of the real time decision aid system. It is improved to provide the multiple sensor simulation capabilities and interfaces for the decision aid test.

The simulated data are injected into the AINSGPS through an assigned simulation port. The GPS/IMU REALTIME SIMULATOR receives real-time trajectory data from the 6DOF-flight trajectory simulator and generates GPS, IMU, RF radar, magnetometer, and velocimeter signals according to the 6DOF data and measurement models and error models of GPS, IMU, RF radar, magnetometer, and velocimeter. Simulated signals are injected into the AINSGPS, which allow the hardware and program of the decision aid system to function as if the projectile were in dynamic motion. The navigation solutions of the AINSGPS are output to the Tracking Module for target tracking estimation.

Error! Reference source not found.58 shows the application of the GPS/IMU REALTIME SIMULATOR for decision aid system test and verification.

In the decision aid, the I/O interface is accommodated to provide the ability to communicate with the GPS/IMU REALTIME SIMULATOR. For simulation testing, a flexible USB I/O interface structure is provided to meet test needs.

The system dynamic performance is characterized by the system's ability to track the changing input states. The AINSGPS makes use of several system aiding methods to enhance system performance. Dynamic motion can affect system characteristics. Since it is difficult to provide an accurate dynamic moving reference in field tests, the GPS/IMU REALTIME SIMULATOR is used to verify system dynamic performance. The system motion is simulated and dynamic sensor data are generated by the GPS/IMU REALTIME SIMULATOR. The generated data are input to the AINSGPS and dynamic navigation solutions are produced. The output of the AINSGPS is fed to the tracking module to estimate projectile position, velocity and target tracking data. The estimated target tracking data are used to determine the gun pointing of the fire control. Comparing the real system inputs and the system solutions, the accuracy of target tracking estimation and decision making of the system is obtained.

The present invention provides a target tracking, pointing and trajectory estimation system involving elements related to automatic target tracking, target acquisition, target coordinates determination, targeting information visualization and evaluation/simulation testing. The Coremicro Robot together with the Coremicro 4D GIS provide the basis for target acquisition and target coordinates determination. The Coremicro 4D GIS system GUI provides a most informative and efficient display medium facilitating the execution of the diverse targeting tasks. The GPS/IMU REALTIME SIMULATOR is utilized as a highly versatile tool for simulation and hardware-in-the-loop tests of target tracking.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of 4D GIS based virtual reality for moving target prediction, comprising the steps of:
    (a) recognizing a predetermined terrain and a plurality of predetermined targets;
    (b) positioning and tracking said targets;
    (c) estimating and reasoning a predetermined destination; and
    (d) predicting movement route and traiectory of said moving target,
    wherein said step (a) further comprises steps of:
    (a1) obtaining terrain and moving target image from a Moving Target Indication (MTI) sensor or an Unmanned Aerial Vehicle (UAV) camera;
    (a2) extracting moving targets by subtraction from a sequence of measurements from said MTI sensor or said Unmanned Aerial Vehicle (UAV) camera;
    (a3) recognizing said moving target using pattern recognition;
    (a4) classifying terrain background through a statistical model based image classifier; and
    (a5) registering said classified terrain with a digital map from GIS through matching recognized culture (man-made) objects and natural objects.

2. The method as recited in claim 1, wherein in step (b) further comprises steps of: (b1) determining a position of said moving target after said terrain image registration; (b2) retrieving geographical information where said moving target is located from said GIS; and (b3) obtaining status variables of said moving target by tracking said target movements on said digital map.

3. The method as recited in claim 2, in step (c) wherein a fuzzy logic reasoning algorithm is used to synthesize multi-modalities from GIS, target statistics, tactics and other military information to estimate the destination of said moving targets.

4. The method as recited in claim 3, in step (d) wherein two algorithms are used to estimate the trajectory for road-dependent targets and road-independent targets respectively, wherein for road-dependent targets, a road network is used as constraint for motion prediction and tracking; and for road-independent targets, a time-varying adaptive algorithm is used for motion prediction based on said moving target mobility and terrain environment.

5. The method, as recited in claim 4, wherein said terrain and moving target image is obtained by an imaging sensor, wherein said imaging sensor provides measurements of target range, position, and attitude, which are fused with other object detection sensors for obstacle tracking.

6. The method, as recited in claim 5, wherein an Adaptive Multimode Tracking (AMT) System is employed to compensate for the limitations of said individual object detecting sensor, and to improve the overall object detection and tracking performance.

7. The method, as recited in claim 6, wherein said terrain and moving target image is obtained by an imaging sensor, wherein said imaging sensor provides measurements of target range, position, and attitude, which are fused with other object detection sensors for obstacle tracking.

8. The method, as recited in claim 7, in step (d) wherein a real-time 4D GIS-based virtual reality for simulating said moving target and possible aimpoint within a Common Operating Picture (COP) is produced.

9. The method, as recited in claim 8, wherein said step (d) further comprises steps of:
    (d1) retrieving geographic data of said area wherein said moving target may be located according to said position prediction;
    (d2) generating a virtual 3D terrain basing on regular Digital Elevation Model (DEM), or Triangulated Irregular Network (TIN);
    (d3) generating a virtual vehicle according to a 3D Vehicle Model Library; and
    (d4) producing a virtual reality of said predicted moving target movements by combining said virtual terrain, said virtual targets, and said predicted trajectory.

10. The method, as recited in claim 9, wherein said virtual reality is interacted by users through a Graphic User Interface (GUI) to control the display.

11. The method, as recited in claim 9, further comprising the steps of:
    (e) receiving platform rotation commands of a device using a desired pointing direction of said device and a current attitude measurement of said device, wherein said rotation commands are computed according to the predicted movement route and trajectory of said moving target;
    (f) combining said computed platform rotation commands with feedback signals;
    (g) computing an automatic stabilization and positioning control signal by a servo controller;
    (h) amplifying servo controller signals;
    (i) sending said amplified servo controller signals to an actuator;
    (j) converting electric signals to torques and said torque exerted on a platform body to eliminate interference to said platform body; and
    (k) sensing a motion of said platform body and feedback a sensor signal to said servo controller.

12. The method as recited in claim 1, in step (d) wherein two algorithms are used to estimate the trajectory for road-dependent targets and road-independent targets respectively, wherein for road-dependent targets, a road network is used as constraint for motion prediction and tracking; and for road-independent targets, a time-varying adaptive algorithm is used for motion prediction based on said moving target mobility and terrain environment.

13. The method, as recited in claim 1, further comprising the steps of:
    (e) receiving platform rotation commands of a device using a desired pointing direction of said device and a current attitude measurement of said device, wherein said rotation commands are computed according to the predicted movement route and trajectory of said moving target;
    (f) combining said computed platform rotation commands with feedback signals;
    (g) computing an automatic stabilization and positioning control signal by a servo controller;
    (h) amplifying servo controller signals;
    (i) sending said amplified servo controller signals to an actuator;
    (j) converting electric signals to torques and said torque exerted on a platform body to eliminate interference to said platform body; and
    (k) sensing a motion of said platform body and feedback a sensor signal to said servo controller.

* * * * *